United States Patent
Kelley et al.

(10) Patent No.: US 10,339,825 B2
(45) Date of Patent: Jul. 2, 2019

(54) SYSTEM AND METHOD FOR ON-LINE ACADEMIC COMPETITION

(76) Inventors: Timothy J. Kelley, Chicago, IL (US);
Michael J. Perrone, Chicago, IL (US);
Joseph T. Napoli, Chicago, IL (US);
Innokenty Y. Mihailov, Kiev (UA)

(*) Notice: Subject to any disclaimer, the term of this patent is extended or adjusted under 35 U.S.C. 154(b) by 400 days.

(21) Appl. No.: 13/439,305

(22) Filed: Apr. 4, 2012

(65) Prior Publication Data
US 2013/0267285 A1 Oct. 10, 2013

(51) Int. Cl.
| | |
|---|---|
| G09B 7/02 | (2006.01) |
| A63F 13/798 | (2014.01) |
| A63F 13/795 | (2014.01) |
| G09B 5/00 | (2006.01) |
| G09B 5/12 | (2006.01) |
| A63F 13/46 | (2014.01) |
| G07F 17/32 | (2006.01) |
| G09B 7/06 | (2006.01) |
| G06Q 10/10 | (2012.01) |

(52) U.S. Cl.
CPC ............ *G09B 7/02* (2013.01); *A63F 13/46* (2014.09); *A63F 13/795* (2014.09); *A63F 13/798* (2014.09); *G06Q 10/101* (2013.01); *G07F 17/3276* (2013.01); *G09B 5/00* (2013.01); *G09B 5/125* (2013.01); *G09B 7/06* (2013.01)

(58) Field of Classification Search
USPC ........ 434/322, 350, 352, 362; 463/9, 29, 42; 705/7.18; 707/803; 715/206; 725/59
See application file for complete search history.

(56) References Cited

U.S. PATENT DOCUMENTS

| | | | | |
|---|---|---|---|---|
| 4,767,335 | A * | 8/1988 | Curt | 434/352 |
| 5,092,779 | A * | 3/1992 | Piwonka et al. | 434/352 |
| 5,762,503 | A | 6/1998 | Hoo et al. | |
| 6,086,381 | A * | 7/2000 | Downs et al. | 434/322 |
| 7,072,863 | B1 * | 7/2006 | Phillips et al. | 705/36 R |
| 2004/0197753 | A1 * | 10/2004 | Kirsch | 434/237 |
| 2005/0101386 | A1 * | 5/2005 | Lavanchy et al. | 463/42 |
| 2007/0038931 | A1 * | 2/2007 | Allaire et al. | 715/526 |
| 2007/0072675 | A1 * | 3/2007 | Hamano et al. | 463/42 |
| 2007/0156267 | A1 | 7/2007 | Nozaki | |
| 2007/0293322 | A1 | 12/2007 | Horowitz et al. | |

(Continued)

OTHER PUBLICATIONS

Questions Unlimited, Quiznet Tournament, Mar. 12, 2011, http://www.qunlimited.com/quiznet1.html.*

(Continued)

*Primary Examiner* — Jason T Yen

(57) ABSTRACT

A web application facilitates live on-line academic competition between teams and individuals based on multiple choice or fill-in-the-blank questions and fosters academic competition between students and schools. Using the software application, a team's Coach may enter his/her team in a league of regular competition, schedule a single competition with another team, or organize a competition between the team's members by dividing the team into multiple teams. The test environment provides the experience of competing over test questions, including a scoreboard that keeps track of progress with respect to the test time and the opponent. Students of comparable abilities on competing teams are matched using a matching algorithm that matches the students based on past test performance and the like.

42 Claims, 115 Drawing Sheets

(56) References Cited

U.S. PATENT DOCUMENTS

| | | | |
|---|---|---|---|
| 2008/0010106 A1* | 1/2008 | Bourne et al. | 705/8 |
| 2008/0091692 A1 | 4/2008 | Keith et al. | |
| 2009/0099924 A1 | 4/2009 | Lensch et al. | |
| 2009/0104591 A1* | 4/2009 | Panetta | 434/350 |
| 2009/0149234 A1 | 6/2009 | Van Luchene | |
| 2009/0150940 A1* | 6/2009 | St.John-Larkin | 725/59 |
| 2009/0176576 A1* | 7/2009 | Billmaier | A63F 13/12 463/42 |
| 2009/0181740 A1* | 7/2009 | Tsutsui et al. | 463/9 |
| 2010/0227306 A1* | 9/2010 | Lofthus et al. | 434/350 |
| 2010/0291529 A1* | 11/2010 | Carter et al. | 434/362 |
| 2011/0099210 A1 | 4/2011 | Woodson, II et al. | |
| 2011/0165946 A1* | 7/2011 | Pavlich | G07F 17/32 463/42 |
| 2012/0197947 A1* | 8/2012 | Tocci et al. | 707/803 |
| 2012/0302332 A1* | 11/2012 | Buhr | 463/29 |

OTHER PUBLICATIONS

Questions Unlimited, Coach's Corner, Nov. 26, 2011, http://www.qunlimited.com/coach.html.*
Questions Unlimited, National Academic Championship, Dec. 13, 2011, http://www.qunlimited.com/index.html.*
Youth Basketball On-Line, Official's Guide: Your Pre-Game Conference with Coaches and Captains, Mar. 1, 2003, http://youth.usab.com/training-room/officials/officials-guide-section-10-your-pregame-conference-with-coaches-and-captains.htm.*
QuizNet, "Questions Unlimited, Announcing Our Winter 2012 QuizNet tournament", Jan. 26, 2012, http://web.archive.org/web120120224204136/http://www.qunlimited.com/quiznet1.html, accessed Jun. 26, 2013, 6 pages.
"Youth Basketball: Pre-Game Conference with Coaches and Captains", http://youth.usab.com/training-room/officials/officials-quide-section-10-your-pregame-conference-with-coaches-and-captains.htm, Mar. 1, 2003, accessed Jun. 3, 2014, 2 pages.

* cited by examiner

SYSTEM AND METHOD FOR ON-LINE ACADEMIC COMPETITION

TECHNICAL FIELD

The present application relates to a web application that facilitates live academic competition between teams and individuals based on multiple choice or fill-in-the-blank questions and methods for fostering academic competition between students and schools.

BACKGROUND

We live in a highly competitive society. We are driven by competition in business and revel in the exploits of our favorite athletes. Competition is commonly used as a motivational tool in the business environment, the athletic environment, and even in the academic environment. Business and athletic competitions often foster teamwork and collective purpose in the context of team competitions. Unfortunately, this teamwork has not translated well to the academic environment. Typically, academic competitions are conducted amongst a handful of the top selected students who participate in math or spelling competitions, history or geography competitions, speech and debate competitions, and the like. A new approach to academic competition is desired that utilizes on-line technologies to foster academic competitions based on collaborative teamwork and collective purpose and that is not limited to a handful of selected students. The present invention is directed to this need.

SUMMARY

The invention provides an on-line academic competition system and method for students and teachers and other "contestants." The process begins with the registration of a school or association in the system and the account activation of its members. Once active, an educator can access the site, complete his/her profile information, and immediately form virtual teams. These virtual teams might be composed of students from a particular class, e.g., 8th Grade Biology Team, or from an after school club, e.g., SAT Practice Team. The educator can arrange competition events for that team by dividing it into two or more opposing teams (here students can work independently or in small groups), or by challenging another team in the Interstellar Network on a specific date. These two competition formats are jointly referred to as Pick-Up Play. The educator can also enter the team into a cycle of regularly occurring contests organized by Interstellar. This format is called League Play. When creating a Pick-Up Play event, the educator can easily create and save questions, and even add images to them, in order to fuel the competition. In addition, the educator can choose from the Interstellar Library, a database of questions submitted by fellow educators in the Interstellar Network as well as from Interstellar. For League Play events, Interstellar arranges the questions under the direction of the league's participants.

The experience of the student mirrors what would be found in sport. Prior to an academic competition event, an algorithm evenly matches students from opposing teams based on past performance, ensuring that competition is as fair as possible. If one team is larger than the other, a matching algorithm matches students 2:1, 3:1, etc., until all students have been matched. During the event, questions are presented in random order across students to mitigate the possibility of cheating. A scoreboard displays the name, photo, and score (as measured by questions answered correctly) of both the student and the matched opponent, unless the student has chosen to conceal his/her identity. If this selection is made, then the student's name and photo remain hidden from the opponent. Alternatively, at the educator's direction, team score can be displayed on the scoreboard. In this case individuals are not matched. Instead, score is determined by taking a running average of all student scores and rounding to the nearest whole number. Of particular value, a specialized clock not only keeps track of time remaining, but alerts the student as to whether he/she is on pace to finish the questions on time.

The student's domain is enhanced by several informative features. The Results page details all competition events of a particular team, highlighting the student's individual performance in each. Simple graphs allow the student to clearly keep track of progress. The calendar page lists all future events including the basic profiles of upcoming individual opponents, providing a unique medium for student interaction. Finally, the teammates page presents all students on a particular team, the educator associated with it, and any distinctions the student has received competing in Interstellar. The educator's domain largely follows the same ordering except that the Results page details the performance of every student on the team; the calendar page displays the basic profile of the educator of the opposing team; and the manage team page allows the educator to make changes to the team's composition.

In accordance with an exemplary embodiment of the invention, a system is provided for on-line academic competition including a database that stores test questions; team, coach, and individual contestant profiles; and test response statistics for the teams and individual contestants; and a processor programmed to interact with the database and with coach and individual contestant processing devices to perform the steps of:

enabling the creation of teams of individual contestants by the coach for participation in academic competition;

presenting predetermined test questions to the processing devices of the individual contestants of competing teams for response in a time frame allocated for the academic competition; and providing a real time scoreboard that permits each individual contestant to track his/her and his/her opponent's progress with respect to both the time frame for answering questions and questions answered correctly.

In an exemplary embodiment of the system, the processor is programmed to calculate a winner of an academic competition between teams and/or between respective individual contestants. Also, the scoreboard is presented with a clock face component that alerts the contestant as to whether he/she is on pace to finish the test questions in the allocated time frame. The scoreboard display individual score, as determined by a number of questions answered correctly by each of the matched individual contestants, or team score, as determined by taking a running average of all individual contestant scores from the respective teams and rounding to the nearest whole number.

In exemplary embodiments, the processor enables a contestant to conceal his/her identity from a competing contestant or to permit the display of his/her name and photo on the scoreboard of the competing contestant. The processor also evenly matches individual contestants from opposing teams $1:1, 2:1, 3:1, \ldots, N:1$, where N is an integer, until all contestants have been matched, in accordance with at least one of the following rules: limiting a maximum number of consecutive visits (MNCV) to the smallest integer greater than or equal to n/m, where n is the number of contestants from a larger group and m is the number of contestants from a smaller group; or leaving the MNCV unconstrained in which case the MNCV is n−m+1; or setting the MNCV to an integer smaller than n−m+1 and larger than the smallest integer greater than or equal to n/m; or allowing stages to be represented by not only a stage number, but by a number of consecutive visits as well in which case individual contestants in the larger group are paired multiple times.

The processor further enables the creation of leagues of teams and the creation of a cycle of academic competitions amongst a league of teams. The processor also enables one team to search for and then challenge another team of common time availability to an academic competition and enables a team to be divided into multiple teams for an intra-team academic competition. The processor further enables the coach to create and save questions, including the assignment of images to them, or to choose questions from a database of questions submitted by other coaches for utilization in an academic competition. The processor further enables the coach to create a question set by naming the question set in accordance with a predetermined list of categories, populating the question set with questions, and storing any created questions in the database in the predetermined list of categories. The processor also enables an individual contestant to upload a photo, or select from collection of photos, to be used as a background to the questions presented in an academic competition and to facilitate the introduction of contestants to contestants and coaches to coaches from opposing teams.

In exemplary embodiments, the processor enables the creation of a live competition event between two teams by enabling the coach to select a date, time, and length for an academic competition; select a question set for the academic competition; and select a team from a list of teams having a common time availability. Additionally, the processor enables the creation of a live competition event within one team by enabling the coach to divide a team into two or more opposing teams by first deciding the desirable amount of opposing teams and then filling each opposing team with members from the original team.

The invention further includes methods implemented by such systems as well as computer readable storage devices containing instructions that when processed by a processor enable the implementation of methods for on-line competition between teams of contestants as described herein. Embodiments within the scope of the invention as described in the following detailed description and claimed in the attached claims.

BRIEF DESCRIPTION OF THE DRAWINGS

The various novel aspects of the invention will be apparent from the following detailed description of the invention taken in conjunction with the accompanying drawings, of which.

DETAILED DESCRIPTION OF THE ILLUSTRATIVE EMBODIMENTS

Figure 1:
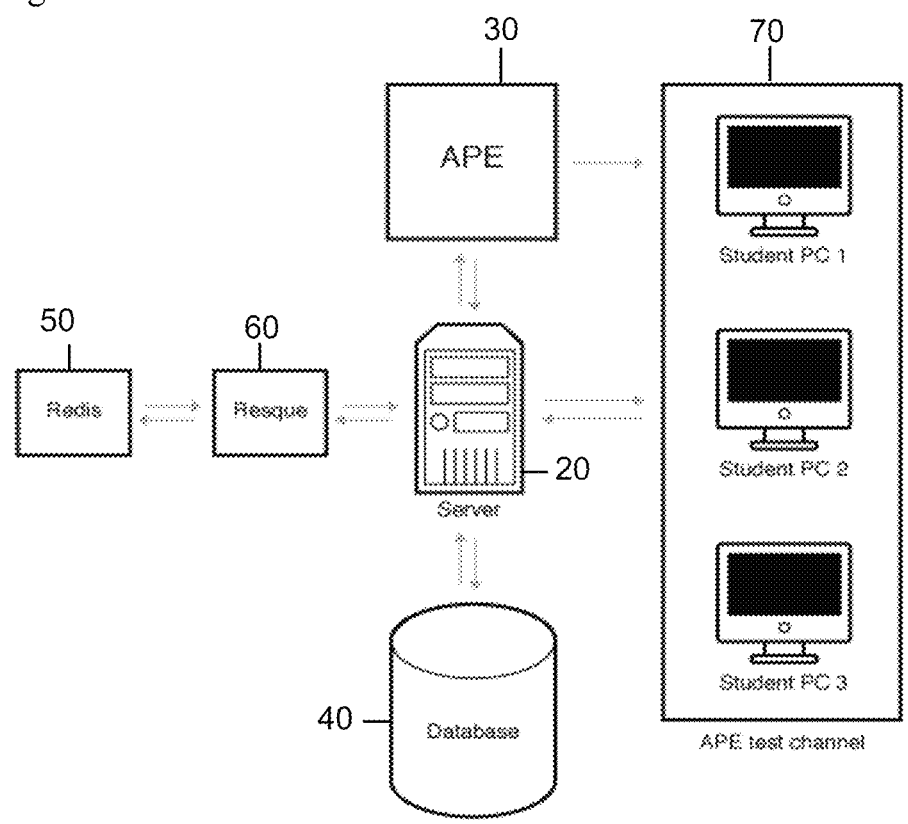
FIG. 1 illustrates a system for implementing the academic competition software of the invention.

The invention will be described in detail below with reference to FIGS. 1-115. Those skilled in the art will appreciate that the description given herein with respect to those figures is for exemplary purposes only and is not intended in any way to limit the scope of the invention. All questions regarding the scope of the invention may be resolved by referring to the appended claims.

Overview

The invention relates to a web application and a platform for same that facilitates live academic competition between teams and individuals based on multiple choice or fill-in-the-blank questions and methods for fostering academic competition between students and schools. Using the invention, a team's Coach may enter his/her team in a league of regular competition, schedule a single competition with another team, or organize a competition between the team's members by dividing the team into multiple teams. The layout and operation of the system of the invention will be provided below. In addition to an explanation of the operation of the system in general, numerous screen shots are shown in the figures that show operation of the system from the perspectives of an Administrator, the Coach, and individual Team Member, the three relevant users of the system. The illustrated examples trace a school from when it initially enters a network including the academic competition platform of the invention ("Interstellar Network") all the way down to the Team Member's experience of the competition event itself. First, the Administrator function of creating questions and question sets is discussed, followed by adding/editing a school. Next, the creation of a league of teams is described as well as the cycle of competition that can be organized amongst those teams. Following this, the Coach's abilities are detailed, from creating a team (adding/removing members) to scheduling a competition for it (intra-team or inter-team). The Team Member's web domain is then presented, including results pages, team roster, calendar, and opponent profiles. Finally, the experience of competing over test questions, including the scoreboard that keeps track of progress, is described.

Definitions

Interstellar Network: A computer network including the academic competition platform of the invention.

Administrator: An individual and/or the company that maintains the Interstellar Network implementing the live academic competitions in accordance with the invention.

Coach: A teacher or other person responsible for a group of individuals (K-12 students most likely) who are competing as a team in the Interstellar Network.

Team Member: An individual competing on a team in the Interstellar Network.

League Play: An Interstellar term for the specific type of competition created and scheduled by the Administrator. It signifies both the organization of teams in the Interstellar Network into leagues and the schedule of competition events between pairs of them (cycles). A league cycle may last any length of time and the frequency of competition events is variable (weekly, bi-weekly etc.). Competition is always live where possible. For example, if all teams in a league set aside the same block of time to compete (e.g., Mondays 3-4 PM), then competition is always live between each pair of teams, every round. However, non-live competition is an option where logistical challenges exist: teams in the same league that do not share the same block of time may still compete by taking the exam for that round on their own. In this case, results are determined once each team has finished. In this scenario, each Team Member competes against his/her Personal Best Opponent (see definition below) since a live individual/team opponent is not available. Any team in the Interstellar Network may compete in League Play.

Pick-Up Play: An Interstellar term for the specific type of competition created and scheduled by the Coach. Pick-Up Play competition is always live. It may involve one team being split into two or more opposing teams, or one team challenging another team in the Interstellar Network. In creating the competition event, the Coach may upload his/her own questions to the system or select from questions already stored in the system. Any team in the Interstellar Network may compete in Pick-Up Play.

Interstellar Matching Team Member Algorithm: This algorithm matches all students from opposing teams for every live competition event, whether it be in League Play or Pick-up Play. Before the algorithm can be implemented, the system must first take a moving average of each Team Member's most recent scores (here score is defined as the percentage of questions answered correctly in an exam, whether in a League Play or Pick-Up Play competition event). The algorithm then matches Team Members from opposing teams as evenly as possible based on that moving average. It should be noted, however, that a moving average is only one type of input the algorithm may use. For example, most recent performance on an exam is an example of another, as is a projected performance based on trajectory. The algorithm serves a second purpose. If opponent teams do not have the same Team Member count, the algorithm creates 'N:1' matches, that is, it assigns multiple Team Members of one team to a single Team Member of the opposing team so that all Team Members from both teams have an opportunity to compete against a live opponent. In this scenario, every 'N' Team Member is matched against the '1' opponent Team Member and all the relevant pages of his/her web domain reflect this (e.g. 'Results' page). Conversely, the '1' Team Member is only matched to one of the 'N' opponent Team Members, the one closest in rank, and all the relevant pages of his/her web domain reflect this. The algorithm can minimize the number of N:1 matches for any given competition event, or leave it unlimited. It can also create N:1 matches even when the '1' Team Member is a member of the larger team. The tradeoff in each scenario is one of maximizing connections between Team Member opponents and maximizing precision in matching Team Member opponents.

Personal Best Opponent: An opponent that a Team Member will only face in League Play, and only if it is a non-live competition event. Essentially, it is a fixed score representing the Team Member's best performance to date. The system calculates this number by first searching through the Team Member's results for his/her best percentage score to date, regardless of whether it occurred in League Play or Pick-Up Play. Then, it converts that percentage to a raw score by taking into account the number of questions of the upcoming competition event, rounding down. This figure is then displayed on the scoreboard as the score to beat.

Individual Score: A Team Member's individual score is calculated by adding together the number of questions answered correctly, assigning one point to each.

Team Score: A team score is calculated by averaging the individual score of all Team Members together. Only the scores of Team Members that answered at least one question in the exam are included in this average. 'Team Score' may refer to the final score of one team or two opposing teams.

System Description

FIG. 1 illustrates a system 10 for implementing the academic competition software described more fully below. As illustrated, an exemplary embodiment of applications makes up the system 10 including the Interstellar Network server 20 that implements the academic competition software and website interface described herein, an APE server 30, a database 40, a Redis server 50, Resque library 60, and student PCs 70. Redis server 50 and Resque library 60 provide all background processing so as to keep application secondary processes executed in the background. Database 40, on the other hand, stores all data including profile information, student statistics, etc. Database 40 interacts with the Interstellar Network server 20 by database queries. Interstellar Network server 20 provides student PCs with requested data and interacts with the APE server 30 during the competitive match procedure. APE server 30 provides the ability to connect students with each other in channel and with the Interstellar Network server 20 and allows the exchange of data in real-time.

In typical web applications, a server is not able to initiate actions on a client. This is possible when using advanced, so-called comet, programming techniques (streaming, long-polling requests). In the Interstellar Network, to connect students with the Interstellar Network server 20 and with each other during an academic on-line competition, the open-source APE comet server 30 provides a bidirectional server-client data exchange in real-time. The operation of the APE comet server 30 is based on long-polling HTTP requests. When a server has no data for the client, it holds the request and waits. If data appears, the server immediately responds. The client should send long-polling requests one by one so that the server is always able to transmit data.

In an exemplary embodiment, an open-source MySQL database engine is used as persistent database 40. MySQL is one of the most reliable and powerful sql database servers based on the relational database model and allows data and data relations in the form of tables to be stored on a computer hard drive.

Redis server 50 is used to store the Resque library data. Redis server 50 is an open source, advanced key-value store and is often referred to as a data structure server since keys can contain strings, hashes, lists, sets and sorted sets.

The Resque library 60 and Resque scheduler enhances the on-line user experience by processing all time-consuming tasks in the background so that the user need not wait for task completion. For example, inviting multiple students to the team requires multiple emails to be sent. By putting email sending tasks in a background queue, the user may continue to use the Interstellar Network just after the "Add Students" button is clicked. In an exemplary embodiment, a Resque Ruby library (along with resque-scheduler add-on) is used to put arbitrary jobs in the prioritized queues or to schedule a particular job for execution at a particular time.

In an exemplary embodiment, the functionality described herein is implemented in software applications running on Interstellar Network server 20. In exemplary embodiments, the application software is implemented in object oriented programming language such as the Ruby programming language along with Ruby on Rails web framework to create the Interstellar Network functionality described herein. Ruby is a dynamic, reflective, general purpose object-oriented programming language, while Ruby on Rails is an open source web application framework for the Ruby programming language. The user experience on the client-side may also be enhanced through use of third party JavaScript libraries using techniques known to those skilled in the art. For example, jQuery is a fast and concise JavaScript Library that simplifies HTML document traversing, event handling, animating, and Ajax interactions for rapid web development. In addition, the Raphael JavaScript Library makes it possible to easily create highly interactive parts of web applications. It uses SVG and VML as a base to create a vector graphics object on the web page. Each object is actually a DOM element and can be controlled using JavaScript. Raphael's goal is to provide an adapter that will make drawing vector art compatible across browsers, and easy. As far as it supports all major browsers, Raphael is an ideal graphical tool for use with the Interstellar Network server 20.

Several different deployment tools may be used to handle web requests to the Interstellar Network server 20. For example, a lightweight Nginx proxy server may be used along with a Fusion Passenger module for Ruby on Rails applications to handle web requests to the Interstellar Network server 20. All additional server processes (Resque, Redis, APE) may be monitored with God (Ruby monitoring system), which is aimed to track critical processes status and start/stop them if needed. Capistrano scripts may be used for automatic deployment.

Description of Academic Competition Software

Figure 2:
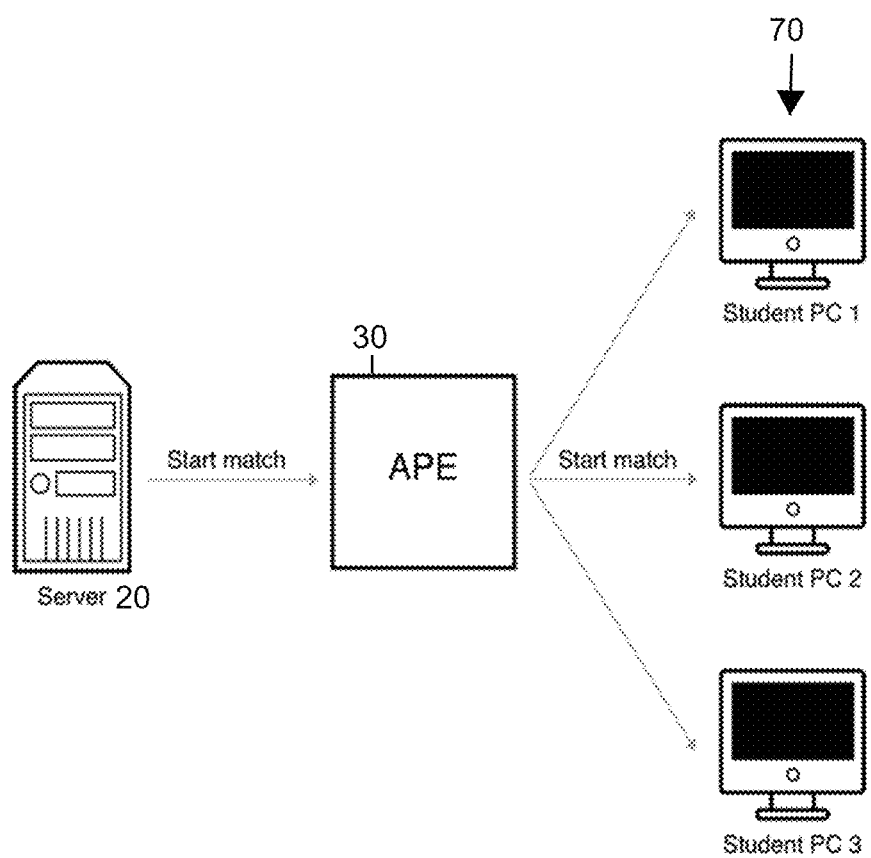
FIG. 2 illustrates the process of starting an academic competition by pushing a match event to contestant computers in accordance with the invention.

FIG. 2 illustrates the interaction between components of FIG. 1 as used to start an academic competition in accordance with the invention. When the scheduled time for academic competition or "match" arrives, Interstellar Network server 20 issues a start match command. APE server 30 simultaneously resends the start match command to each student PC 70 that has been invited to the match and is online at the time.

Figure 3:
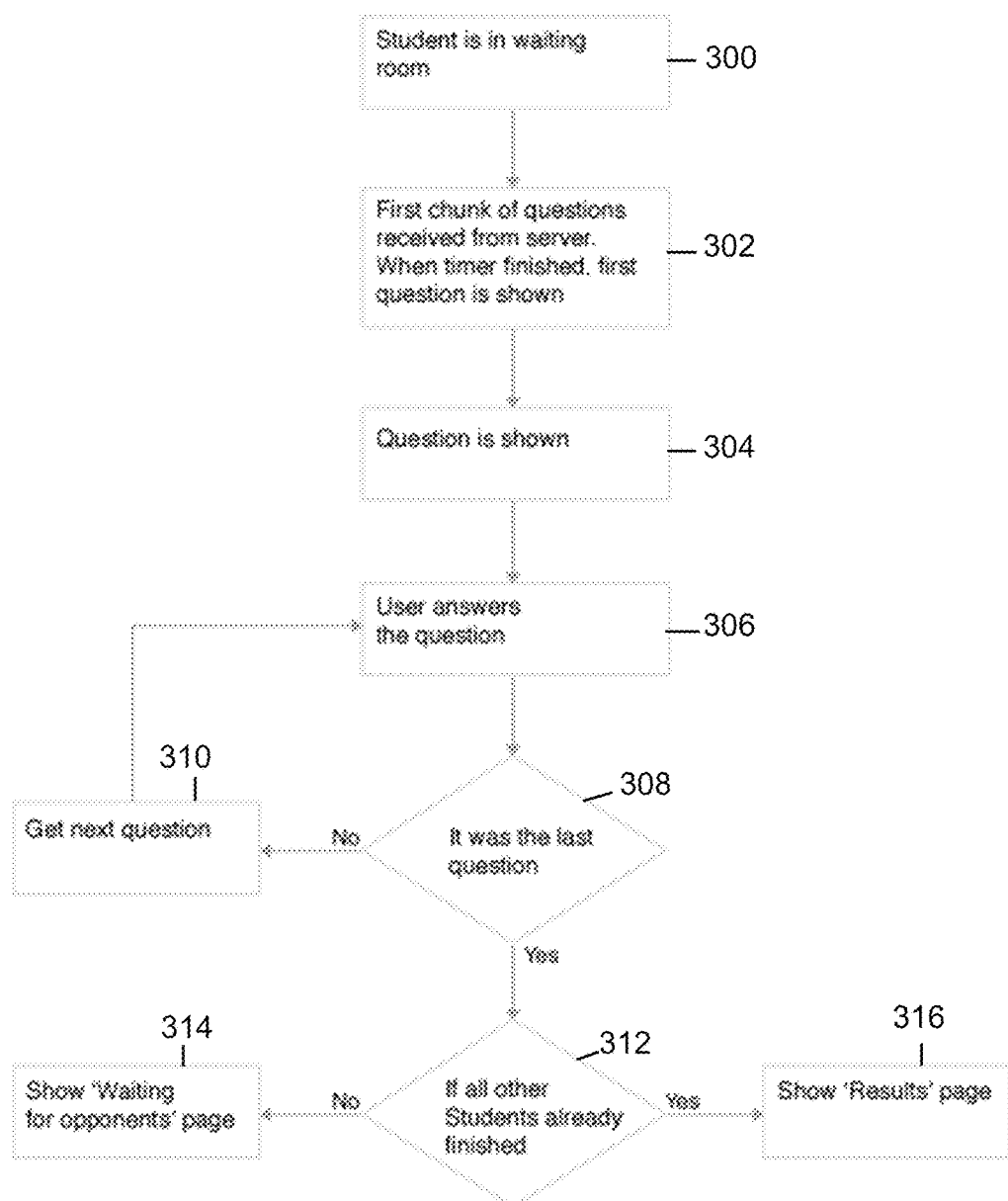
FIG. 3 illustrates the match logic implemented by the academic competition software loaded onto the Interstellar Network server to implement testing in accordance with the invention.
Figure 4:
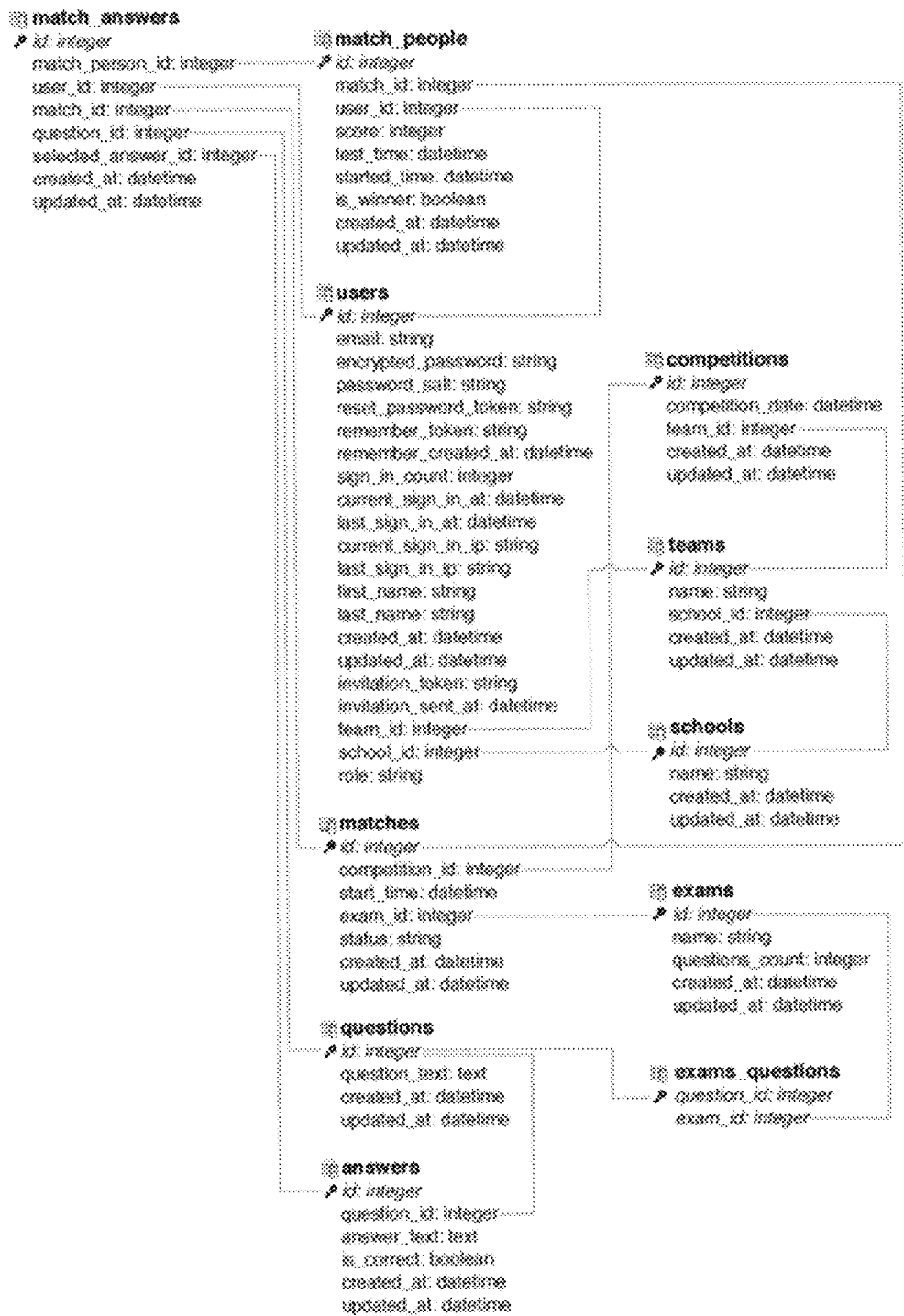
FIG. 4 illustrates the corresponding database tables for such a match using the algorithm of FIG. 3.

FIG. 3 illustrates the match logic implemented by the academic competition software loaded onto Interstellar Network server 20 to implement testing in accordance with the invention. As illustrated, students are redirected to the waiting room 30 seconds before the time scheduled for the match at step 300. At step 302, the student receives the first chunk of questions (e.g., three). Thus, when the match is started, the first few questions are already uploaded to the student's PC 70. When the waiting time has expired, the very first question is shown to the student at step 304. After the student answers the question at 306, the system checks at step 308 if that question should be the last question in the match. If not, the system retrieves the next question at step 310 so that the student may again answer the question at step 306. If the answered question is the last question in the match, the student has finished his/her match. The system checks at step 312 the status of other students to determine if they have finished answering their questions. If any other student is still working on the test, a "Waiting for opponents" page is displayed at step 414; otherwise the student will see his/her match results page at step 316. FIG. 4 illustrates the corresponding database tables for such a match.

Figure 5:
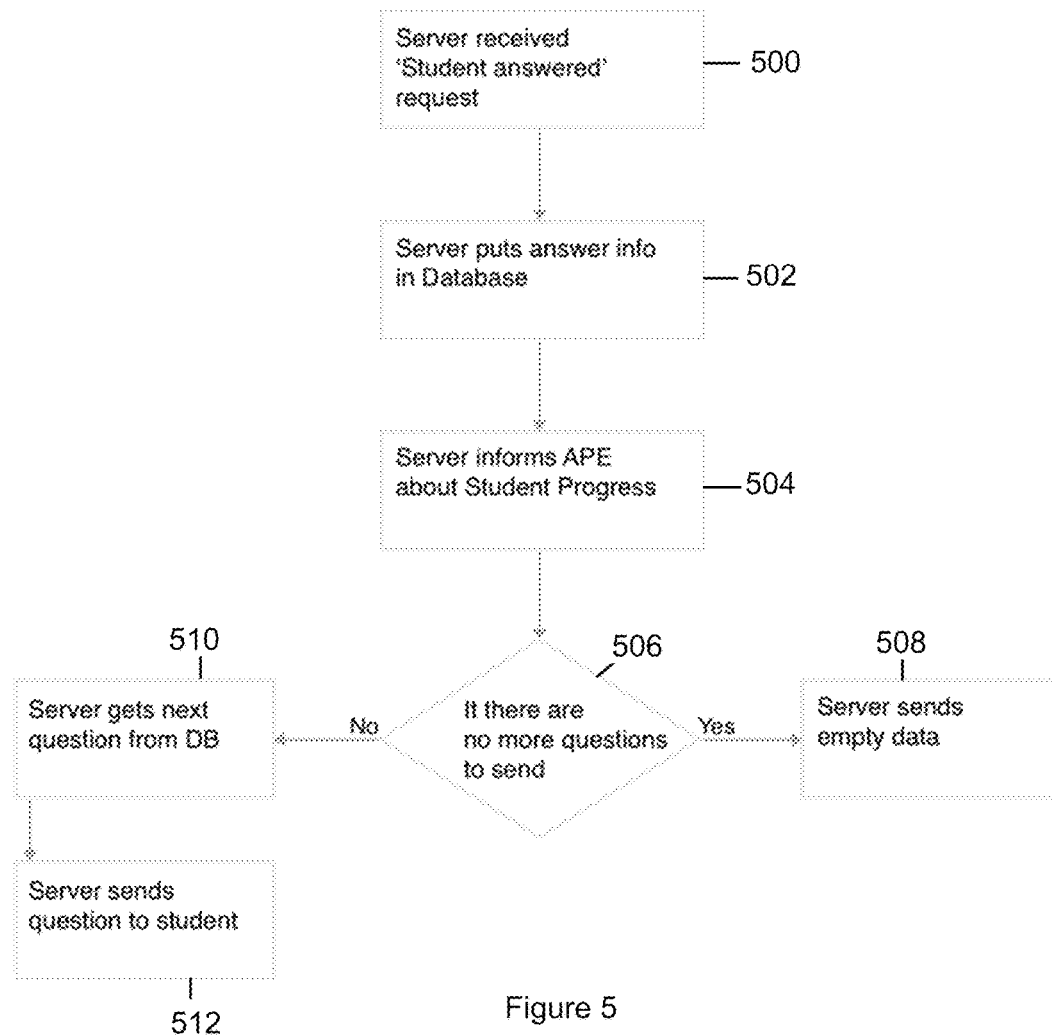
FIG. 5 illustrates the behavior of the Interstellar Network server during the match process of FIG. 3.

FIG. 5 illustrates the behavior of the Interstellar Network server 20 during the match process of FIG. 3. When the Interstellar Network server 20 receives a student answer at step 500, it stores the data into database 40 at step 502 and provides student progress data to APE server 30 (questions answered of total questions) at step 504. The system checks at step 506 if the answered question is the last one and, if so, sends empty data to the APE server 30 at step 508. Otherwise, the Interstellar Network server 20 fetches the next question from database 40 at step 510 and sends it to the student's PC 70 at step 512.

Figure 6:
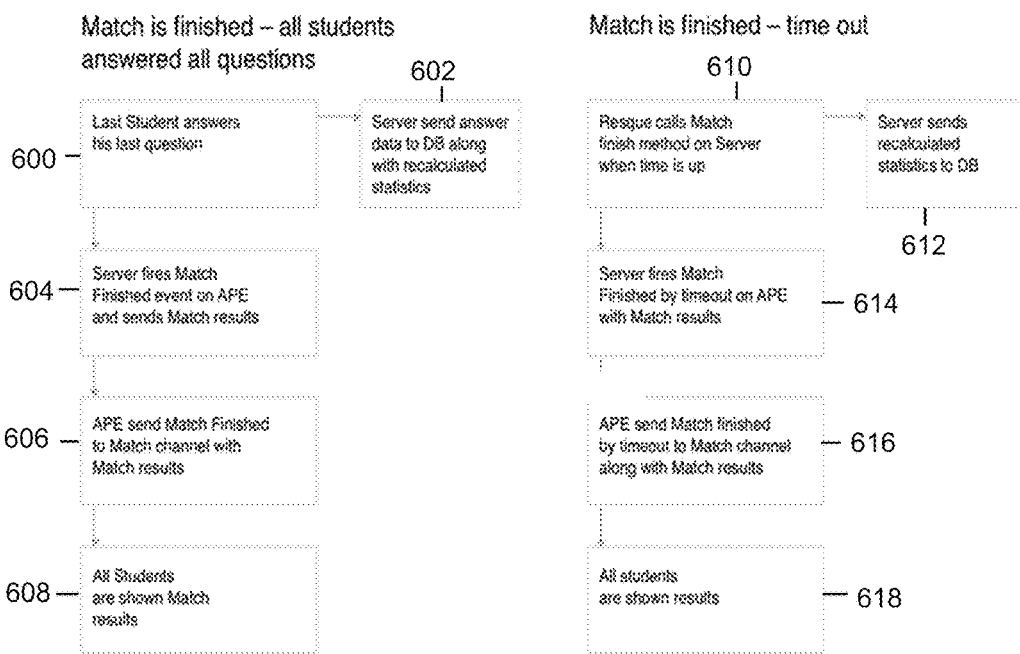
FIG. 6 illustrates the application flow for ending an on-line match in accordance with the invention.

FIG. 6 illustrates the application flow for ending an on-line match in accordance with the invention. There are two common cases: all students answered all questions or the match time is up. In the first case (all questions answered at 600), the Interstellar Network server 20 sends the last answer data to the database 40 at step 602 and gives a task to the rescue process to recalculate student statistics with new data received during the match. At the same time, the Interstellar Network server 20 sends a "Match finished" event to APE server 30 at step 604, and the APE sever 30 sends this event to all students on the match channel at step 606. After that, all participants get their match results page at step 608. On the other hand, in the second case (match time is up at 610), the Interstellar Network server 20 sends a command to recalculate statistics to the database at step 612 and fires a "Match finished by timeout" event to the APE server 30 at step 614. APE server 30 resends the event to every student on the channel at step 616, and all participants are forced to go to the match results page at 618. In the special case of an N to 1 match, each virtual student pair receives its results just after both of them are finished, not when the whole match is over.

Figure 7:
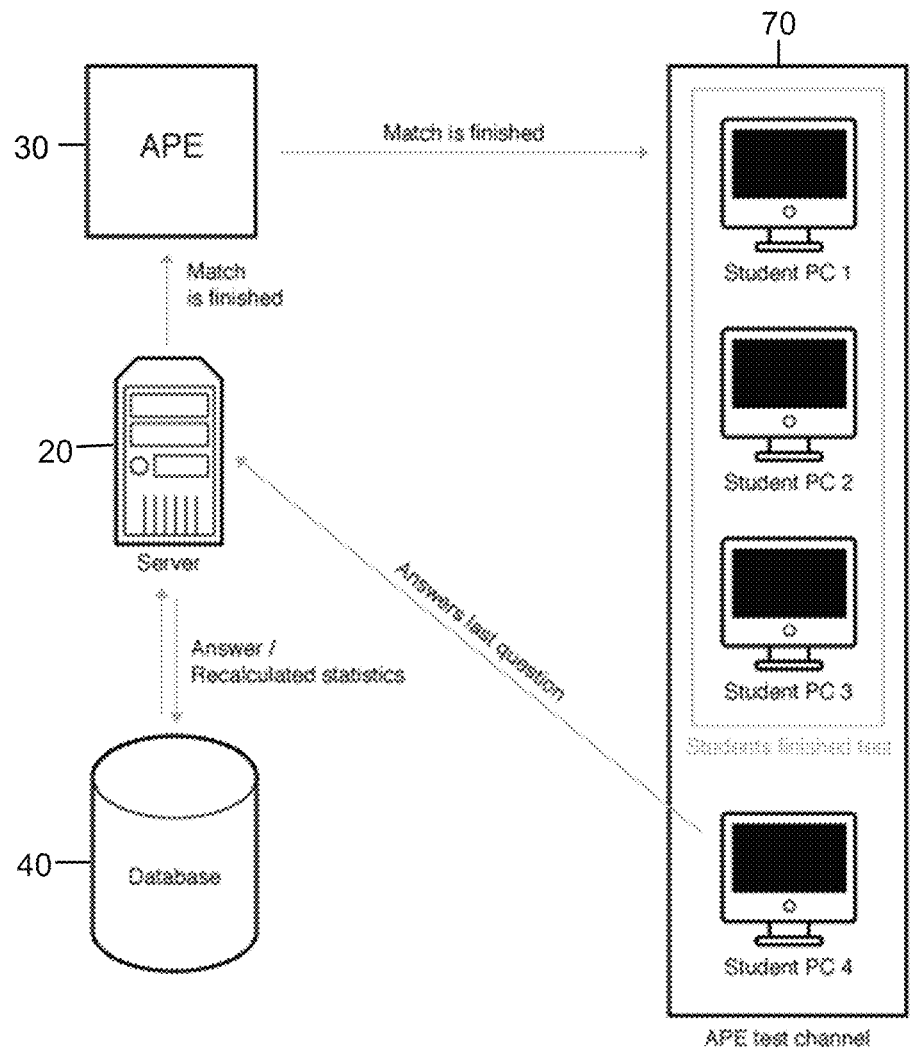
FIG. 7 illustrates the interaction of the system elements for the situation where the match is finished and all students have answered all questions.
Figure 8:
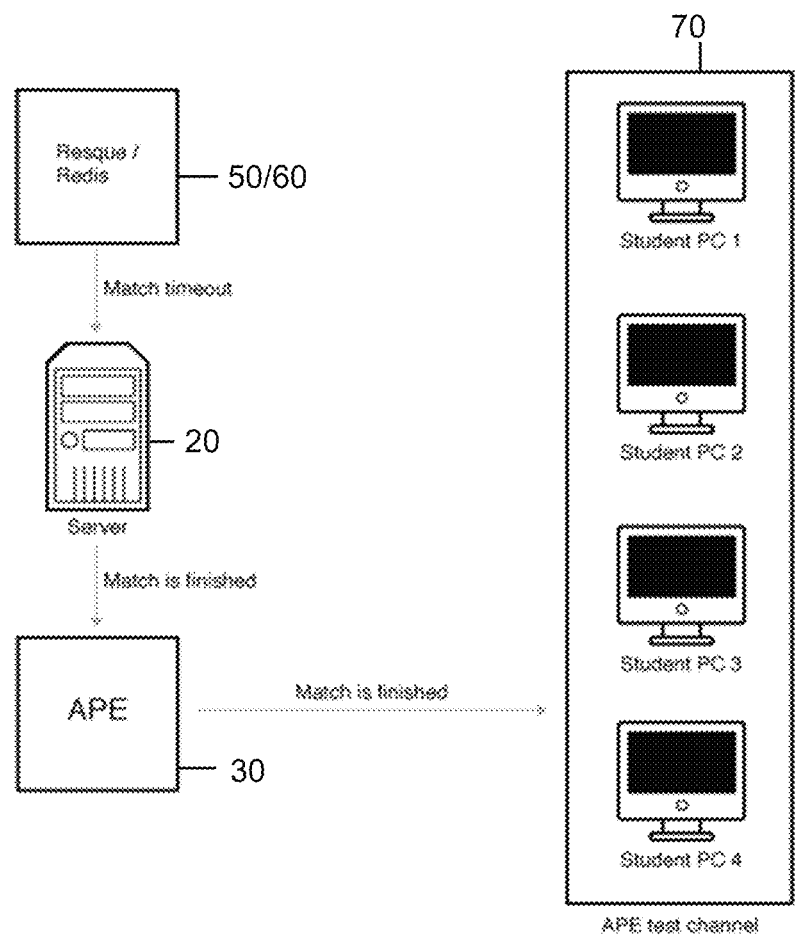
FIG. 8 illustrates the interaction of the system elements for the situation where the match is over by timer.

FIG. 7 illustrates the interaction of the system elements for the situation where the match is finished and all students answered all questions, while FIG. 8 illustrates the interaction of the system elements for the situation where the match is over by timer.

Outside of a match, the student's PC 70 may interact with Interstellar server 20 in a conventional way to send student requests and receive requested data back to the student from the Interstellar server 20.

Description of Administrative Software

The software application running on the Interstellar Network server 20 also provides for the administrative management of the Interstellar Network by handling enrollment of coaches and competitors, league creation, competition scheduling, and the like. As will be explained below, single table inheritance (STI) may be used to emulate object-oriented inheritance of the system data in a relational database. With STI, when mapping from a database table to an object in an object-oriented language, a field in the database identifies what class in the hierarchy the object belongs to. In Ruby on Rails, the field in the table called 'type' identifies the name of the class. An exemplary embodiment of the administrative software implemented herein also uses polymorphic association to provide relationships from one class to multiple classes. In particular, a polymorphic association as used herein is a term used in discussions of object-relational mapping with respect to the problem of representing in the relational database domain a relationship from one class to multiple classes.

The objects manipulated by the object-oriented administrative software application of the invention include at least the following objects:

School—represents a school in the system;
Team—represents a group of students in the system;
User—represents a person in the system (Administrator, Coach or Student based on type);
League—represents a group of Teams in the system used for League Play;
Cycle—represents a group of rounds in the system using the STI model, for example:
SchoolCycle
TeamCycle;
Round—represents a period (e.g., one week) of competitions between teams or schools (for a merged League); a team (school) can either have one competition per round or no competitions at all (in case there is an odd number of teams (schools) in the league);
RoundPair—in the STI model represents a membership of 2 teams (schools) in the Round, for example:
TeamRoundPair
SchoolRoundPair;
RoundPlayer—in the STI model, an object used for storing competition results of a particular team (school), for example:
TeamPlayer
SchoolPlayer;
QuestionsSet—a group of questions assigned to each round; and
UserMembership—represents association between users (student, coach) and teams in the system.

Figure 9:
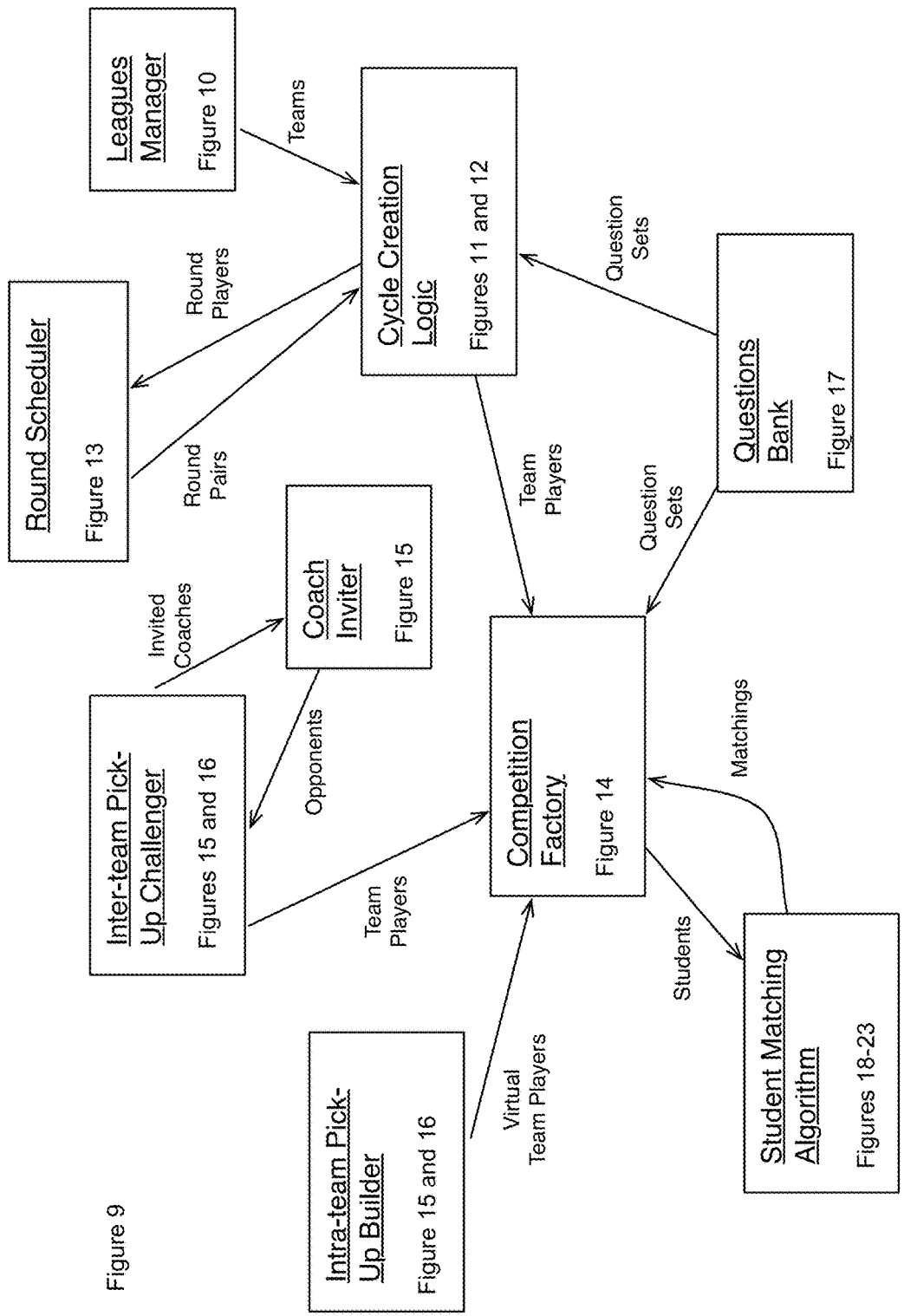
FIG. 9 provides an overview of the system components and the interactions among them in an exemplary embodiment.

FIG. 9 provides an overview of the administrative software as implemented in an exemplary embodiment. As illustrated, the administrative software includes several software modules that work together to implement the functionality described herein. As illustrated, the general administrative software diagram includes a leagues manager (FIG. 10), cycle creation logic (FIGS. 11 and 12), a round scheduler (FIG. 13), a competition factory (FIG. 14), a coach inviter, an inter-team pick-up challenger, an intra-team pick-up builder (FIGS. 15 and 16), a questions bank (FIG. 17), and a student matching algorithm (FIGS. 18-23).

Administrator Functions
Create Competitors

Figure 10:
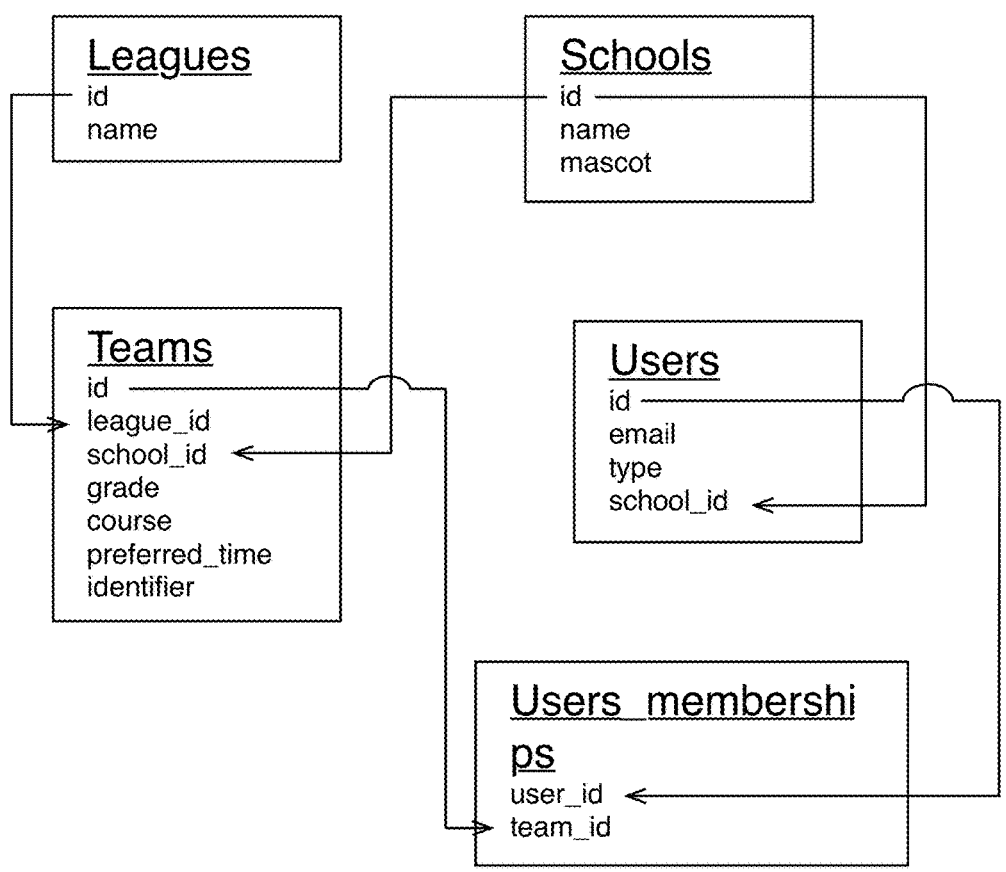
FIG. 10 displays database tables for leagues functionality.

FIG. 10 displays database tables and the relations between them. To implement many-to-many associations between User (Student, Coach) and Team, the joint table UserMemberships is used. Each time a Student is added to a Team or a Coach adds a new Team, a UserMembership object is created. When a new Team is created, the system automatically adds a letter into the identifier column of the teams table. To define this letter, systems order Teams with the same school, grade and course by identifier and pick the next unused letter as the new Team identifier.

To create competitors, the Administrator can add a Coach to a school. Once a teacher's name/email is entered into the system, an email is sent to him/her. Once the teacher accepts the invitation, he/she is now a Coach in the system. In addition, the Administrator can create a Team for a Coach by selecting an existing Coach and naming the team by its grade level and course. The system automatically appends a letter(s) to the name starting with the letter A. This, in addition to the School's name, ensures that all team names in the Interstellar Network are unique. The Administrator can only create the entity of the team. The Coach of that team must invite students by email to populate the team.

Create League

As is apparent from FIG. 10, each Team can be a member of only one League at the same time. A League can be either of a merged or non-merged type. In the case of a merged League, all teams from the same school are considered as units of their School, and the School itself stands for a player during the SchoolCycle.

The Administrator can create a league out of any teams in the Interstellar Network. For any given league, the Administrator can merge teams from one school/association into one team so that even though each "sub-team" takes the test at a different time, together they contribute to one final team score (this feature is intended to overcome logistical challenges, especially for larger class/grade sizes).

Create Cycle for League

Figure 11:
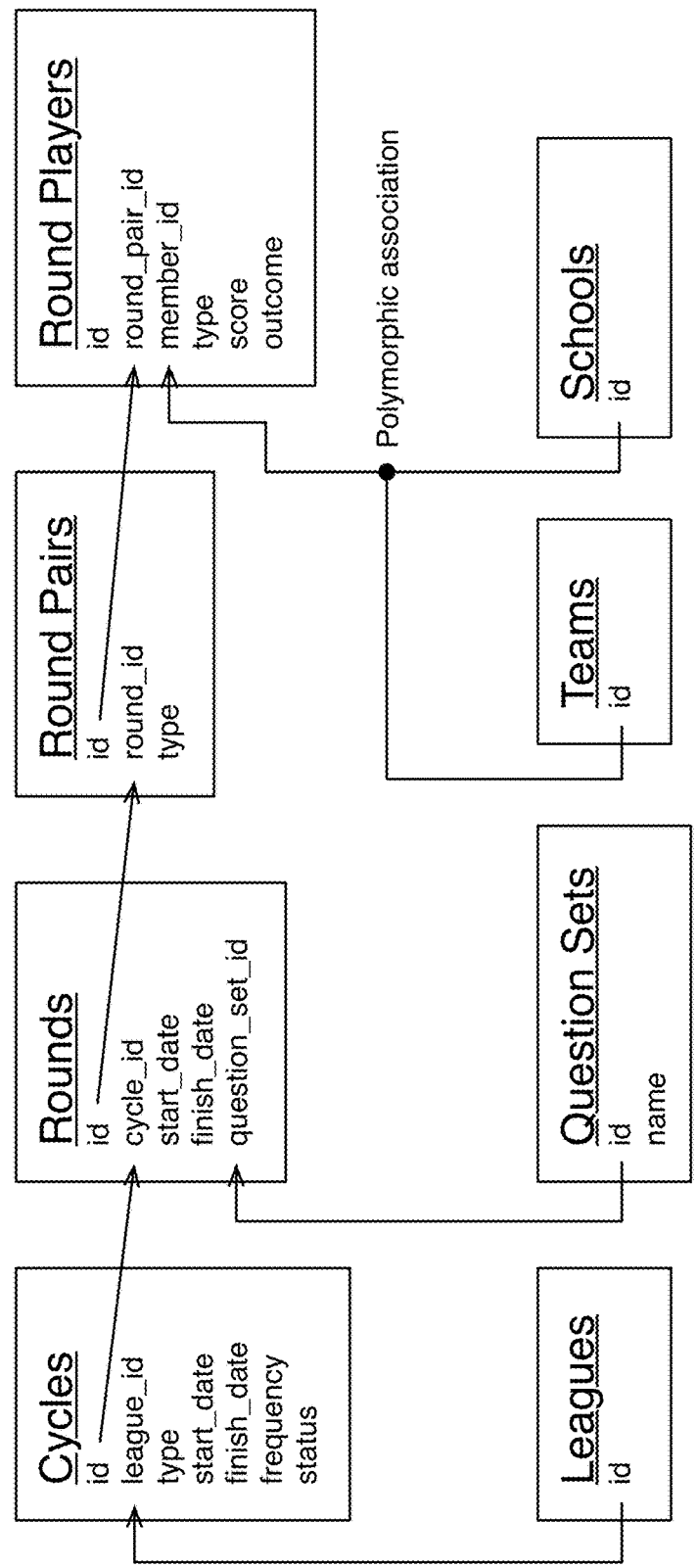
FIG. 11 illustrates the cycle database structure.
Figure 12:
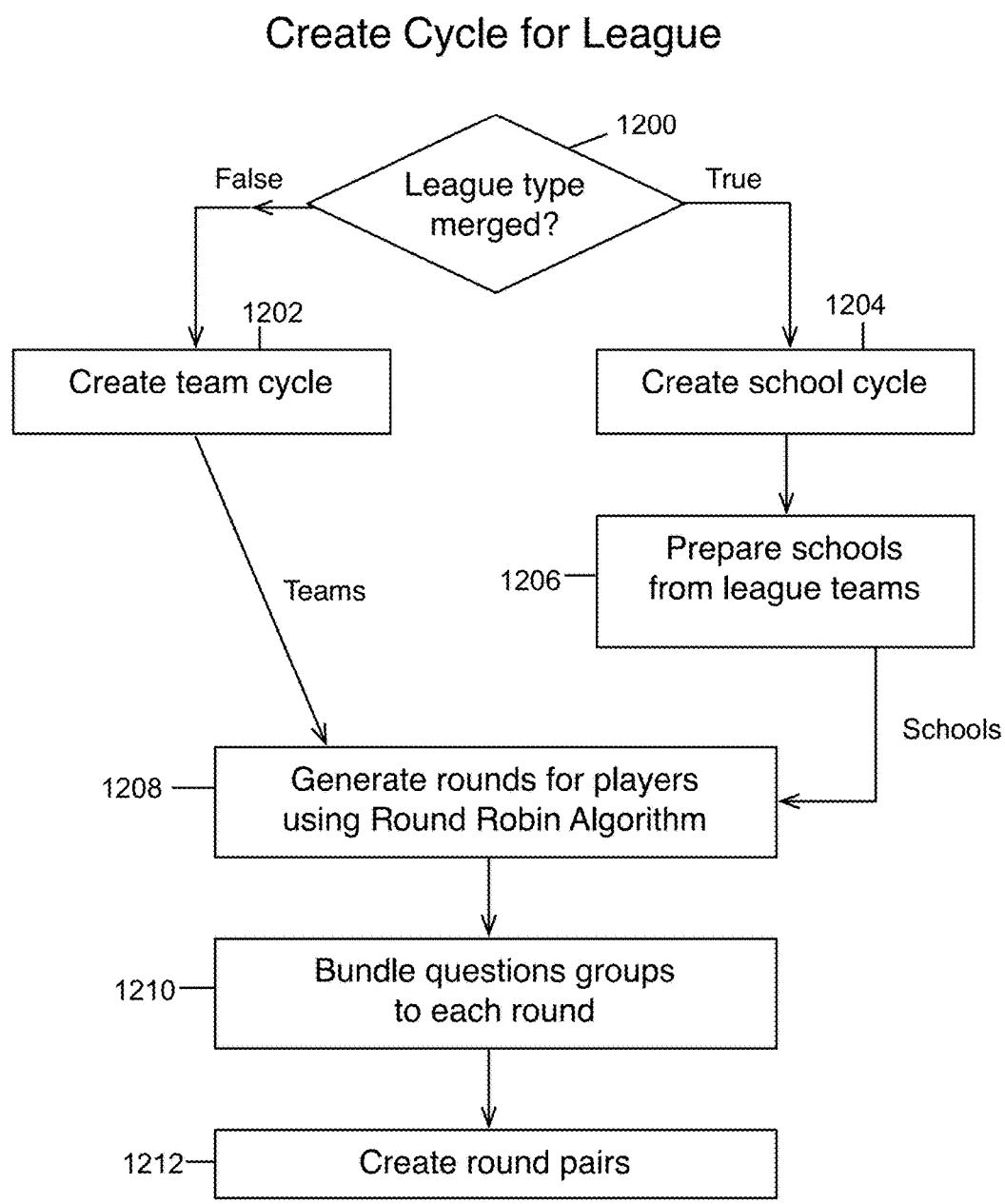
FIG. 12 illustrates the cycle creation flow for a League.

FIG. 11 illustrates the cycle database structure, and FIG. 12 illustrates the cycle creation flow for a League. To store cycle information in the system, a couple of database tables are used as illustrated in FIG. 11. Cycle Rounds are built by a Round Robin Algorithm based on start_date, end_date, and the competition frequency entered by the Administrator. Based on the League type, either Schools or Teams represent the players in the Cycle. For each pair of players, a RoundPair object is created that is connected with its RoundPlayers. As illustrated in FIG. 12, the process of creating a league includes determining whether the League type is merged (step 1200) and, if not, creating a team cycle at step 1202; otherwise, creating a school cycle at step 1204 and preparing schools from league teams at step 1206. Based on the teams or schools, the Round Robin Algorithm generates rounds for players at step 1208. The system then bundles questions groups at step 1210 and creates round pairs at step 1212.

As illustrated in FIG. 11, each RoundPlayer is connected with its member (Team or School) via polymorphic association. A separate QuestionsSet is assigned to each round and used to create exams for competitions.

Figure 13:
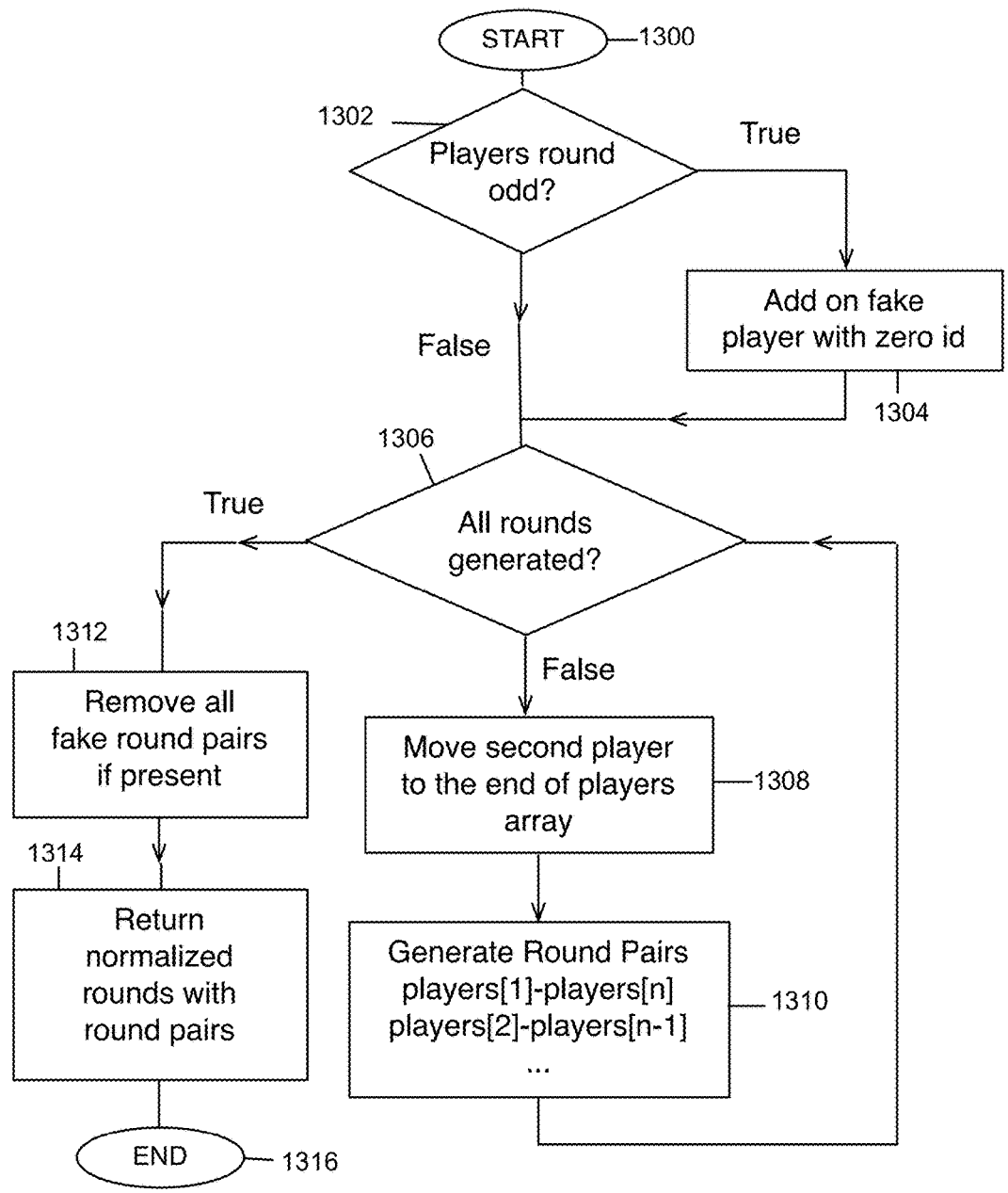
FIG. 13 illustrates a round-robin schema used to generate Round Pairs for each Cycle Round.

To generate Round Pairs for each Cycle Round, a round-robin schema is used such as that illustrated in FIG. 13. As shown in FIG. 13, the system starts at step 1300 and establishes at step 1302 if the players round is odd. If so, the system adds a fake player with a zero ID at step 1304 before the rounds are generated at step 1306. While generating the rounds, a second player is moved to the end of the players array at step 1308 and Round Pairs are generated at step 1310 until it is determined at step 1306 that all rounds have been generated. If so, all fake round pairs (if present) are removed at step 1312. Normalized rounds with round pairs are returned at step 1314 before the Round Robin Algorithm ends at step 1316.

Round Pair Competitions Scheduling

Figure 14:
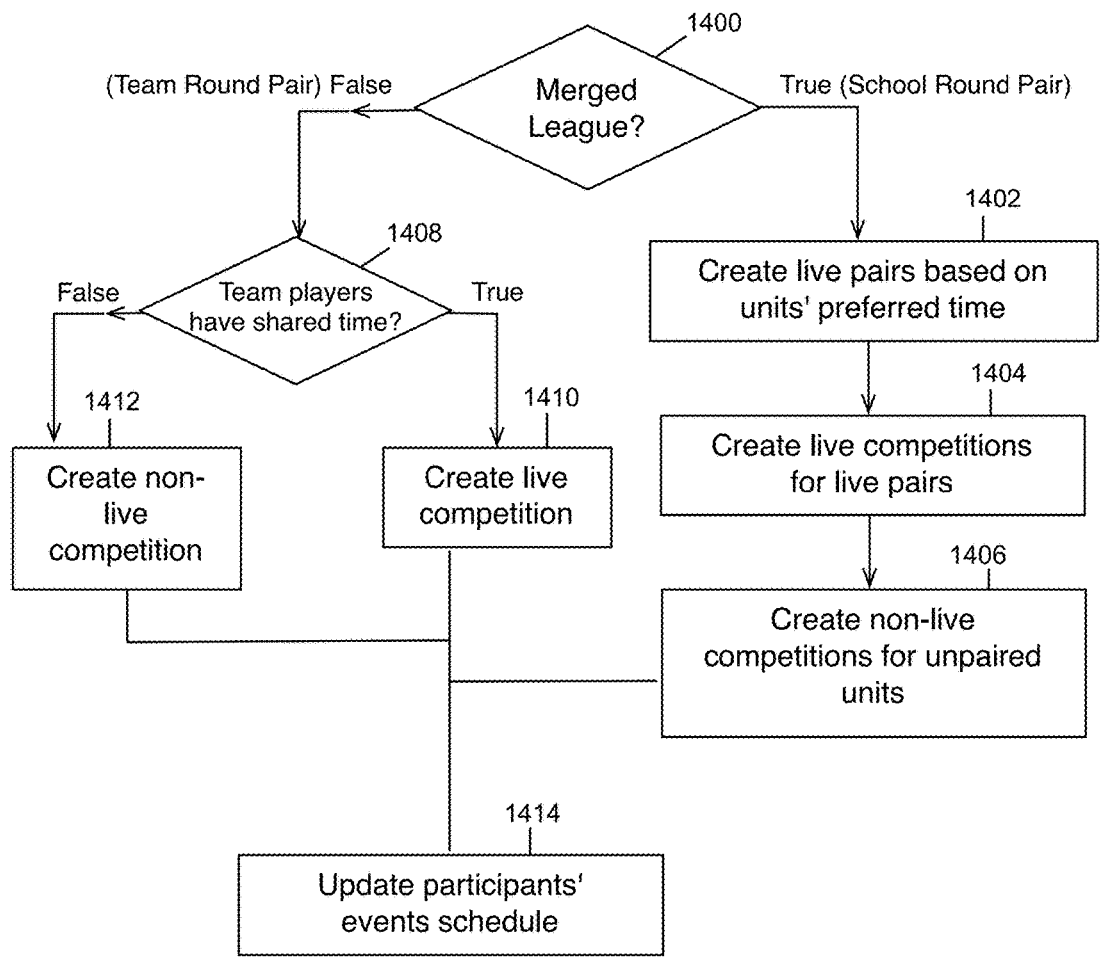
FIG. 14 illustrates an algorithm for Round Pair competitions scheduling.

FIG. 14 illustrates an algorithm for Round Pair competitions scheduling. The competitions creation logic depends on League type (merged or non-merged) at step 1400. In the case of a non-merged League, the logic is simple, namely, to create live pairs based on the units' preferred time (step 1402), create live competitions for live pairs (step 1404), and create non-live competitions for unpaired units (step 1406). Appropriate competitions are generated as type (live/non-live) based on the team's preferred time. On the other hand, in the case of a merged League, the system creates as many as possible live competitions for units at step 1408. The process iterates over a bigger school trying to find a unit with shared preferred time in the opposite school. If a live pair is found, a live competition is created at step 1410. In other cases, a non-live competition is generated for a single unit without creating a pair (step 1412). The participants' events schedules are updated at step 1414.

League Play

The Administrator creates a league by first naming it and then populating it with existing teams. As just noted, a cycle of competition can then be created for the league by establishing the start date, the end date, the frequency of competition, the length of each competition, and then assigning a question set to each round of the competition, the number of rounds being determined by the start date, end date, and frequency of competition variables. The processor employs a round robin algorithm to match pairs of teams against each other for all rounds of competition. If two teams matched against each other in a round share a common time for competing, which may be changed from round to round, the processor automatically creates live competition between them in which case contestants either compete individually (contestants are matched by the algorithm and individual score is displayed on the scoreboard) or together as a team (team score is displayed on the scoreboard). If the two teams do not share a common time for competing, then contestants compete against themselves (personal best score is displayed on the scoreboard) and the winner between teams is determined after both teams have finished the exam. Teams in a league can be merged together to form one larger team in which case scores of each member team of the merged team are averaged together to determine the final score of the merged team. The processor creates live competition where possible between member teams of the merged team and the opponent team, whether the opponent team has also been merged or not.

Coach Functions

Coach Profile

A Coach profile is a part of the general profile storage shown in FIG. 10 at the database layer. On the other hand, in the Application layer the Coach profile is defined in a separate Coach class. A Coach can write a short biography of himself/herself. This is then displayed to the Coach of every opponent team.

Create Team

The Team management database layer is described in FIG. 10. In particular, the User and Team models represent Students and Teams. UserMembership represents the relationships between them. A Coach can create a team in the same way as the Administrator. He/she may then invite students to that team. Once a student's name/email is entered into the system, an email is sent to him/her. Once the student accepts the invitation, he/she is now a Team Member in the system. Team availability is listed, which is what allows other teams to find and schedule competitions with that Coach's team.

Create a Match

A Coach can schedule a match by selecting a time, dividing his team into multiple teams that will compete against each other, or by challenging another team that is available during the time period he/she selects, and selecting a question set. A Coach also can choose to display either team score or individual score on the scoreboard for any team. This applies to every competition for that team.

Pick-Up Play Creation Flow

There are two types of pick-up play:

Inter-team pick-up play represents a challenge between teams from different schools; and Intra-team pick-up play represents a challenge between members of one team that has been divided into multiple teams.

Figure 15:
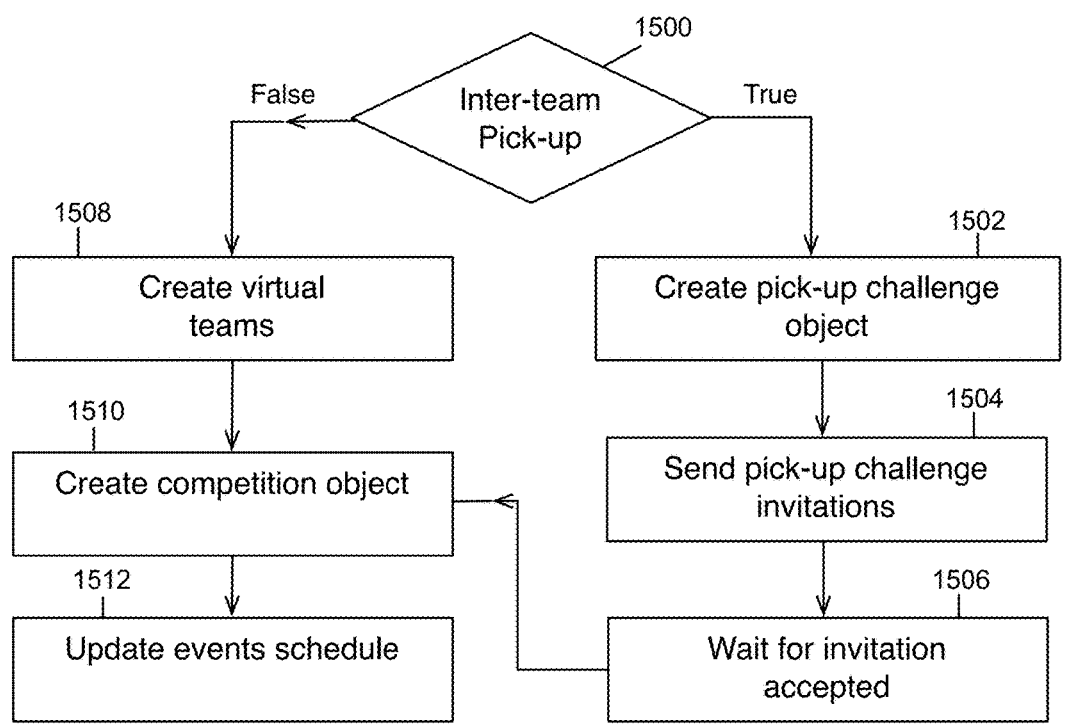
FIG. 15 illustrates how to create pick-up play for inter-team and intra-team.

FIG. 15 illustrates how to create pick-up play for both types. As illustrated, it is first determined at step 1500 that the pick-up play is inter-team. In this case, a pick-up challenge object is created at step 1502, pick-up challenge invitations are sent at step 1504, and then the system waits at step 1506 for the first invitation to be accepted. On the other hand, if the pick-up is intra-team, virtual teams are created at step 1508, competition objects are created at step 1510, and the events schedule is updated at step 1512.

Pick-Up Play Inter-Team

For inter-team pick-up play, the processor allows for the creation of a live competition event between two teams through a series of steps taken by the coach:

selecting a date, time, and length for the competition; and selecting a question set to fuel the competition; and selecting a team from a list of teams sorted by common grade level and course identity (both of which are embedded in every team's name), as well as common time availability as established by the coach of those teams.

Once all steps have been completed, an email invitation is sent to the coach or coaches of the other team or teams. The first to accept wins the challenge, the match is scheduled, and the calendar of all related participants is updated. Competition is always live between teams: contestants either compete individually (contestants are matched by the match algorithm and individual score is displayed on the scoreboard) or together as a team (team score is displayed on the scoreboard).

Pick-Up Play Intra-Team

For intra-team pick-up play, the processor allows for the creation of a live competition event within one team through a series of steps taken by the coach:

selecting a date, time, and length for the competition; and selecting a question set to fuel the competition; and dividing the team into two or more opposing teams by first deciding the desirable amount of opposing teams and then filling each opposing team with members from the original team.

The competition is always live between teams. When the coach has divided his/her team into two teams, contestants either compete individually (contestants are matched by the match algorithm and individual score is displayed on the scoreboard) or together as a team (team score is displayed on the scoreboard). When the coach has divided his/her team into 3 or more teams, contestants compete together as a team (team score is displayed on the scoreboard), only in this case one person is assigned by the coach to answer questions on behalf of the team.

Multiple Teams Pick-up Creation Flow

Figure 16:
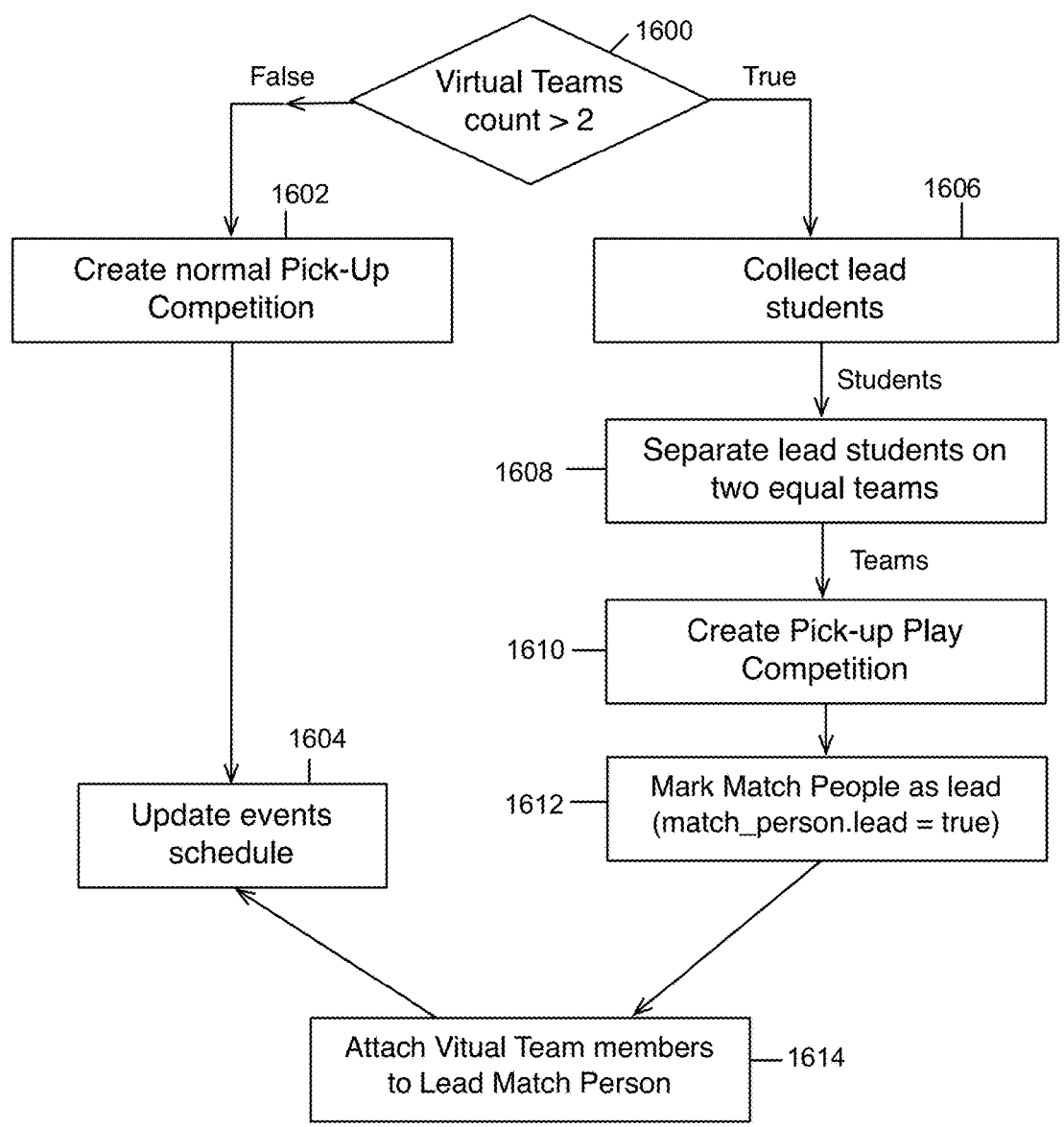
FIG. 16 illustrates pick-up play for multiple teams.

FIG. 16 illustrates pick-up play for multiple teams. As illustrated, when the number of virtual teams is more than two (step 1600), then the pick-up play creation flow becomes slightly different. Instead of creating matches for all students of the original team (steps 1602 and 1604), matches are created only for 'lead' students (step 1606) that are defined by the Coach during pick-up play creation. The lead students are separated at step 1608, and pick-up play competition for the teams is created at step 1610. At step 1612, matched people are marked as leads. The 'lead' students are responsible for posting answers on behalf of their small virtual teams. In this case, matches are created between them. Matched people for the matches are marked as 'lead'. This makes it possible to handle this particular case on the client side and show the best virtual team result on the scoreboard at step 1614.

Team Member

A Team Member can write a short biography of himself/herself. This is then displayed if he/she is matched to an individual opponent unless the Team Member elects to conceal his identity, which can be done for any team of which he/she is part. The Team Member also may choose a background image for the competition area from Interstellar Network stock photos or upload his/her own photo.

Scoreboard Area

The system calculates individual scores by assigning a point to every question answered correctly. When a team score has been chosen by a Coach, the system calculates the team average of questions answered correctly as the score (rounding up or down to the nearest whole number). The time mechanism shows where the Team Member is in relation to his/her opponent, how much time has elapsed in the test and consecutively for each question, and whether he/she is on pace to finish on time.

To implement the scoreboard, Scalable Vector Graphics (SVG) may be used. SVG is an XML based filed format for describing two-dimensional vector graphics, both static and dynamic. Each SVG element is a DOM element so each can be manipulated easily by JavaScript. RaphaelJS is an open source JavaScript library that is used to facilitate SVG. To create a scoreboard using SVG, first an html layout is created with the static elements of the scoreboard background. For example, a circular space may be spaced at the bottom and an opponent section at the top using html+css. To create the interactive part of the scoreboard, a "path" conception may be used. In RaphaelJS, a library "path" is an object that represents a graphical element on the page. Building this "path," one can manipulate an element, like setting background color, rotating, etc. Using "paths," a circular track, triangles and a clock hand may be created. For example, to rotate a clock-hand, one can use the build-in RaphaelJS "rotate" method. The same approach applies to a triangle's rotation except that the circle center point is set as the rotation origin. Different animation effects may be used to make all transformations run smoothly.

The scoreboard area is composed of both a background photo uploaded by the individual contestant or selected by him/her from a collection of photos, and a scoreboard. A clock figure appears on the scoreboard. The radius line inside the clock figure marks the proportion of time remaining in the competition. The radius line rotates around the clock figure until no time remains. Each contestant is represented by a 'chip'. Their placement in the circular 'tube' on the periphery of the clock figure tells the Team Member exactly where he/she and his/her opponent are with respect to questions already answered. The marks around the tube represent each question. As soon as the radius line reaches a mark in the tube, the area behind it fills in as grey. This signifies that the average amount of time allotted for a particular question has elapsed. The space between the leading edge of the grey area and the radius line in relation to the space between the mark at the leading edge of the grey area and the following mark represents the proportion of time that has elapsed for that particular question. As long as the contestant (represented by a chip) is even or ahead of the leading edge of the grey area, then the tube remains white, signifying to the contestant that he/she is on track to finish the competition on time. If the contestant is behind the leading edge of the grey area, the tube fills in as red, signifying that the contestant is not on track to finish the competition in time. The scoreboard can display individual score, as determined by the number of questions answered correctly by each of the matched individual contestants, or team score, as determined by taking a running average of all individual contestant scores from the respective teams and rounding to the nearest whole number. When a contestant answers a question correctly, the scoreboard pulses with a flash of light/color, signifying that the question was answered correctly. Finally, the contestant can conceal his/her identity from a competing contestant or permit the display of his/her name and photo on the scoreboard of the competing contestant.

Question Manager

Figure 17:
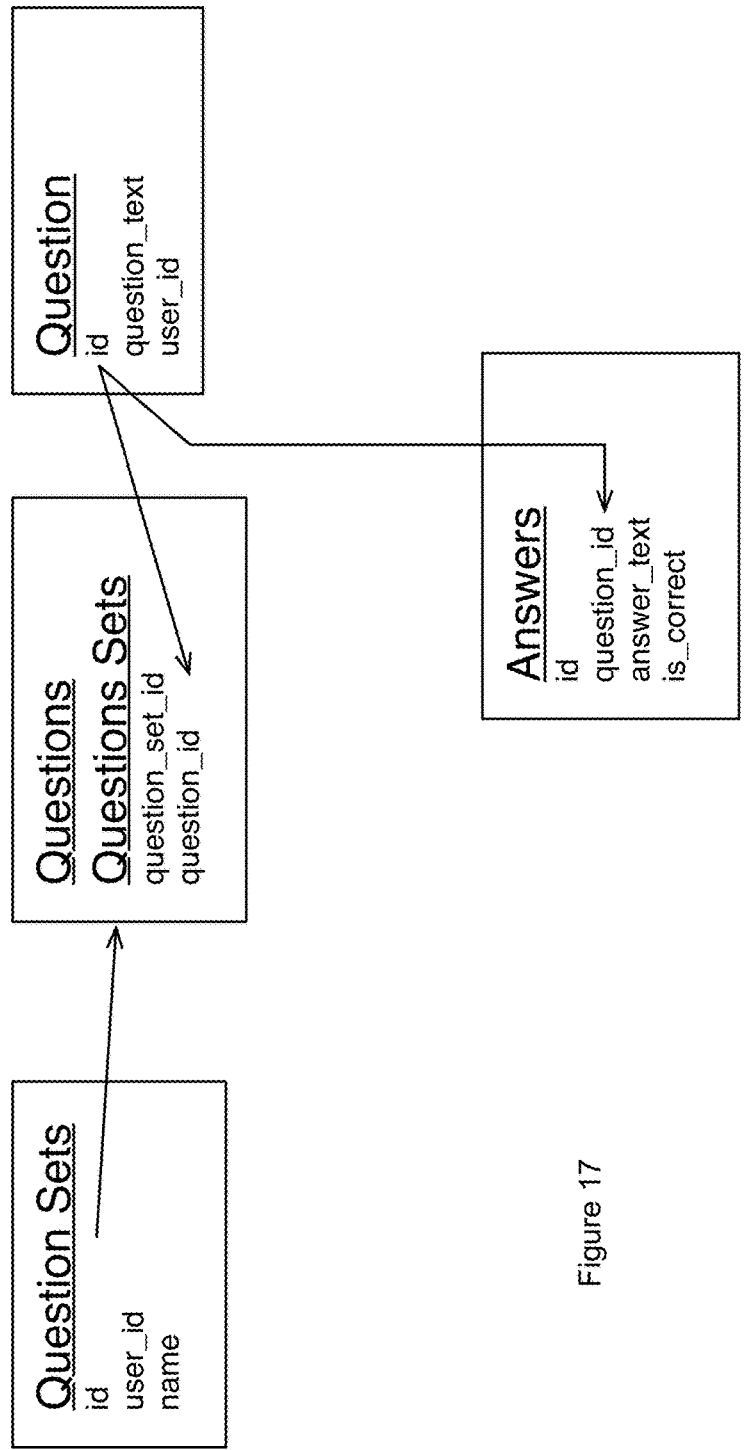
FIG. 17 illustrates a Question management database structure for a Question Manager.

FIG. 17 illustrates a Question management database structure for a Question Manager. The Question Manager is a simple schema to store different question sets that can be played during a match. The Question Manager is common for both the Coach and the Administrator. It features questions belonging to many question sets (FIG. 17). Both the Administrator and Coach can create a set of questions to fuel any competition by uploading his/her own questions (including images) or drawings from the pool of questions uploaded by Administrators/Coaches throughout the Interstellar Network community.

The Administrator or Coach may create a question set (a requirement for every competition event) by first naming it in accordance with a predetermined list of categories, adding an optional descriptor if desired, and then populating it with questions. The Administrator or Coach can populate a question set by composing questions specifically for it in a format where prompts and answers can be entered into fields, and images attached. When a question is created, it not only appears in the relevant question set, but also in a library which is organized according to the same predetermined list of categories. As such, questions submitted by other Administrators or Coaches can also be used to populate a question set. An Administrator or Coach can delete any question from his/her question sets. However, only the Administrator, or the Coach who originally composed it, can delete a question from the library. In addition, any question appearing in either a question set or the library can be edited by either the Administrator or Coach. However, the edited version only appears in the question set, not the library.

Student Matching

During the course of a league, the system automatically facilitates live competition between opponent teams (normal teams or "sub-teams") who have common 'Preferred League Play times.' The system also facilitates live competition between opponent teams in all competitions created by the Coach. The system also matches individuals using an Interstellar Matching Team Member Algorithm as will now be described with reference to FIGS. 18-23 by way of an example problem.

Example Problem:

Match the students in the two groups below such that the absolute difference of their scores is minimized.

| Group 1 | | Group 2 | |
|---|---|---|---|
| Student ID | Student Score | Student ID | Student Score |
| 1 | 82 | 1 | 26 |
| 2 | 15 | 2 | 72 |
| 3 | 62 | 3 | 18 |
| 4 | 35 | | |
| 5 | 17 | | |
| 6 | 74 | | |
| 7 | 41 | | |

Figure 18:
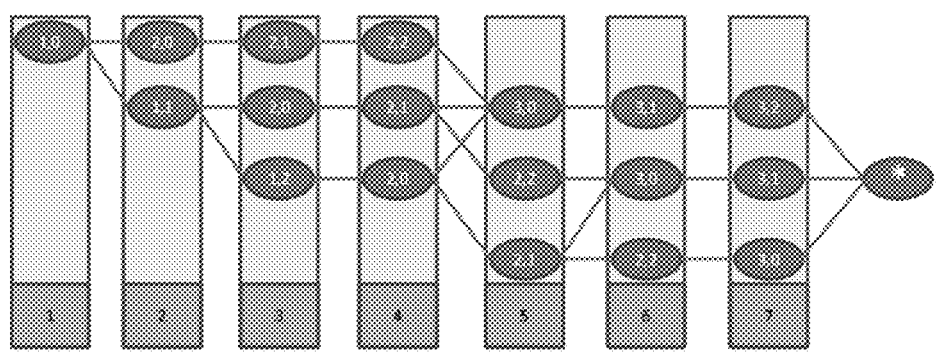
FIG. 18 illustrates a graphical representation of a sample student matching problem as a graph.

FIG. 18 illustrates a graphical representation of this problem as a graph. The stages (bars) represent each student from Group 1. The first number in each node represents a student from Group 2. The first number in each node referred to as the node number and the second number is referred to as the number of consecutive visits.

Interpretation of a Particular Path:

There are many possible paths from the first node to the last node in the graph of FIG. 18. In order to interpret a path, the score rank for each student must be defined. The students are ranked from lowest score to highest score as follows:

| Group 1 | | | Group 2 | | |
|---|---|---|---|---|---|
| Score Rank | Student ID | Student Score | Score Rank | Student ID | Student Score |
| 1 | 2 | 15 | 1 | 3 | 18 |
| 2 | 5 | 17 | 2 | 1 | 26 |
| 3 | 4 | 35 | 3 | 2 | 72 |
| 4 | 7 | 41 | | | |
| 5 | 3 | 62 | | | |
| 6 | 6 | 74 | | | |
| 7 | 1 | 82 | | | |

Figure 19:
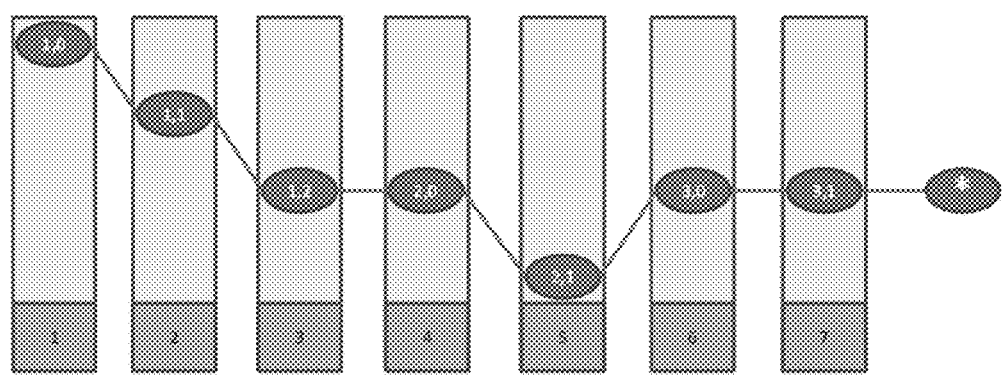
FIG. 19 illustrates a possible path through the graph of FIG. 18.

As an example, FIG. 19 illustrates a possible path through the graph of FIG. 18. Each stage is the rank of a student from the larger group (Group 1). The node number is the rank of a student from the smaller group (Group 2). The number of consecutive visits is the number of consecutive times a student from the smaller group has been assigned. This path represents the following assignment:

| Matches | | | | | |
|---|---|---|---|---|---|
| Group 1 | | | Group 2 | | |
| Score Rank | Student ID | Student Score | Score Rank | Student Score | Student ID |
| 1 | 2 | 15 | 1 | 18 | 3 |
| 2 | 5 | 17 | 1 | 18 | 3 |
| 3 | 4 | 35 | 1 | 18 | 3 |
| 4 | 7 | 41 | 2 | 26 | 1 |
| 5 | 3 | 62 | 2 | 26 | 1 |
| 6 | 6 | 74 | 3 | 72 | 2 |
| 7 | 1 | 82 | 3 | 72 | 2 |

In this path, the node (2,1) appears in stage 5. Therefore, the student with score rank 5 from Group 1 is assigned to the student with score rank 2 from Group 2. It is the first consecutive time (or second time) that this student has been assigned. The bold row is the tabular representation of stage 5. It is important to note that the graph represents all possible paths, i.e. all possible matches between students in Group 1 and Group 2.

Figure 20:
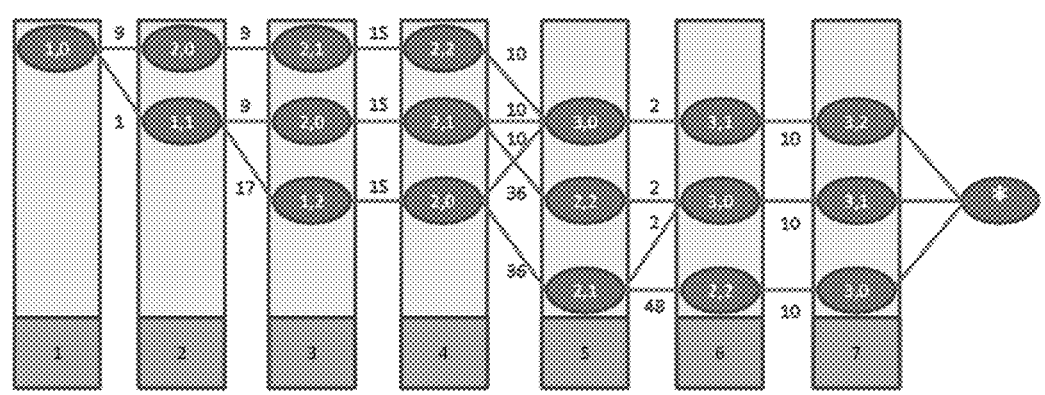
FIG. 20 illustrates a graph along with the length of each link for the matching example of FIG. 18.

Length of a Link:

The length of each link is the cost of assigning the student in the terminating node. The graph along with the length of each link is shown in FIG. 20. For example, in FIG. 20, the length of the link connecting node (2, 1) in stage 4 to (2, 2) in stage 5 is 36. The length is the cost of assigning the student with score rank 5 from Group 1 to the student with score rank 2 from Group 2. The absolute difference in their scores is 62−26=36. Again, the length is determined solely by the terminating node, i.e. node (2,2) in stage 5.

Figure 21:
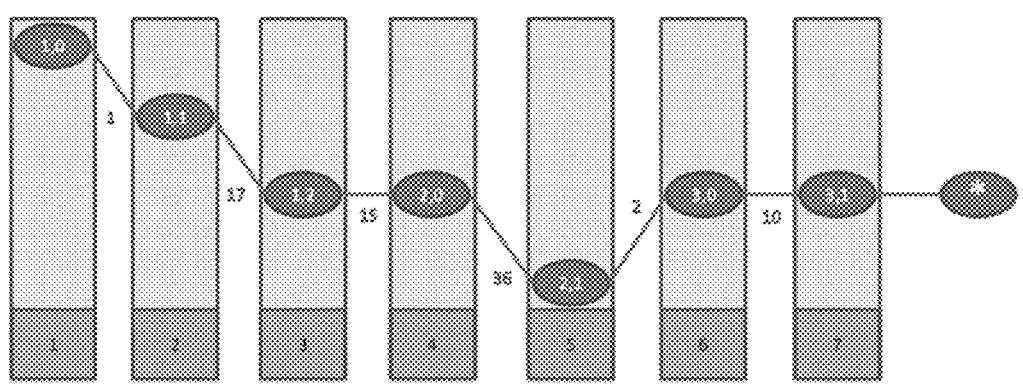
FIG. 21 illustrates a sample path with assigned lengths between each node.

Length of a Path:

The length of a path, plus a fixed cost, is the sum of the absolute differences of a particular match. For example, FIG. 21 illustrates a sample path with the following lengths assigned: The path does not include the cost of assigning node (1, 0) in stage 1. This is the fixed cost and in this case its value is 18−15=3. The total cost of this match is 3+1+17+15+36+2+10=84.

Figure 22:
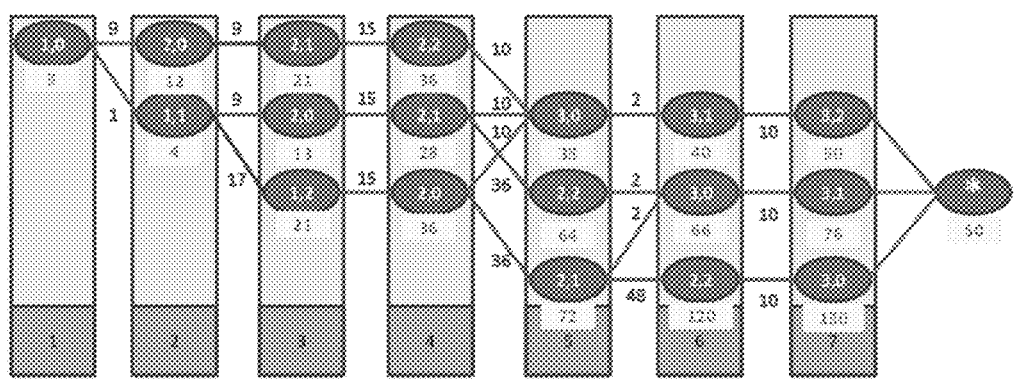
FIG. 22 illustrates a graph for the sample problem with the shortest paths displayed beneath each node.

Determining the Best Match:

A graph contains the set of all possible paths from the first to the last node and represents all possible ways to match students. Each path has a length that measures how well a particular match minimizes differences in scores. The path with the shortest length represents the best match between students of the two groups. The shortest path through the graph can be determined one stage at a time. At each stage, the shortest path to anode is the minimum over all links of the length of the link plus the shortest path of the preceding node. FIG. 22 illustrates a graph for the above problem with the shortest paths displayed beneath each node. The shortest path 3 is assigned to (1, 0) in stage 1 and is the fixed cost of assigning the lowest scoring students to one another. A shortest path of 12 is assigned to node (2, 0) in stage 2. This is the sum of the length of the incoming link, 9, and the shortest path of the preceding node, 3. The shortest path of node (1, 1) in stage 2 is calculated similarly. In fact, the shortest paths of all the nodes in stages 3 and 4 are similarly calculated in this simple example.

However, stage 5 is more complex. Node (3, 0) has three incoming nodes and a shortest path candidate is calculated for each link. The candidates for the links connected to nodes (2, 2), (2, 1), and (2, 0) of stage 4 are 46, 38, and 46 respectively. The minimum amongst these is 38 and the shortest path for node (3, 0) is assigned accordingly. Continuing through the graph iteratively, one can color links and assign shortest paths to every node. At the final stage, there will be a node for every possible consecutive visit, each with a node number equal to the number of students in the smaller group. The reason is that the highest scoring student from the larger group will always be matched to the highest scoring student of the smaller group. However, it may be that the student from the smaller group has been matched just once, or one consecutive time, or two consecutive times, etc.

Figure 23:
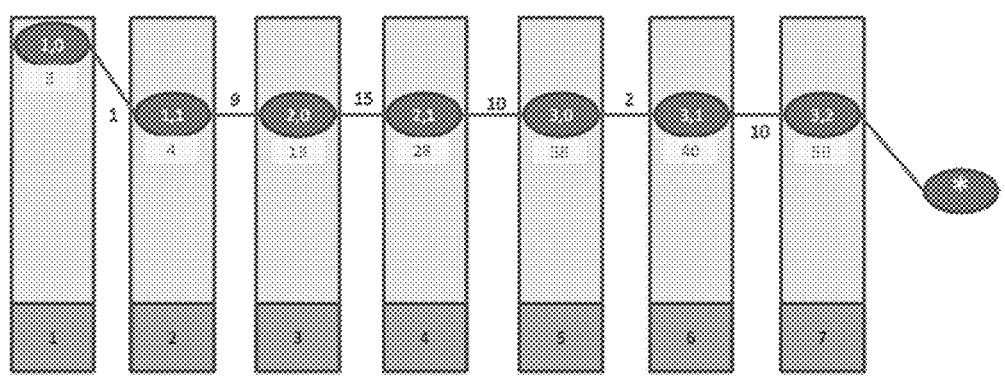
FIG. 23 illustrates the shortest path for the matching example of FIG. 18.

All links to the final node, marked with an (*), have zero length. Thus, the shortest path through the graph will be the minimum shortest path amongst those in the final stage. To determine the minimum path, one starts at the node (*) and follows the selected links back to node (1, 0) at stage 1. For this problem the shortest path is shown in FIG. 23, which corresponds to the following matches:

| Matches | | | | | | |
|---|---|---|---|---|---|---|
| Group 1 | | | Group 2 | | | |
| Score Rank | Student ID | Student Score | Score Rank | Student ID | Student Score | Score Difference |
| 1 | 2 | 15 | 1 | 3 | 18 | 3 |
| 2 | 5 | 17 | 1 | 3 | 18 | 1 |
| 3 | 4 | 35 | 2 | 1 | 26 | 9 |
| 4 | 7 | 41 | 2 | 1 | 26 | 15 |
| 5 | 3 | 62 | 3 | 2 | 72 | 10 |
| 6 | 6 | 74 | 3 | 2 | 72 | 2 |
| 7 | 1 | 82 | 3 | 2 | 72 | 10 |

The first score difference corresponds to the fixed cost at node (1, 0) in stage 1. The subsequent score differences correspond to the links of the path. Finally, the sum of all score differences is the length of the shortest path (50).

Constructing the Graph:

Constructing a graph given two groups of students is non-trivial. The graph can be constructed iteratively, stage by stage. At each stage links that connect a valid node in the current stage to a valid link in the next stage are added to the graph.

Adding Nodes to the Current Stage of the Graph:

The lower (upper) bound of a stage is the node that has the minimum (maximum) node number and number of consecutive visits. As shown in FIG. 18, the lower bound of stage 5 is node (2, 1) and the upper bound is node (3, 0). At each stage, all nodes between the lower and upper bounds of the stage are inserted into the graph unless they are dead nodes. Dead nodes are nodes that have no incoming link.

In the example problem, the lower and upper bound for stage 2 are the nodes (1, 1) and (2, 0) respectively. The nodes bounded by these nodes are (1, 1), (1, 2), and (2, 0). Node (1, 2) is a dead node because node (1, 0) of stage 1 has no link to it, so it is not added to the graph. In terms of the original problem statement, node (1, 0) of stage 1 represents pairing student 1 from the larger group to student 1 of the smaller group. Node (1, 1) of stage 2 represents pairing student 2 from the larger group to student 1 of the smaller group for a consecutive pairing. Node (1, 2) of stage 2 represents pairing student 2 from the larger group to student 1 of the smaller group for a second consecutive pairing, which is not possible. Therefore, this node is a dead node and not added to the graph. Node (2, 0) of stage 2 represents pairing student 2 from the larger group to student 2 of the smaller group.

Linking to the Next Stage:

Nodes in the current stage can be linked to the next stage in two different ways. Node (j, k) in the current stage can link to node (j, k+1) in the next stage or to node (j+1, 0) in the next stage. The links are referred to as Incrementing Consecutive Visits and Incrementing Node Number, respectively. They reflect the fact that the next student from the large group will either be matched with same student from the smaller group as the current student is (Incrementing Consecutive Visits) or to a new student from the smaller group (Incrementing Node Number). Before a link is added to the graph, it must be validated. A link is valid if the terminating node is a valid node in the next stage. Essentially, this means that the terminating node must be between the lower and upper bounds of the next stage.

Calculating the Lower and Upper Bounds of a Stage:

Lower and upper bounds are necessary to prevent impractical solutions. For example, there is no link from node (2, 0) in stage 2 to node (3, 0) in stage 3. If one were allowed to assign the third student from the larger group to the third (and last!) student from the smaller group, then the four remaining students from the smaller group would have to be assigned to the last student as well. One can imagine scenarios in which almost all of the students from the larger group are assigned to just one student from the smaller group. For this reason, a maximum number of consecutive visits is imposed on the solution.

One can determine the lower and upper bound of a stage with the following formulas for the lower bound node number (LBN), lower bound consecutive visits (LBCV), upper bound node number (UBN), and upper bound consecutive visits (UBCV):

$$LBN = \begin{cases} \lceil \frac{\text{stage}}{mncv} \rceil & \text{if } n - \text{stage} \geq m - \lceil \frac{\text{stage}}{mncv} \rceil \\ LBN + 1 & \text{otherwise} \end{cases}$$

$$LBCV = \begin{cases} (\text{stage} - 1) \% \ mncv & \text{if } n - \text{stage} \geq m - \lceil \frac{\text{stage}}{mncv} \rceil \\ 0 & \text{otherwise} \end{cases}$$

$$UBN = \begin{cases} UBN + 1 & \text{if } mncv(m - UBN) \geq n - (\text{stage} - 1) \\ UBN & \text{otherwise} \end{cases}$$

$$UBCV = \begin{cases} 0 & \text{if } mncv(m - UBN) \geq n - (\text{stage} - 1) \\ (UBCV + 1) \% \ mncv & \text{otherwise} \end{cases}$$

In these formula, n is the number of students from the larger group, m is the number of students from the smaller group, and mncv is the maximum number of consecutive visits.

Maximum Number of Consecutive Visits:

If groups of students each with 3 students were provided, then the students would be matched one to one. The maximum number of consecutive visits would be one. If one of the groups had four students, then there would be one student from the smaller group that was matched twice. The maximum number of consecutive visits would be two. The formula for the maximum number of consecutive visits is:

$$mncv = \lceil \frac{n}{m} \rceil$$

The maximum number of consecutive visits for the example problem is mncv=ceiling (7/3)=3.

Variations of Algorithm

There are two variations of this algorithm worth noting. First, the maximum number of consecutive visits does not need to be constrained to ceiling (n/m). The maximum number of consecutive visits can be any number between 1 and n−m+1. A second variation is to allow stages to be represented by not only a stage number, but by a number of consecutive visits as well. This would allow students in the larger group to be paired multiple times just as students in the smaller group are. The construction of the graph would differ only in extending the number of stages and adding their corresponding links. The solution of the graph would be identical. It should be noted that these variations can be applied simultaneously or independently.

System Operation

Figure 24:
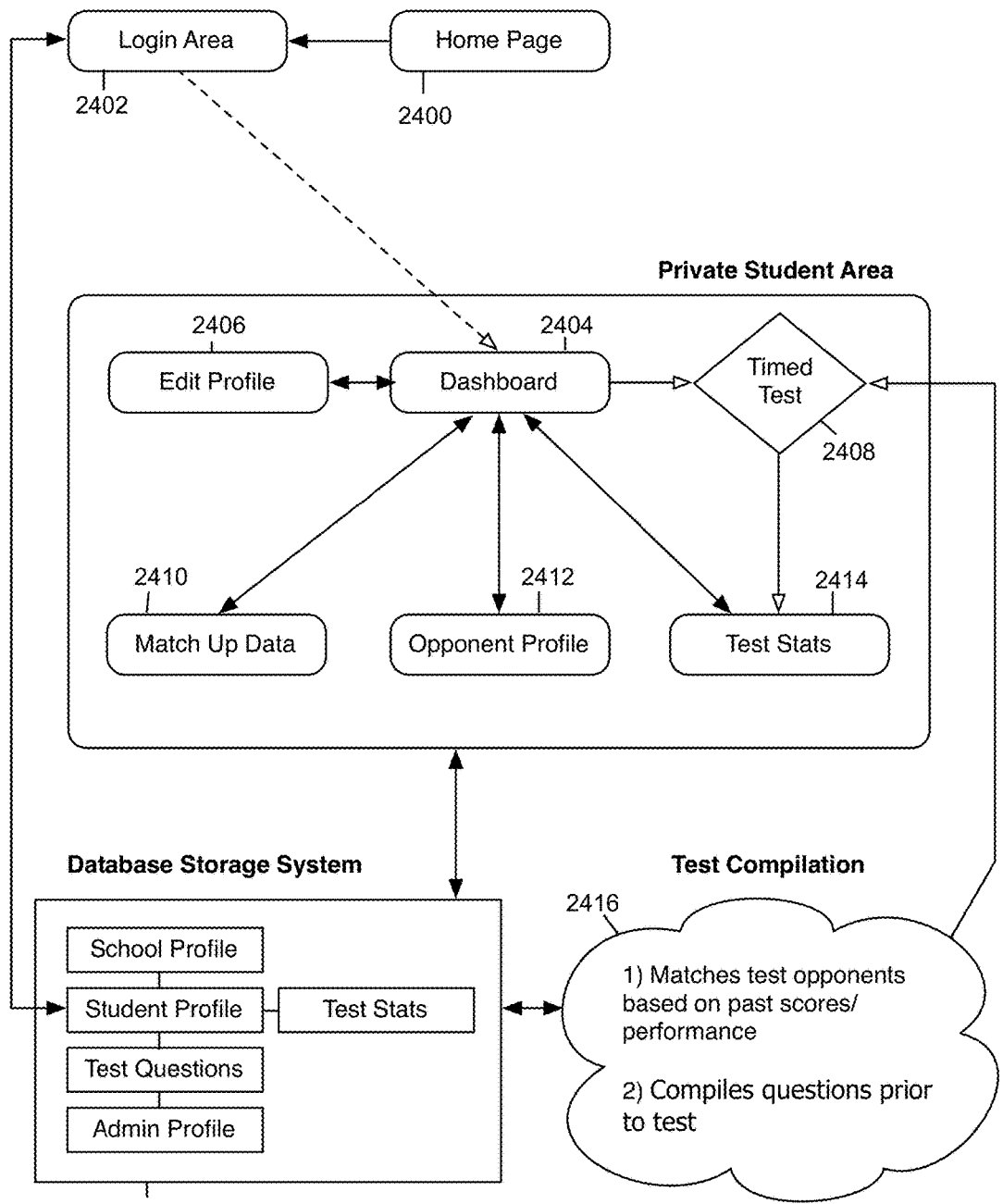
FIG. 24 illustrates a user site map of a sample website (e.g., Interstellar.com) implementing the system of the invention.

FIG. 24 illustrates a user site map of a sample website (e.g., Interstellar.com) implementing the system of the invention. As illustrated, the Interstellar Network server 20 generates a home page with a login area 2402. Upon successful login, the user is directed to the dashboard 2404 that presents web pages giving the user (student) options for proceeding. For example, the user may opt to edit his/her profile at 2406, take a timed test at 2408, match up data at 2410, review an opponent profile at 2412, or review test statistics at 2414. As illustrated database 40 may store the different profiles (School, Student, and Administrative), as well as the test questions and test statistics. Also, using the algorithm noted above, the system matches test opponents based on past test scores or performances and may also compile timed test questions based on the opponent's test history at 2416.

Figure 25:
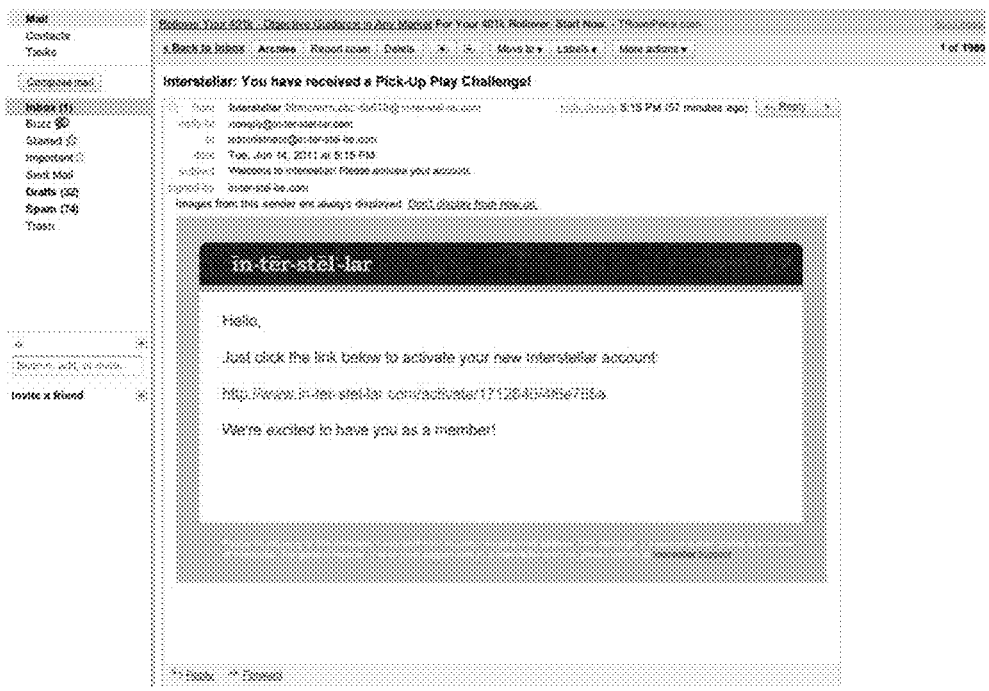
FIG. 25 illustrates an e-mail invitation from the system of the invention to an Administrator, Coach, or Team Member.
Figure 115:
FIG. 115 illustrates a page presented when an Administrator, Coach, or Team Member has just clicked 'Sign out' within the Interstellar Network application.

Operation of the academic competition platform of the invention will be described in connection with FIGS. 25-115 illustrating screen shots during access to the system by Administrators, Coaches, and Team Members. Those skilled in the art will appreciate that the screen layouts and text are merely exemplary.

Before an Administrator, Coach, or Team Member can access the Interstellar Network, he/she must first receive an e-mail invitation from the system as illustrated in FIG. 25. The e-mail address to which the invitation was sent serves as the temporary Login ID.

Figure 26:
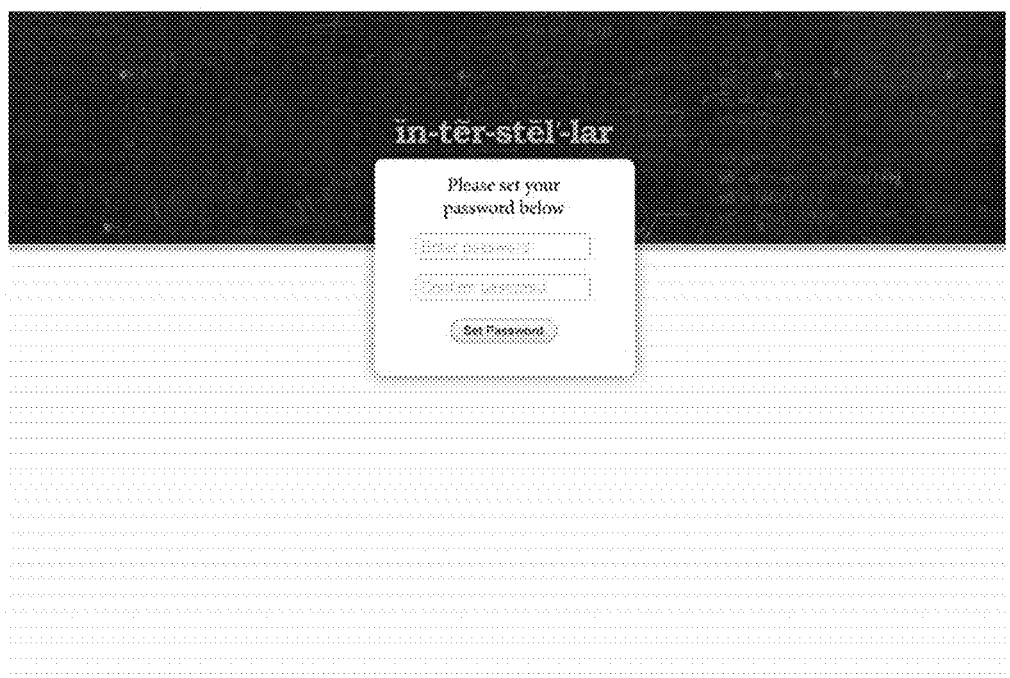
FIG. 26 illustrates a page where the Administrator, Coach, or Team Member can create a new password in order to access the Interstellar Network.

Once an Administrator, Coach, or Team Member has received an e-mail invitation from the system (FIG. 25), and the link therein has been clicked, he/she is brought to the page of FIG. 26 where the Administrator, Coach, or Team Member may create a new password in order to access the Interstellar Network. The password must be entered twice. Once the 'Set Password' button is clicked, the password is saved into the system and the user is taken to the 'Profile' page.

Figure 27:
FIG. 27 illustrates the Login screen where the Administrator, Coach, or Team Member can enter his/her Login ID and Password to access the Interstellar Network.

Once an Administrator, Coach, or Team Member has just clicked 'Sign in' on the Interstellar home page, the Administrator, Coach, or Team Member can enter his/her Login ID and Password in the Login screen illustrated in FIG. 27 to access the Interstellar Network.

Figure 28:
FIG. 28 illustrates the screen presented if an Administrator, Coach, or Team Member has just clicked 'Forgot your password?' on the Login screen.

If an Administrator, Coach, or Team Member has just clicked 'Forgot your password?' on the Login screen, then the screen of FIG. 28 is presented so that the Administrator, Coach, or Team Member may enter a valid e-mail address into the field and click 'Send password instructions.' A link to the 'Please set your password below' page (see FIG. 26) is sent to that e-mail address with relevant instructions.

Administrator Screens

Figure 29:
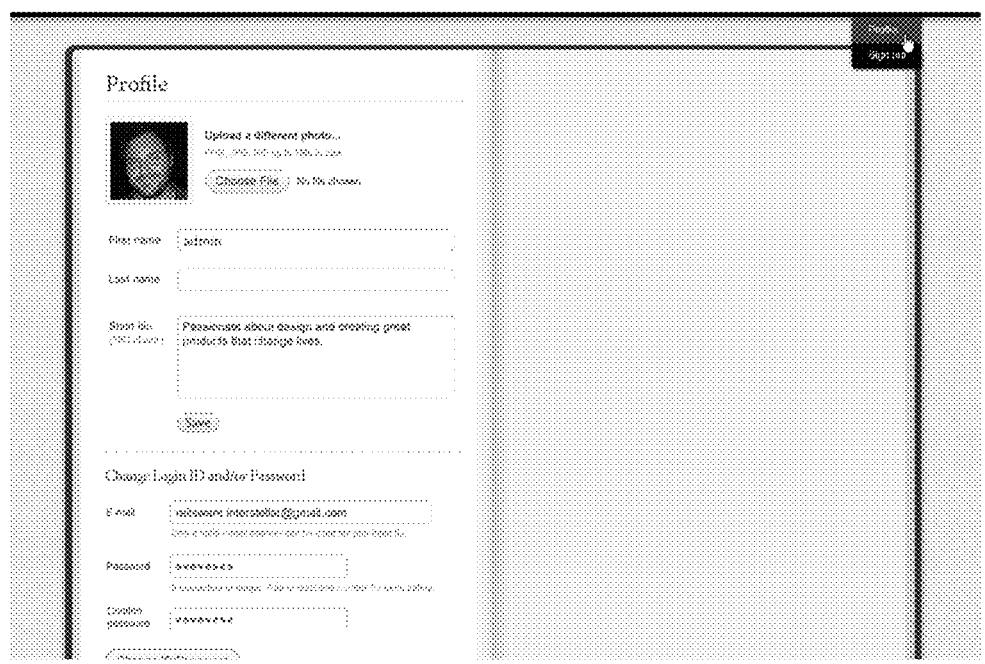
FIG. 29 illustrates the page presented when the Administrator has just clicked the 'Profile' link on his/her navigation bar.

FIG. 29 illustrates the page presented when the Administrator has just clicked the 'Profile' link on his/her navigation bar. On the left hand side of the page, the Administrator uploads a profile photo, adds/edits his/her name, or enters a brief biographical description by inputting the information and clicking the 'Save' button. The Administrator modifies his/her email address and password information by entering the information and on the right hand side of the page and clicking the 'Change ID/Password' button. Only a valid e-mail address may be used as a Login ID. The navigation bar at the top of the screen organizes the Administrator domain into 3 areas: Questions, Schools, and Leagues. When the Administrator clicks any of these three links, he/she is brought to that area of the system. The dropdown at the upper right lists 'Profile' and 'Sign out'. When 'Profile' is clicked the Administrator is brought to the present page. When 'Sign out' is clicked, the Administrator is logged out of the system and returned to the Interstellar Network home page. The photo that the Administrator uploads is used as the heading of the dropdown.

Figure 30:
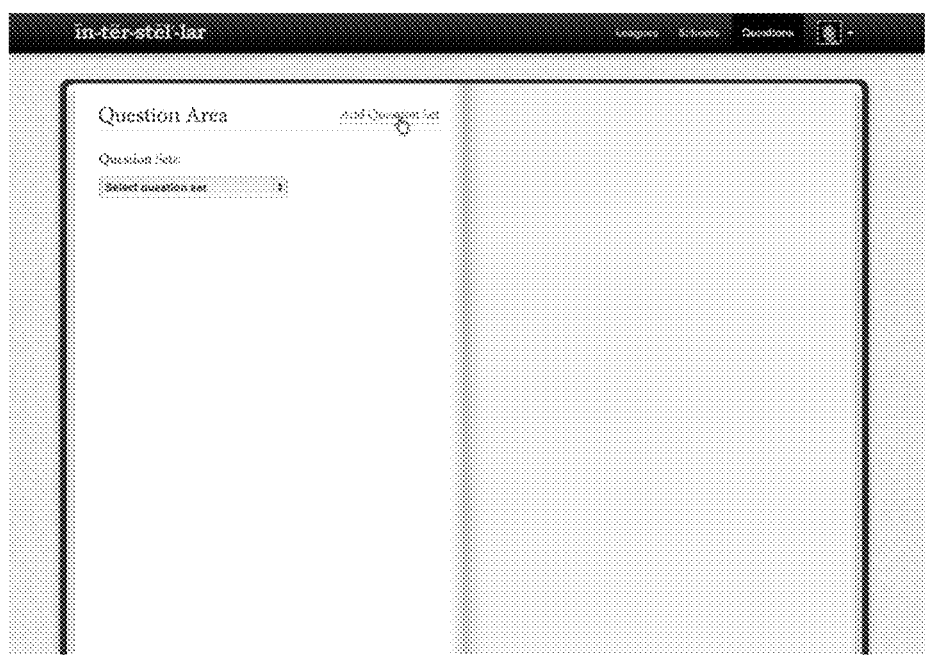
FIG. 30 illustrates the page presented when the Administrator has just clicked the 'Questions' link.
Figure 31:
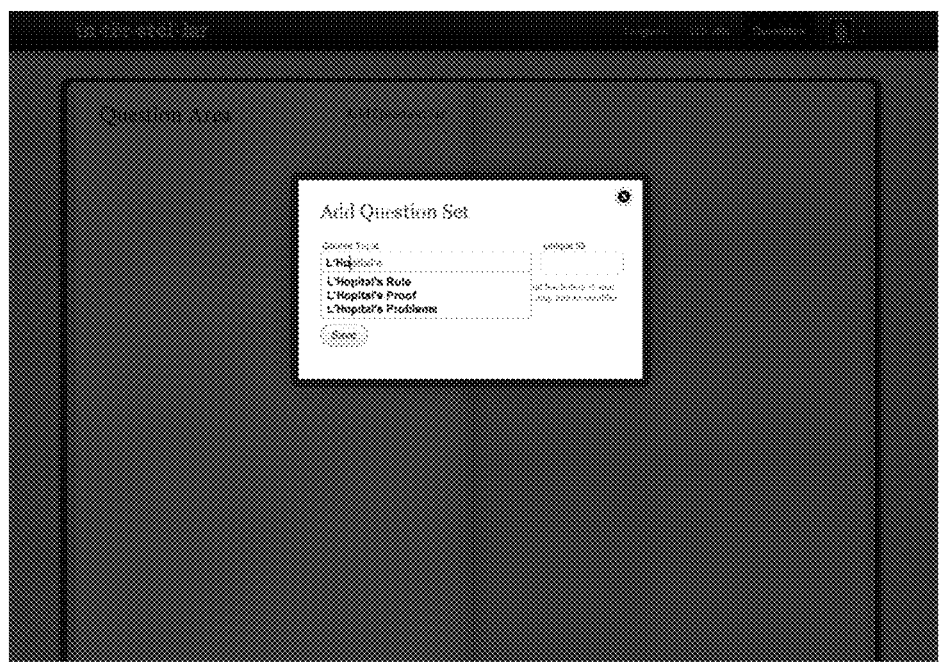
FIG. 31 illustrates the page presented when the 'Add Question Set' link on the 'Questions Area' page has just been clicked.

FIG. 30 illustrates the page presented when the Administrator has just clicked the 'Questions' link. When the Administrator clicks 'Questions', the 'Question Area' page shown in FIG. 30 appears. FIG. 31 illustrates the page presented when the 'Add Question Set' link on the 'Questions Area' page has just been clicked. When the 'Add Question Set' link is clicked, a modal appears that allows the Administrator to create a new question set. The modal is programmed with a predetermined list of course topics which assists in sorting. As the Administrator begins to enter letters in the 'Course Topic' field, the field auto-populates with the closest related match and a field appears below listing all possibilities. If the Administrator clicks a return from the list, it automatically populates in the 'Course Topic' field. The Administrator must add a unique ID to the question set in the 'Unique ID' field. Though not shown, if a unique ID is not entered, an alert box appears on the screen prompting the Administrator to do so. When the Administrator clicks 'Save' after a course topic title has been chosen, the new question set is stored in the system. Though not shown, if the Administrator enters a course topic that is not listed in the predetermined list of course topics, an alert box appears prompting the Administrator to choose from the given set.

Figure 32:
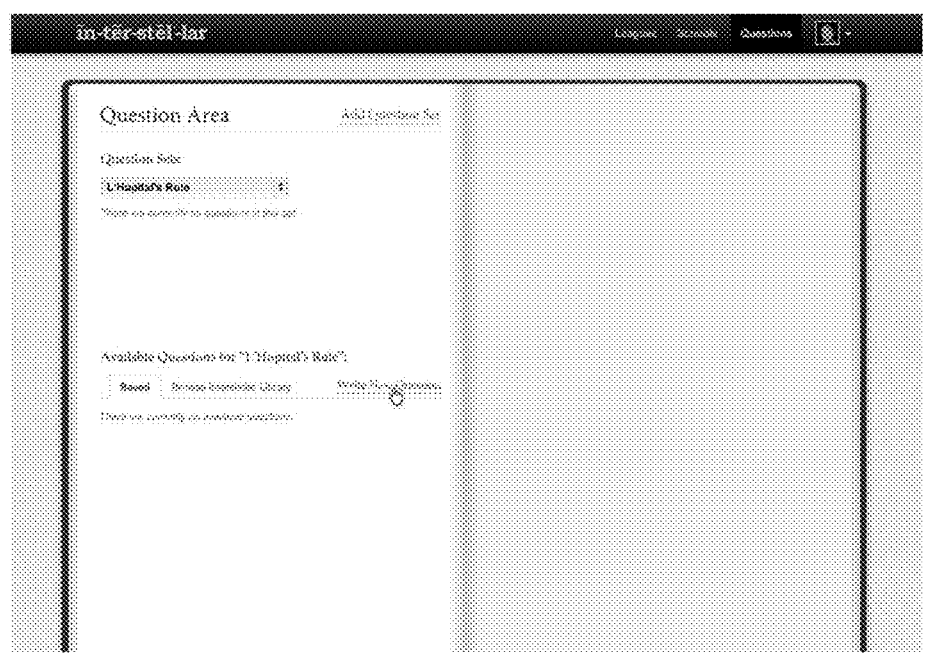
FIG. 32 illustrates the page presented when the Administrator has just saved a question set to the system.

FIG. 32 illustrates the page presented when the Administrator has just saved a question set to the system. When the Administrator successfully saves a question set to the system, he/she is immediately returned to the 'Questions Area' page which is now divided into two sections. In the 'Question Sets' section, a dropdown automatically appears listing the newly created question set. Though not displayed, when the dropdown is clicked, a list of all question sets that have been saved to the system by the Administrator appears. When a question set is selected, all the questions of that set appear in a field immediately below. As illustrated, an 'Available Questions' section appears that includes two tabs and a link. The 'Saved' tab contains a repository of questions related to the selected question set which the Administrator assembles by either writing a new question (see FIG. 33) or selecting from the Interstellar Network Library. The 'Browse Interstellar Library' tab contains a repository of questions which have been added to the system by either an Administrator or a Coach (see below).

Figure 33:
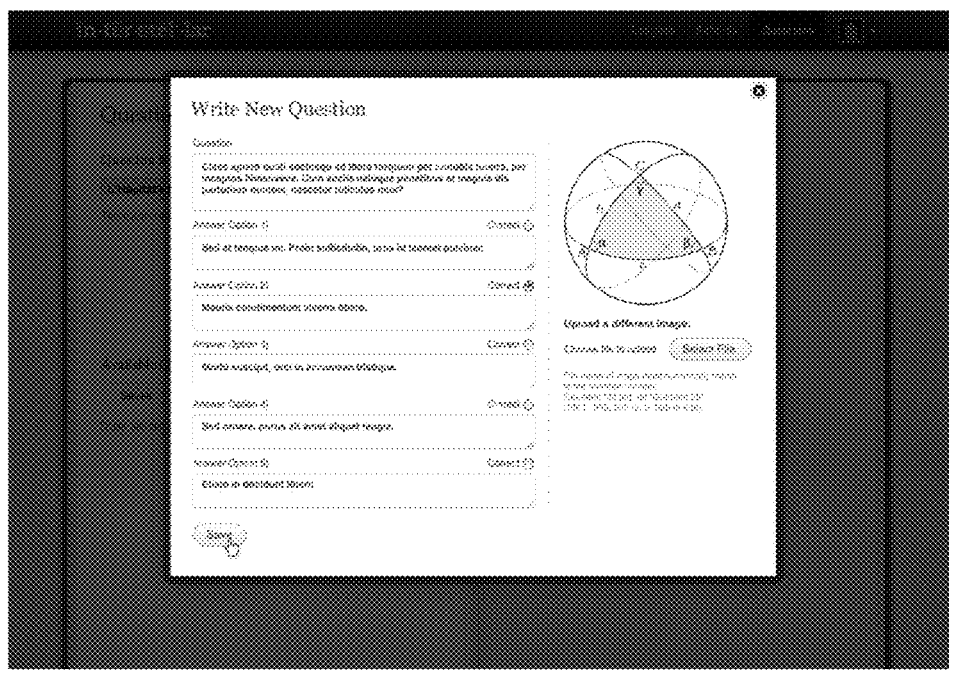
FIG. 33 illustrates a page presented when the 'Write New Question' link has just been clicked.

FIG. 33 illustrates a page presented when the 'Write New Question' link has just been clicked. When the 'Write New Question' link is clicked, a modal appears that allows the Administrator to enter a question and a list of answers to that question, and to choose the correct answer for that question. In addition, the Administrator may upload an image associated with that question. When the Administrator clicks 'Save', the question is saved to the system. The question now appears under all 'Saved' tabs with the same course topic of the question set that has been chosen. In addition, the question appears under the 'Browse Interstellar Library' tab, filed under the course topic of the question set that has been chosen (exact same questions only appear once).

Figure 34:
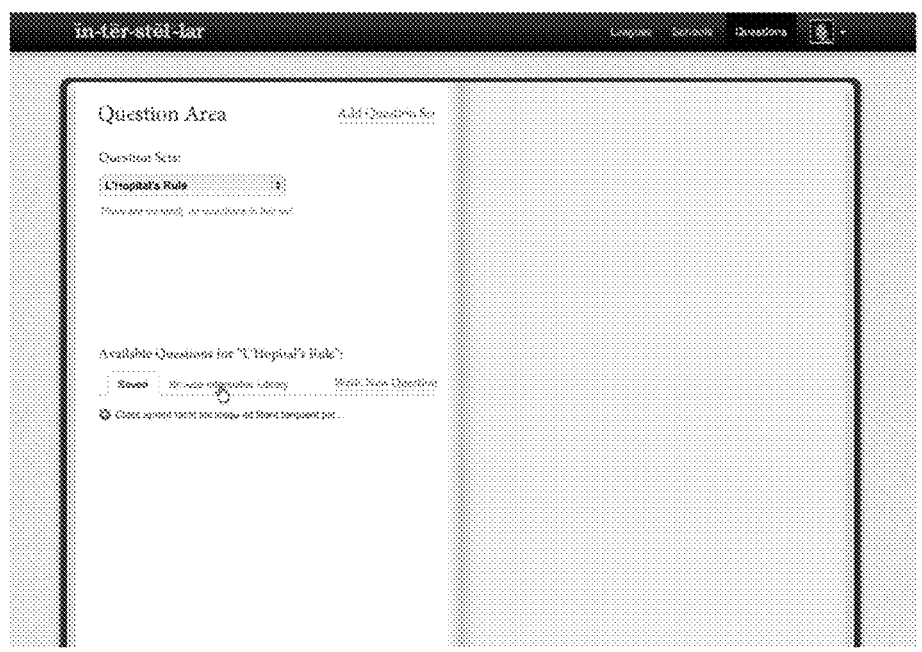
FIG. 34 illustrates a page presented when the Administrator has just saved a question he/she wrote.

FIG. 34 illustrates a page presented when the Administrator has just saved a question he/she wrote. When the Administrator saves a question he/she wrote, the question modal disappears and he/she is returned to the Question Area where the question just saved now appears at the top of the list of the tab last chosen. If the Administrator closes the modal without saving a question, he/she is returned to the tab where he/she left off.

Figure 35:
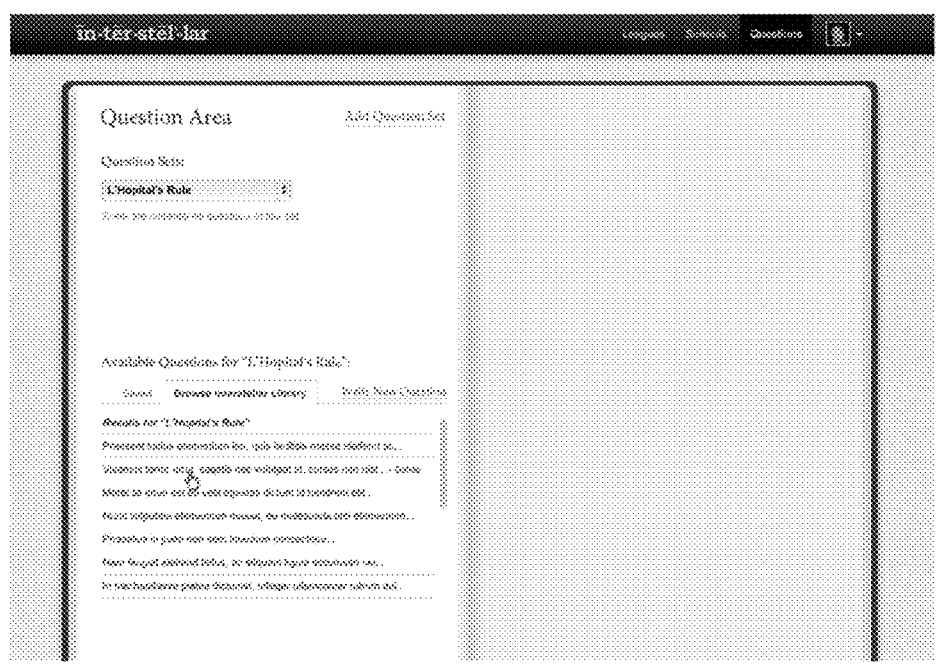
FIG. 35 illustrates a page presented when the cursor is placed above a question appearing in the 'Browse Interstellar Library' tab.

FIG. 35 illustrates a page presented when the cursor is placed above a question appearing in the 'Browse Interstellar Library' tab. As illustrated, a 'Delete' button appears. When clicked, the question is deleted from all areas of the system.

Figure 36:
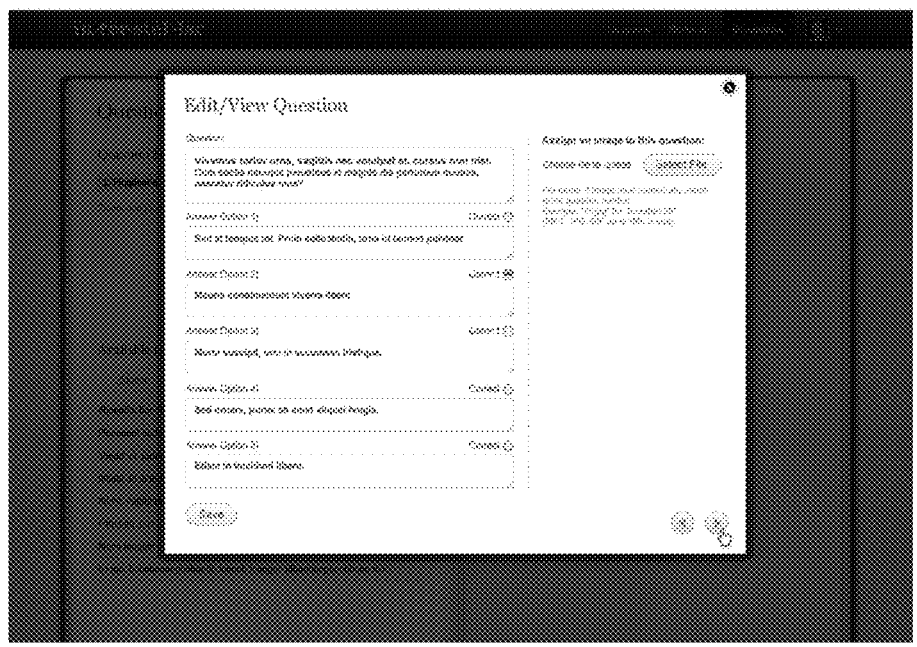
FIG. 36 illustrates a page presented when a question appearing in a question set in the 'Question Sets' section, the 'Browse Interstellar Library' tab, or the 'Saved' tab has just been clicked.

FIG. 36 illustrates a page presented when a question appearing in a question set in the 'Question Sets' section, the 'Browse Interstellar Library' tab, or the 'Saved' tab has just been clicked. When a question appearing in a question set in the 'Question Sets' section, the 'Browse Interstellar Library' tab, or the 'Saved' tab is clicked, a modal appears with the question appearing as previously saved. It is similar to the one which appears when the 'Write New Question' link is clicked, except for one difference. Here, arrows appear at the lower right corner of the modal that allow the Administrator to scroll through questions in either direction. When the Administrator clicks 'Save' on a question modal connected to the 'Browse Interstellar Library' tab, the question is saved under all 'Saved' tabs with the same course topic of the question set that has been chosen, and placed at the top of the list. The question disappears from the modal and is replaced by the next question in line. When the Administrator closes the modal, he/she is returned to the Question Area where the 'Saved' tab is automatically selected and the question just saved now appears at the top of the list. If no question has been saved, the Administrator is returned to the tab where he/she left off.

Any question may be edited by making changes and clicking 'Save', regardless of whether the question modal is connected to a question set in the 'Question Sets' section, the 'Browse Interstellar Library' tab, or the 'Saved' tab. However, the edited version appears in the 'Browse Interstellar Library' tab only if the Administrator originally created it. It appears in the remaining two sections regardless. It appears under all 'Saved' tabs with the same course topic of the question set that has been chosen.

Figure 37:
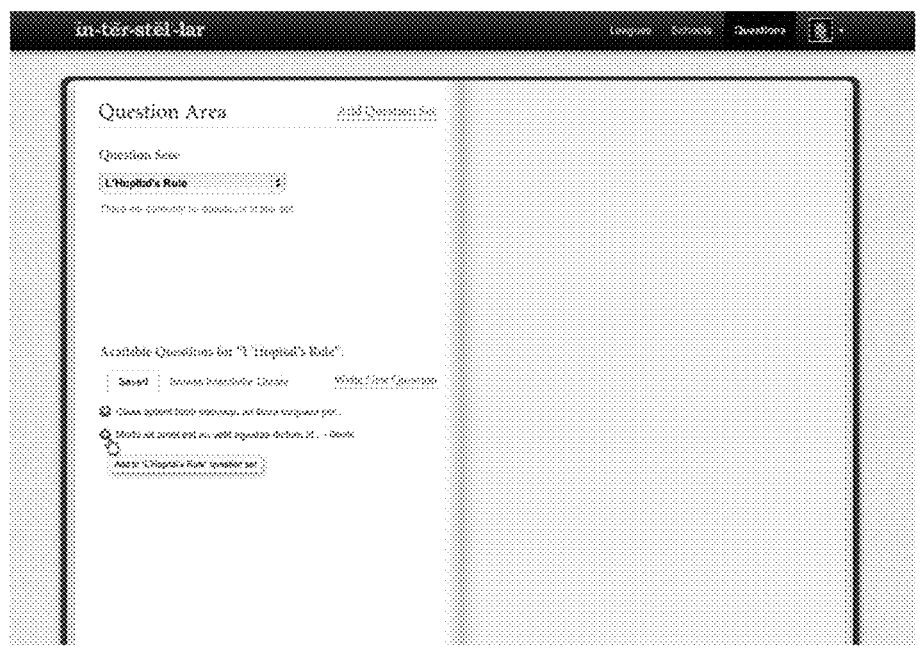
FIG. 37 illustrates a page presented when the '+' button next to a question is clicked, and the question is thereafter replicated in the 'Question Sets' section.

FIG. 37 illustrates a page presented when the '+' button next to a question is clicked, and the question is replicated in the 'Question Sets' section above. When the cursor is placed over a question, a 'Delete' button appears. When the 'Delete' button is clicked, the question is removed from all 'Saved' tabs with the same course topic of the question set that has been chosen and from the 'Question Sets' section if it appears there, but not from the 'Browse Interstellar Library' tab if it appears there. The question which had been selected from the Interstellar Library in FIG. 36 now appears under the 'Saved' tab.

Figure 38:
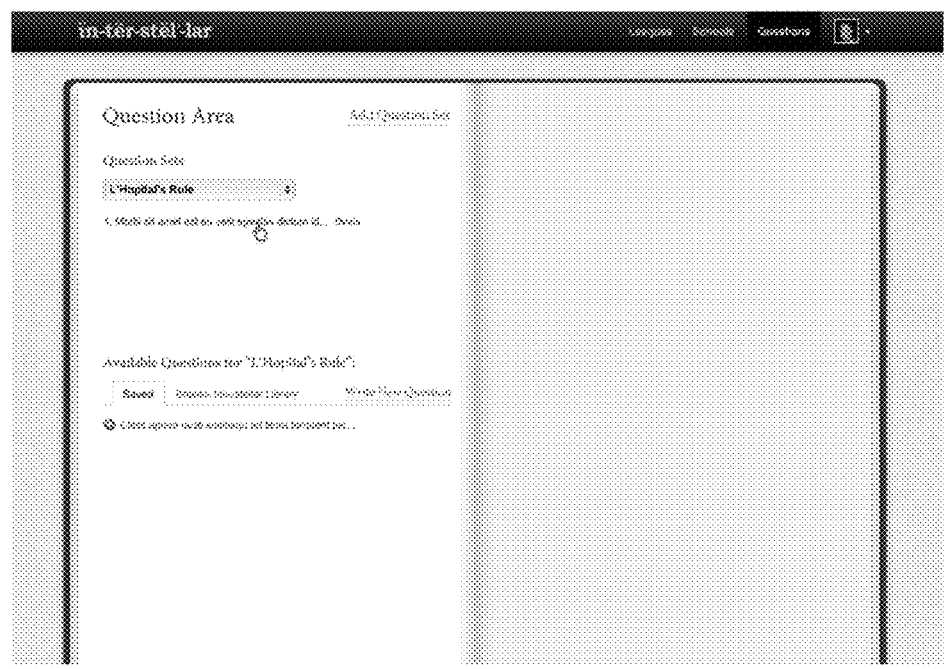
FIG. 38 illustrates a page presented when the cursor is placed over a question in the 'Questions Sets' section.

FIG. 38 illustrates a page presented when the cursor is placed over a question in the 'Questions Sets' section. As illustrated, a 'Delete' button appears. When clicked, the question is removed from the question set but not from 'Saved' tabs with the same course topic of the question set that has been chosen or from the 'Browse Interstellar Library' tab.

Figure 39:
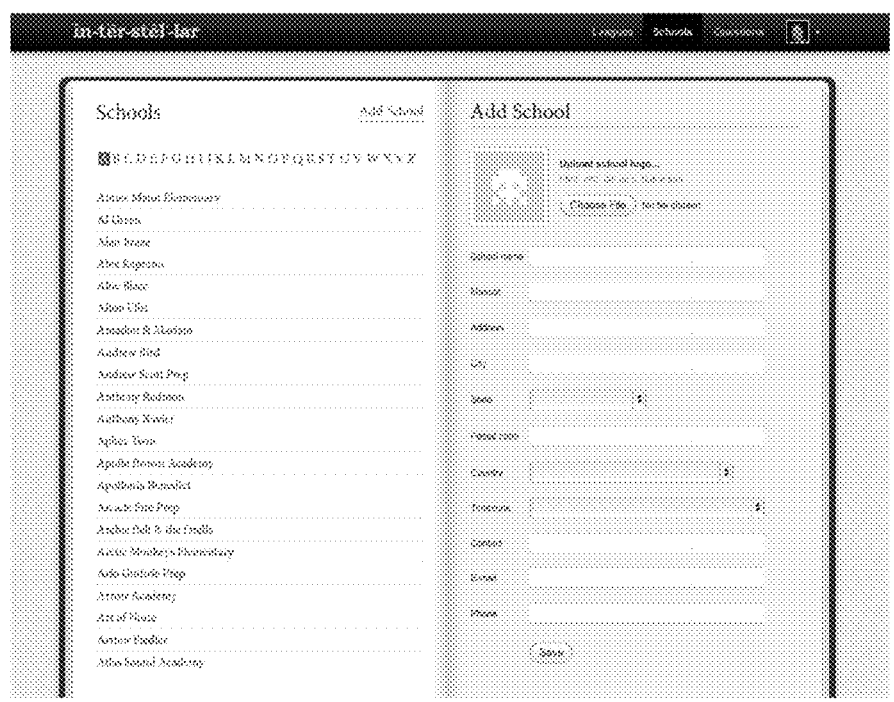
FIG. 39 illustrates a page presented when the Administrator has just clicked the 'Schools' link.

FIG. 39 illustrates a page presented when the Administrator has just clicked the 'Schools' link. When the Administrator clicks the 'Schools' link in the navigation bar, the page defaults to schools that begin with the letter 'A'. The left page displays the 'Add School' button which appears on all left pages connected to the 'Schools' link on the navigation bar. Whenever the Administrator clicks this link, the empty form displayed on the right page appears. The right page displays a 'Choose File' button that allows the Administrator to upload a mascot photo of the school which is being added to the system, and data fields which allow the Administrator to enter relevant school data.

Figure 40:
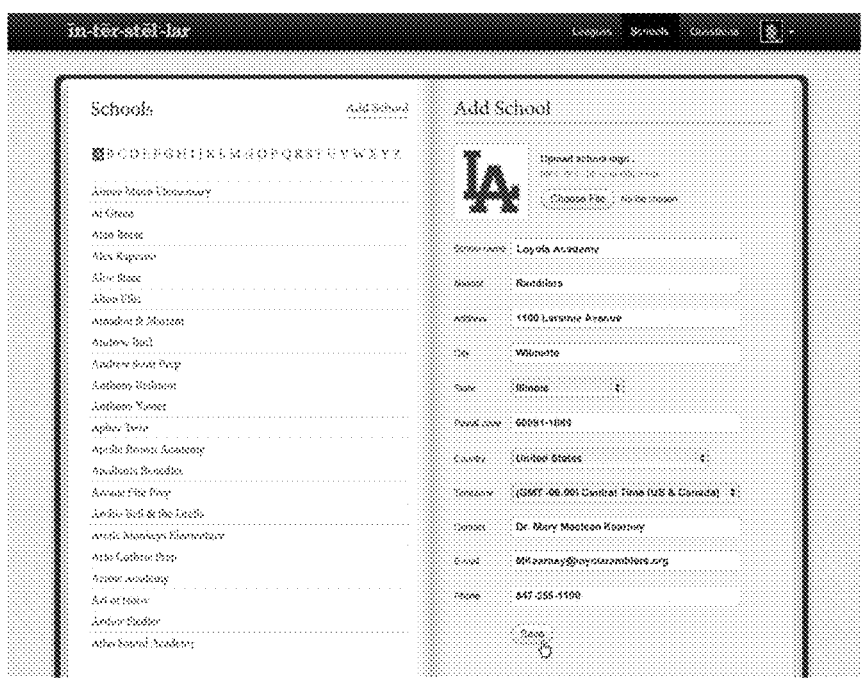
FIG. 40 illustrates a page presented when the Administrator stores information pertaining to a new school into the system by filling the data fields and clicking 'Save'.

FIG. 40 illustrates a page presented when the Administrator stores information pertaining to a new school into the system by filling the data fields and clicking 'Save'. All fields must be filled to add a new school in the system. All school names must be unique. This is one step in ensuring that all teams in the Interstellar Network have a unique identity. If a school name has already been taken, an alert box appears prompting the Administrator to make the correction. Also, though not shown, if mandatory fields have not been filled, an alert box appears prompting the Administrator to fill them.

Figure 41:
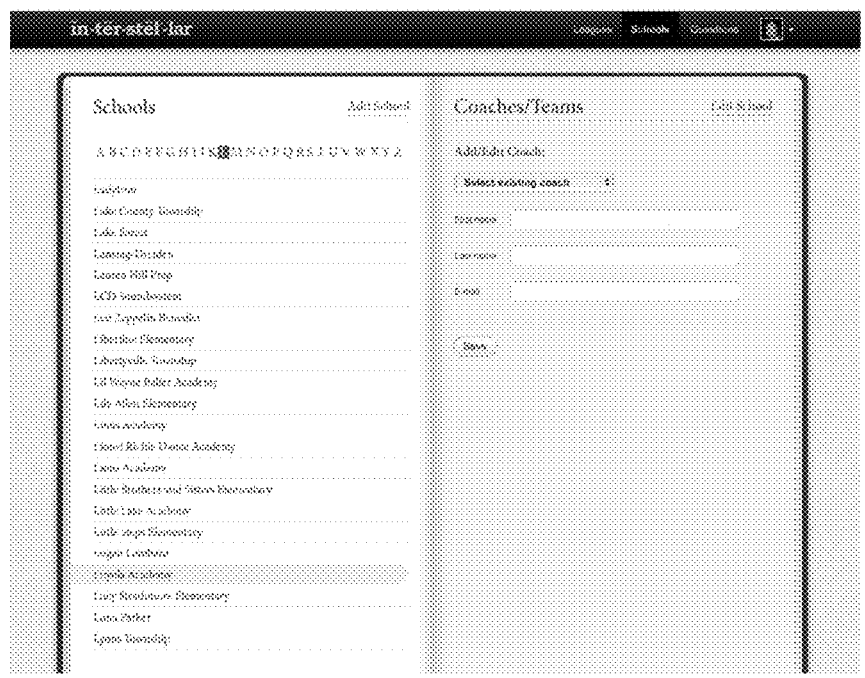
FIG. 41 illustrates a page presented when the Administrator has just added a new school to the system.

FIG. 41 illustrates a page presented when the Administrator has just added a new school to the system. When the Administrator successfully adds a new school to the system, he/she is brought immediately to the 'Coaches/Teams' page on the right hand side of FIG. 41. The newly added school's placement in the system is automatically presented in the alphabetized list on the left hand side of the page, and highlighted. On the right hand side of the page, an 'Edit School' link appears. When clicked, the Administrator is brought to the 'Edit School' page for that school (see below). The left hand side of the page remains the same.

Figure 42:
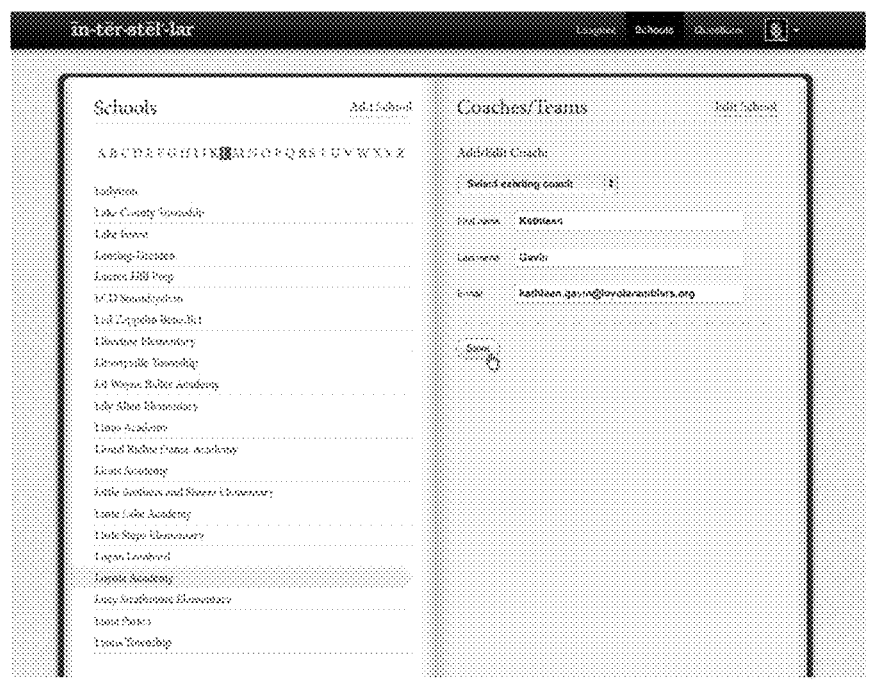
FIG. 42 illustrates a page presented through which the Administrator may add a new Coach to a school by filling in the 'First name', 'Last name', and 'E-mail' fields with that person's information, and then clicking the 'Save' button.

FIG. 42 illustrates a page presented through which the Administrator may add a new Coach to a school by filling in the 'First name', 'Last name', and 'E-mail' fields with that person's information, and then clicking the 'Save' button.

Figure 43:
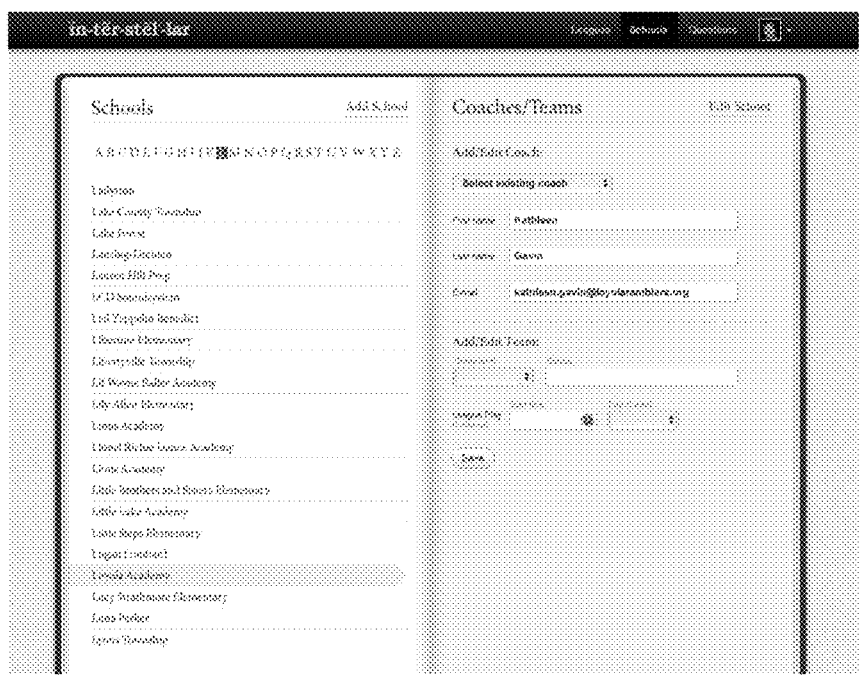
FIG. 43 illustrates a page presented when the Administrator has just added a new Coach.

FIG. 43 illustrates a page presented when the Administrator has just added a new Coach. The Administrator may, but need not, create a team for the new Coach by filling out the 'Grade level' and 'Course' fields and clicking the 'Save' button. All team names in the Interstellar Network are created by combining grade level, course name, and a letter which the system automatically appends (working alphabetically starting from 'A'). This ensures that each team in the Interstellar Network has a unique identity. If the Administrator does create a team, it appears in the 'Active Teams' list and in the Coach's pages generally, once his/her account is activated. The 'Start time' and 'Day of week' fields are required if that team is participating in 'League Play.' The 'Start time' and 'Day of week' fields may be changed at any time. However, changes to these fields do not go into effect until the next 'Round' of a 'Cycle' if a 'Cycle' is presently ongoing. The 'Start time' and 'Day of week' that are stored in the system at the end of a 'Round' are used for the next 'Round'.

Figure 44:
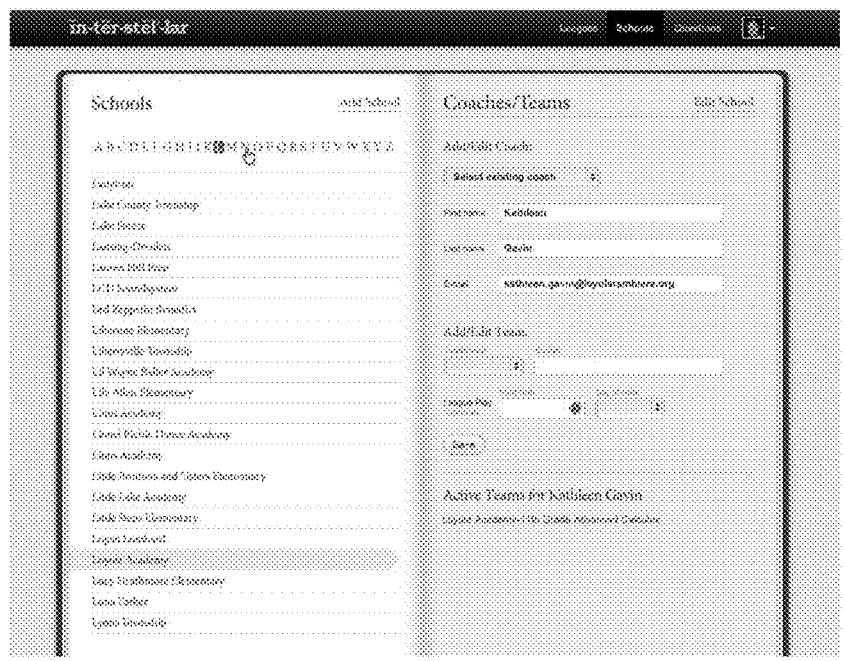
FIG. 44 illustrates a page presented when the Administrator has just added a team by entering the relevant information and clicking the 'Save' button on the 'Coaches/Teams' page.

FIG. 44 illustrates a page presented when the Administrator has just added a team by entering the relevant information and clicking the 'Save' button on the 'Coaches/Teams' page. When the 'Save' button under the 'Add/Edit Team' section on the 'Coaches/Teams' page is clicked, information that has been added or edited is updated into the system and an empty 'Add/Edit Team' section appears. The left page continues to show the name of the school highlighted. As illustrated, a new team has just been added to the school, so it now appears in the 'Active Teams' list. However, all teams are not necessarily created on this page. For example, when a Coach has been activated in the system, he/she may create teams as well. Once he/she does, those teams appear in the 'Active Teams' list.

Figure 45:
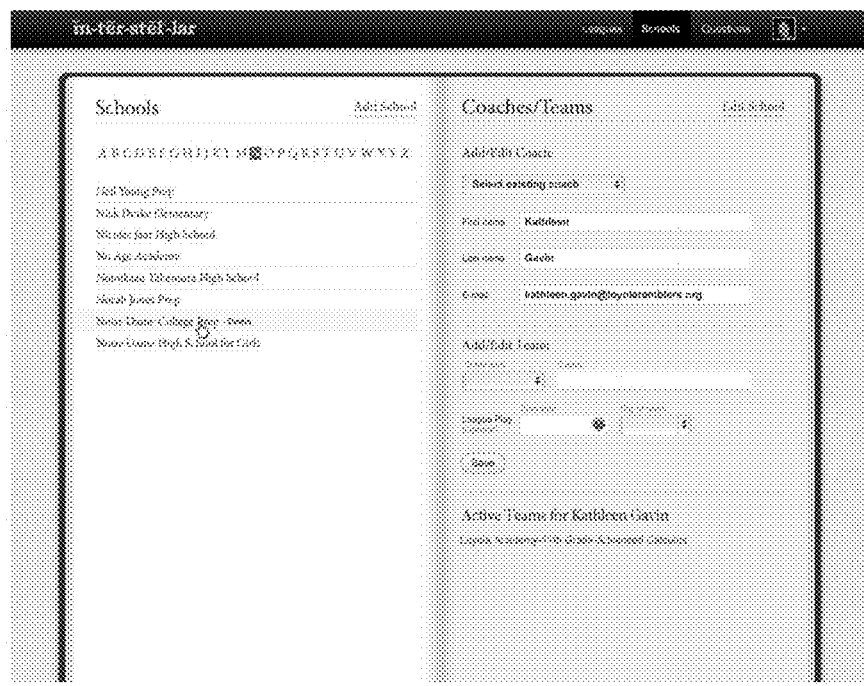
FIG. 45 illustrates a page presented when the Administrator has just clicked a letter in the alphabetized list, with the cursor hovering over a school.

FIG. 45 illustrates a page presented when the Administrator has just clicked a letter in the alphabetized list. The left hand side of the page displays the process by which the Administrator, when he/she clicks a letter in the alphabet line, is brought to a page that displays all the participating schools in the system that begin with that letter, arranged alphabetically. The left hand side of the page also shows that when the Administrator places the cursor over a school field, the entire field fills in color. The field remains filled in color so long as the cursor is over it. In addition, a 'Delete' button appears allowing the Administrator to delete a school from the system if clicked. Though not shown, when the 'Delete' button is clicked, an alert dialog box appears requiring the Administrator to confirm his/her decision by clicking 'OK'.

If the Administrator does not wish to delete the school, he/she may close the box. If the Administrator clicks 'OK', the school is deleted and another alert dialog box appears confirming the school has been deleted.

Figure 46:
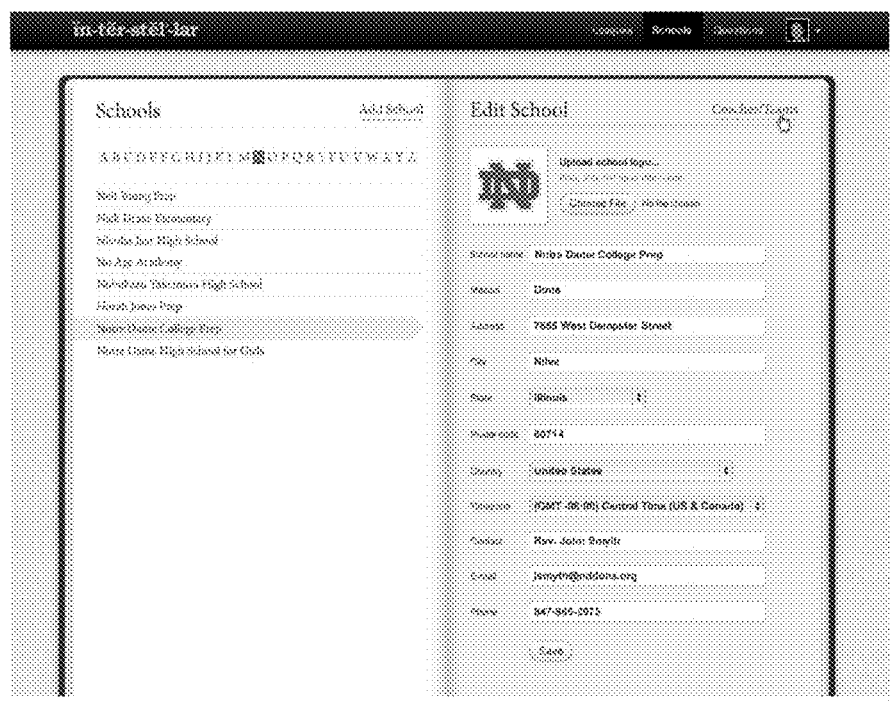
FIG. 46 illustrates a page presented when the Administrator has just clicked a school listed on the 'Schools' page.

FIG. 46 illustrates a page presented when the Administrator has just clicked a school listed on the 'Schools' page. When a school on the left hand side of the page is clicked, its field fills in color (shade slightly darker than in the hover state) and remains this color so long as the Administrator is occupied by the present school. If the Administrator places the cursor over another school, the field fills in the original hover color. The right hand side of the page automatically fills with a school's information when its field on the left page is clicked. The Administrator may edit information and store changes in the system by clicking 'Save'. Clicking 'Save' re-populates the fields with the updated information. On the right hand side of the page, a 'Coaches/Teams" link appears. When clicked, the Administrator is brought to the 'Coaches/Teams' page for that school (FIG. 41). The left hand side of the page remains the same.

Figure 47:
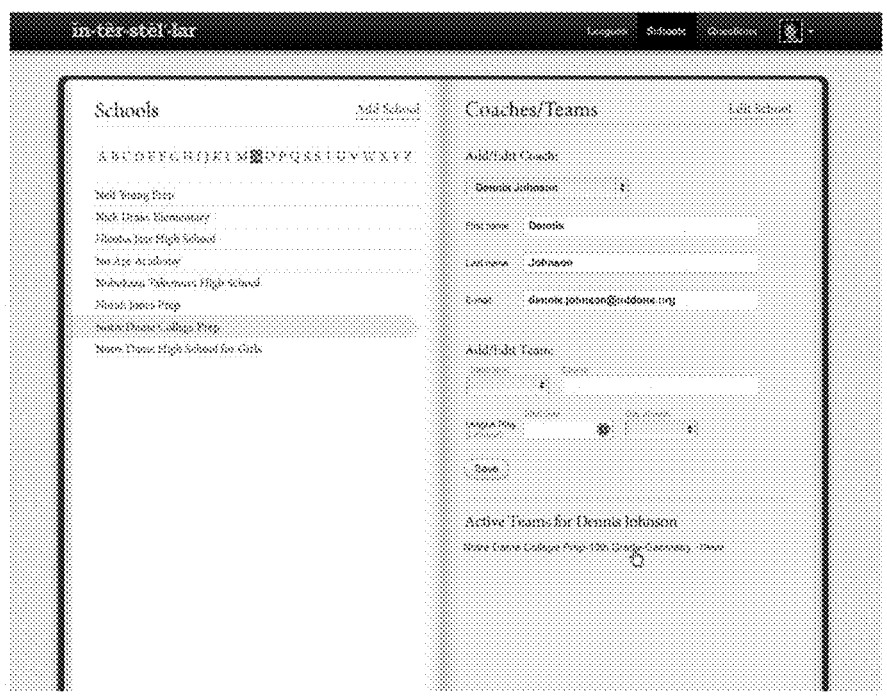
FIG. 47 illustrates a page presented when the Administrator has just chosen a Coach from the 'Select existing Coach' dropdown.

FIG. 47 illustrates a page presented when the Administrator has just chosen a Coach from the 'Select existing Coach' dropdown. When a Coach is selected from the 'Select existing Coach' dropdown (which lists all Coaches for that school), his/her name appears therein. The three fields immediately below populate as well. This information may be edited and then updated to the system by clicking the 'Save' button. When the cursor is placed over an 'Active Team', a 'Delete' button appears, allowing the Administrator to delete the team from the system. Though not illustrated, when the 'Delete' button is clicked, an alert dialog box appears requiring the Administrator to confirm his/her decision by clicking 'OK'. If the Administrator does not wish to delete the team, he/she may close the box. If the Administrator clicks 'OK', the team is deleted and another alert dialog box appears confirming the team has been deleted.

Figure 48:
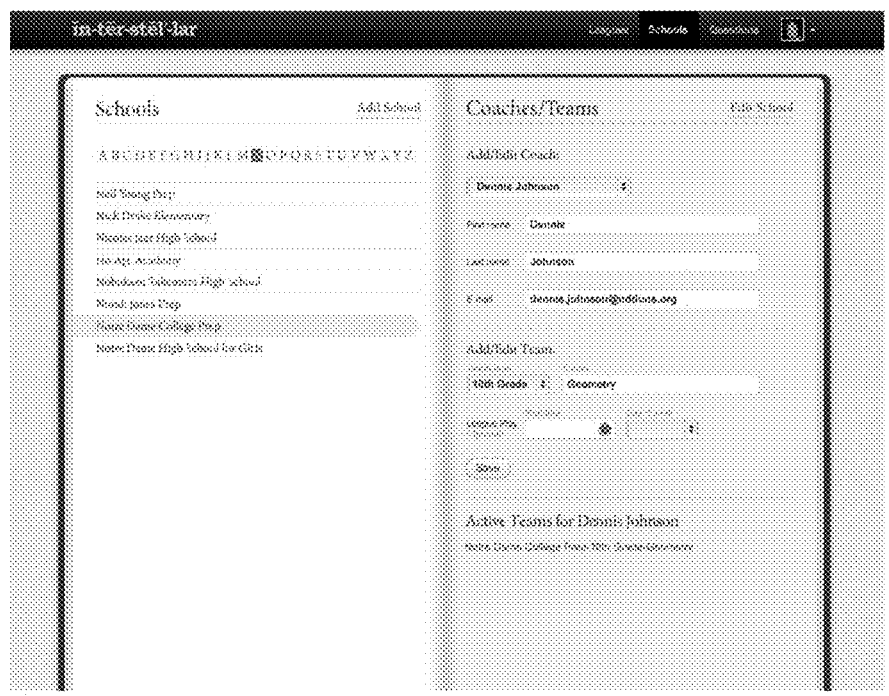
FIG. 48 illustrates a page presented when a link listed under 'Active Teams' has been clicked.

FIG. 48 illustrates a page presented when a link listed under 'Active Teams' has been clicked. When a link listed under the 'Active Teams' is clicked, the system returns this page with the relevant information of both the Coach and team. This information may be edited and then updated to the system by clicking the 'Save' button. This list includes all teams of the given Coach, whether created by the Administrator or Coach. The 'Start time' and 'Day of week' fields appear empty if the team has not been scheduled for League Play.

Figure 49:
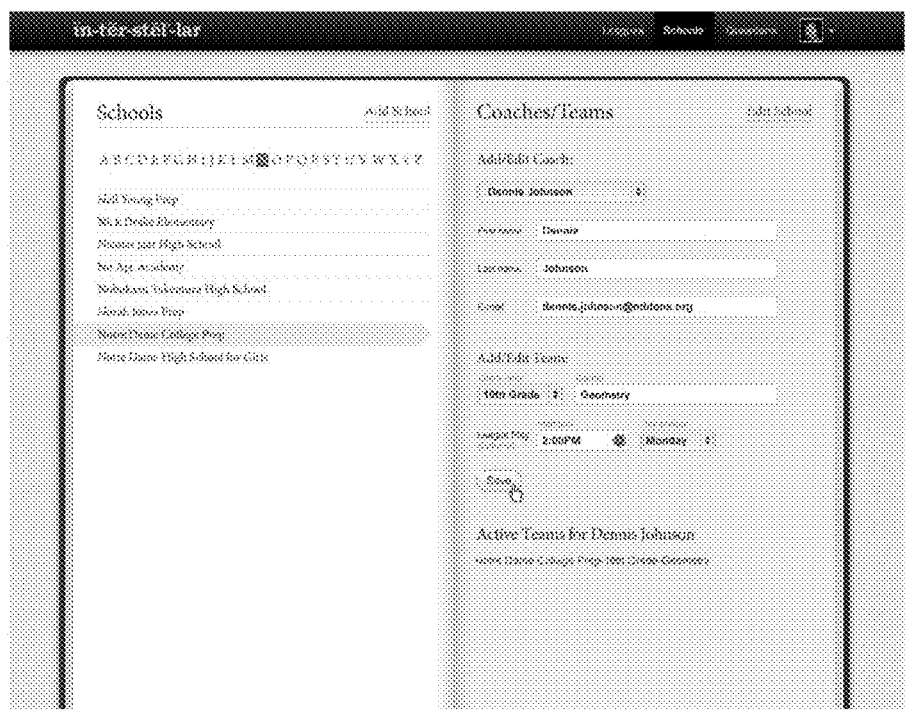
FIG. 49 illustrates a page presented when the 'Start time' and 'Day of week' fields are filled in and saved by clicking 'Save.'

FIG. 49 illustrates a page presented when the 'Start time' and 'Day of week' fields are filled in and saved by clicking 'Save.' The Administrator may now schedule this team for 'League Play' events.

Figure 50:
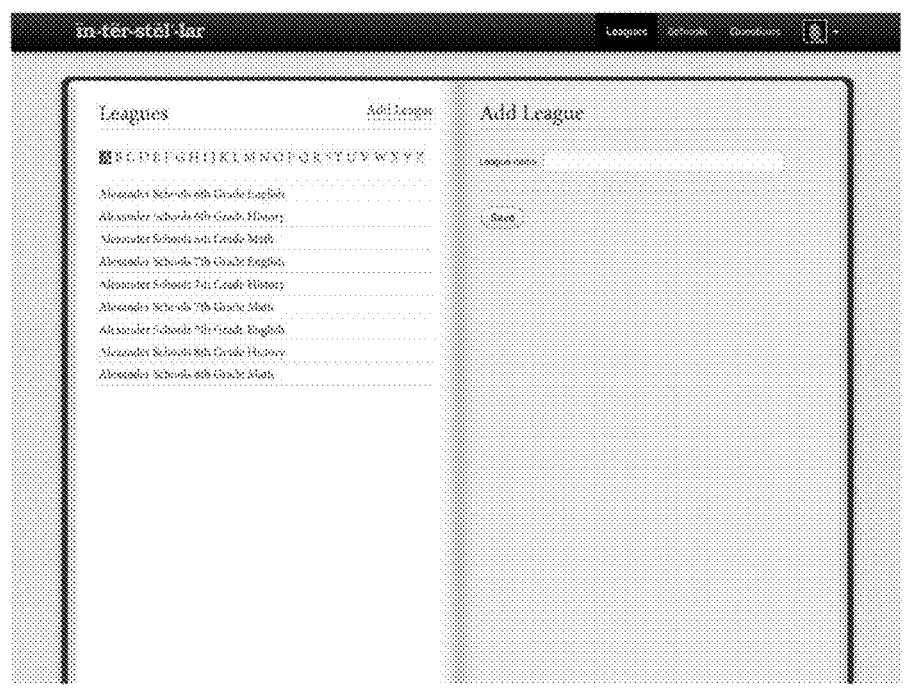
FIG. 50 illustrates a page presented when the Administrator has just clicked the 'Leagues' link and has been brought to this page.

FIG. 50 illustrates a page presented when the Administrator has just clicked the 'Leagues' link and has been brought to this page. When the Administrator clicks the 'Leagues' link in navigation bar, the page defaults to schools that begin with the letter 'A'. The left page displays an 'Add League' button which appears on all left pages connected to the 'Leagues' link on the navigation bar. Whenever the Administrator clicks this link, the empty 'League name' form displayed on the right page appears, just as it does when 'Leagues' is clicked.

Figure 51:
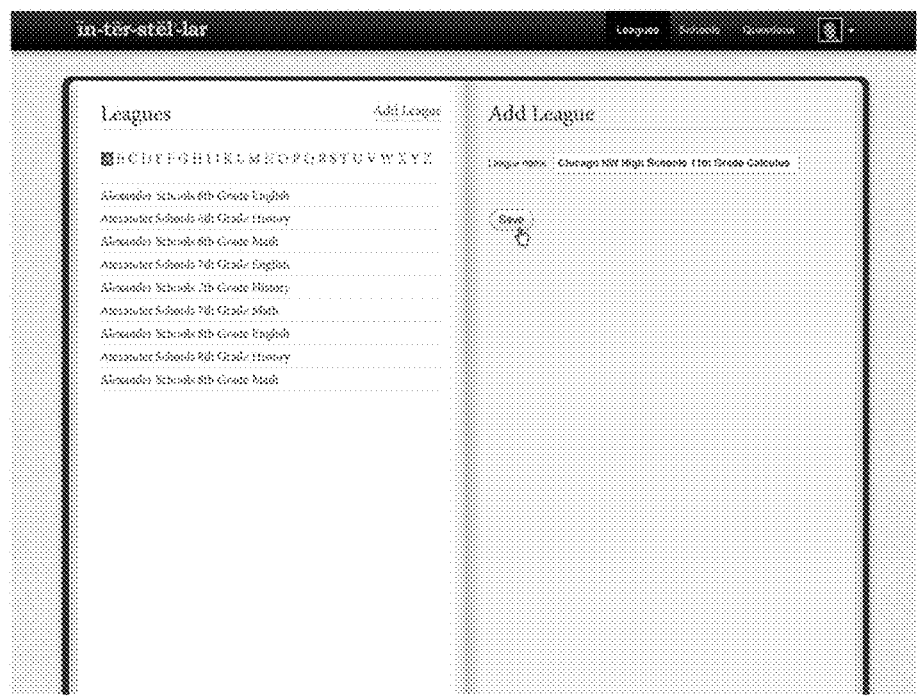
FIG. 51 illustrates a page presented when the Administrator enters text in the 'League name' field and clicks 'Save.'

FIG. 51 illustrates a page presented when the Administrator enters text in the 'League name' field and clicks 'Save.' As illustrated, a new league is created in the system and appears on the left hand side of the page.

Figure 52:
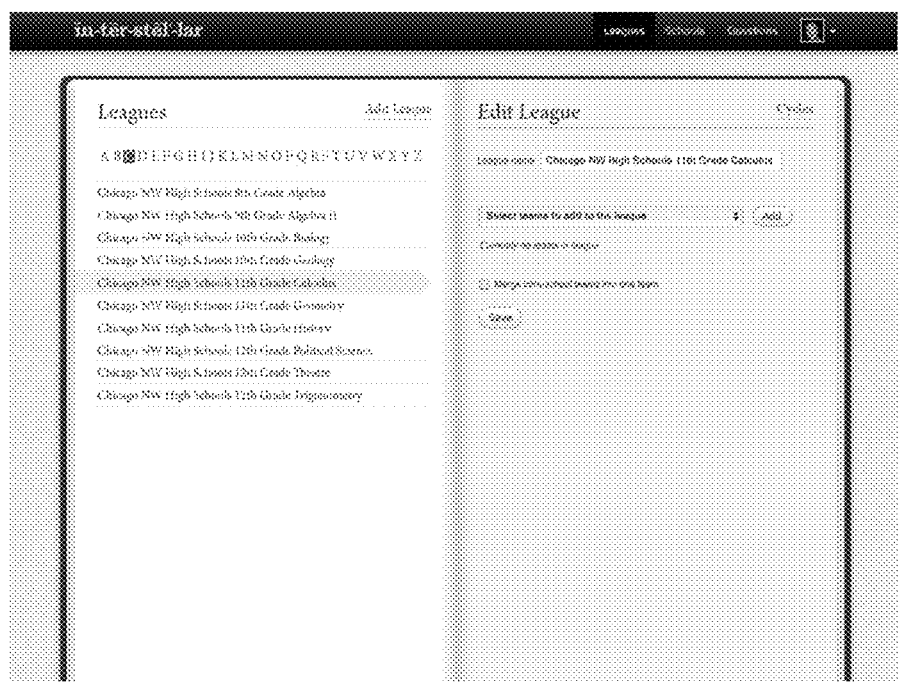
FIG. 52 illustrates a page presented when the Administrator has just saved a league to the system.

FIG. 52 illustrates a page presented when the Administrator has just saved a league to the system. When a league is saved to the system, it is automatically presented in the alphabetized list on the left page, and highlighted. The 'Select teams to add to the league' scroll now appears which lists teams that can be added to the league. When a team is selected from the scroll and 'Add' is clicked, it automatically appears in the list below. Also, a 'Cycles' link appears. When clicked, the Administrator is brought to the 'Cycles' page for that league (see Cycles Figures below). The 'Merge intra-school teams into one team' checkbox also appears. If the Administrator checks the box, then, when a cycle is created for the league, multiple teams from the same school are treated as if they were one team. The system will arrange the series of competitions in any given cycle between schools, not teams. In this scenario, intra-school teams will not compete against each other during a cycle. Conversely, if the Administrator does not check the box, multiple teams from the same school will be treated as if they were separate teams from separate schools. The system will schedule the series of competitions in any given cycle between teams. In this scenario, intra-school teams may compete against each other during a cycle. When the Administrator clicks 'Save', all details are uploaded to the system.

Merged League Play Example

In this example, a 'Unit' is a team that is competing with other teams from the same school, all as a single team in the same league.

School A has 3 units with the following 'Start time'/'Day of week' entries:

A1: Mon 4 PM
A2: Mon 5 PM
A3: Mon 6 PM

School B has 2 units with the following 'Start time'/'Day of week' entries:

B1: Mon 4 PM
B2: Mon 5 PM

School C has 1 team with the following 'Start time'/'Day of week' entries:

C1: Mon 4 PM

Round 1: School A Versus School B (C gets a Bye). 1 hour exam.

4 PM: A1 will compete live against B1
5 PM: A2 will compete live against B2
6 PM: A3 will compete alone against Personal Best Opponent.

The final results for each unit (from School A or B) are not recorded in the system, neither in the Coach's nor the Team Member's 'Results' pages. However, once all units have finished the exam (i.e. 7 PM), a final 'Team Score' for School A is calculated by taking the average 'Team Score' of the 3 units from School A and comparing it to the average 'Team Score' of the 2 units from School B. This then appears in both the Coach's and the Team Member's 'Results' pages for both schools in the 'Overall Progress' (Team) page and in the 'Match Details' pages (see Coach/Team Member 'Results' pages generally).

Round 2: School B Versus School C (A gets a Bye). 1 hour exam.

4 PM: B1 will compete against C1
5 PM: B2 will compete alone against Personal Best Opponent.

The final results for each unit (from School B) are not recorded in the system, neither in the Coach's nor the Student's Results pages. However, once all units have finished the exam (i.e. 6 PM), a final 'Team Score' for School B is calculated by taking the average 'Team Score' of the 2 units from School B and comparing it to the 'Team Score' of the team from School C. This will appear in both the Coach's and the Student's Results pages for both schools in the 'Overall Progress' (Team) page and in the 'Match Details' pages (see Coach/Team Member 'Results' pages generally).

Figure 53:
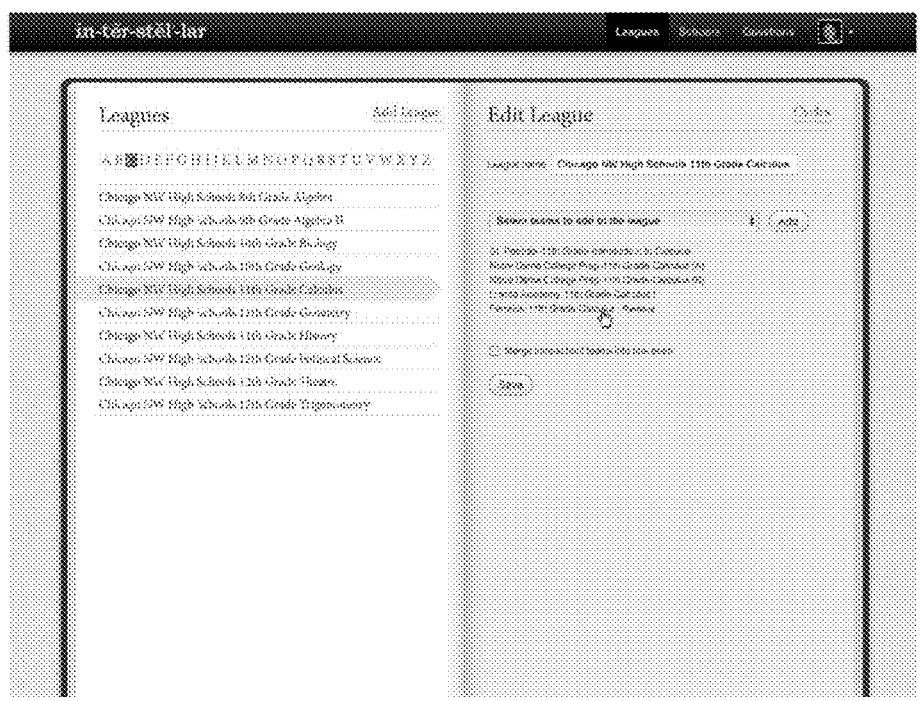
FIG. 53 illustrates a page presented when the cursor is placed above a team and a 'Remove' link appears.

FIG. 53 illustrates a page presented when the cursor is placed above a team and a 'Remove' link appears. When clicked, the team is removed from the league.

Figure 54:
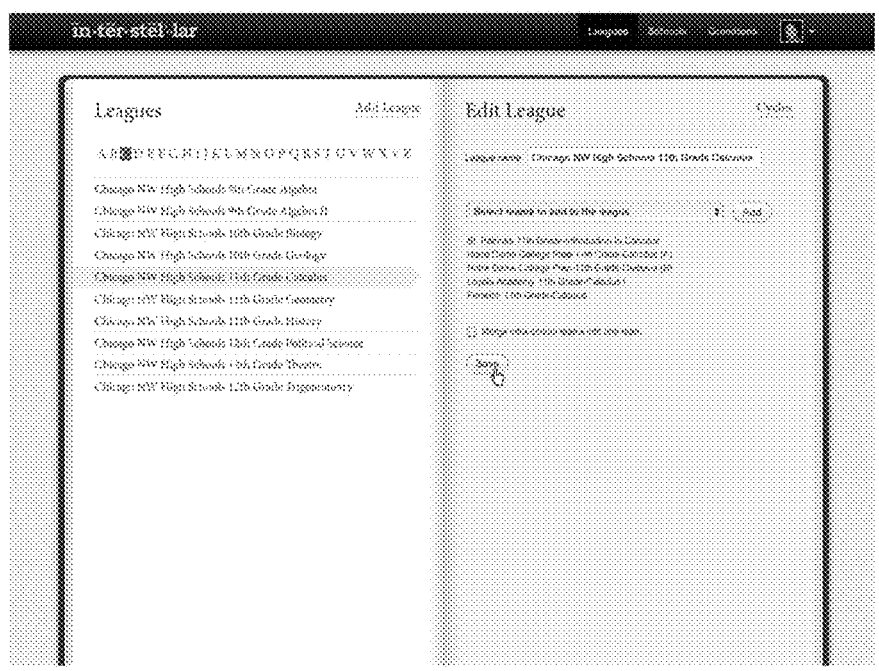
FIG. 54 illustrates a page presented when 'Save' is clicked and all teams that have been added to the list are now saved in the system as members of the league.

FIG. 54 illustrates a page presented when 'Save' is clicked and all teams that have been added to the list are now saved in the system as members of the league. The Administrator may return to this page at any time and edit either the league name, the teams included in the league, or the 'merge' preference by making the changes and clicking 'Save'.

Figure 55:
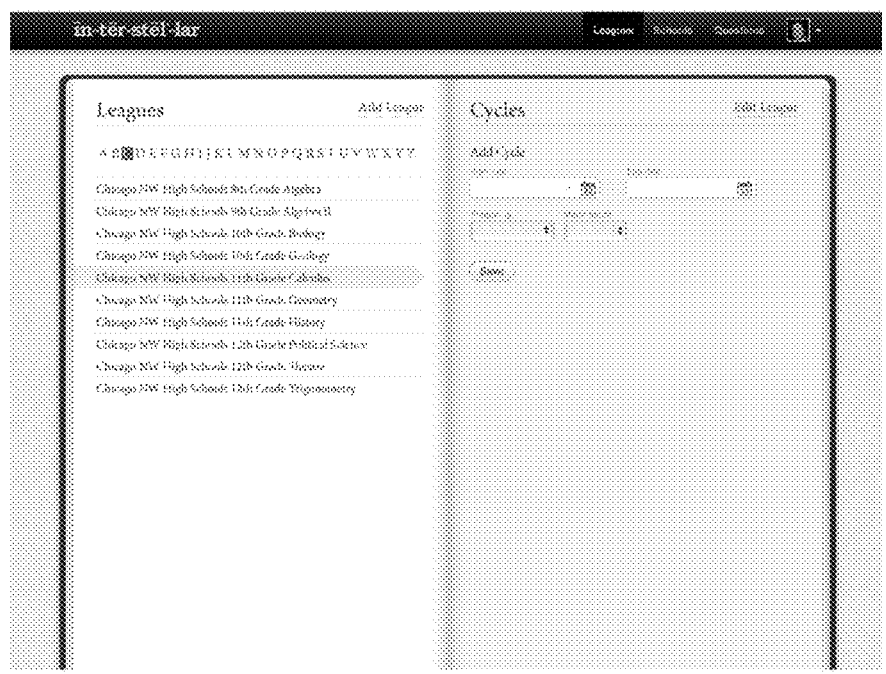
FIG. 55 illustrates a page presented when the Administrator has just clicked the 'Cycles' button on the 'Add League' page.

FIG. 55 illustrates a page presented when the Administrator has just clicked the 'Cycles' button on the 'Add League' page. When the Administrator clicks the 'Cycles' button on the 'Add League' page, he/she is brought to the 'Cycles' page. On the right hand side of the page, an 'Edit League' link appears. When clicked, the Administrator is brought to the 'Edit League' page for that league. The left hand side of the page remains the same.

Figure 56:
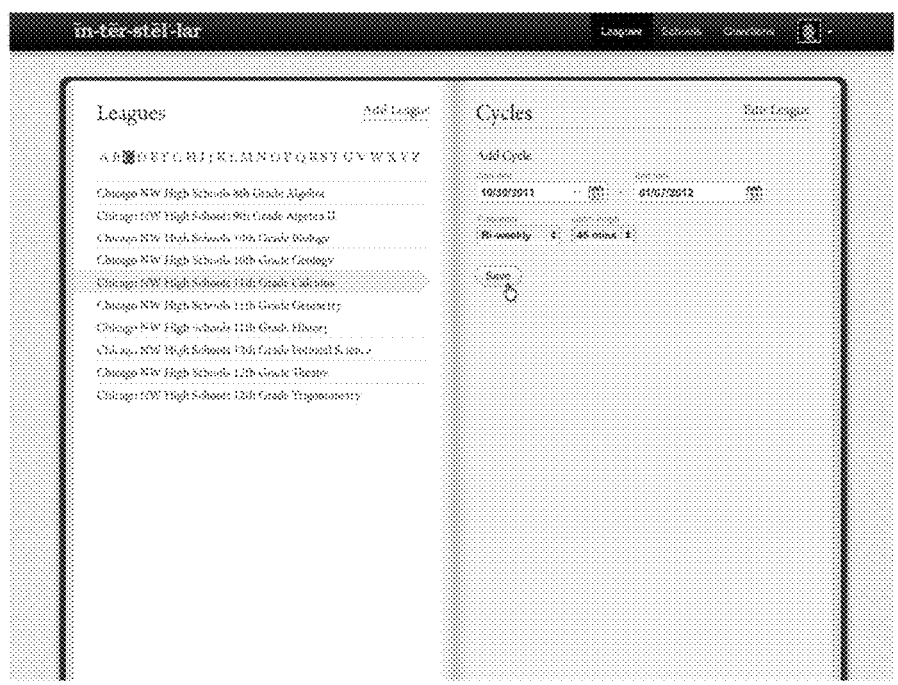
FIG. 56 illustrates a page presented when the Administrator chooses to add a new 'Cycle' to a league by entering a 'Start date', 'End date', a 'Frequency' setting (weekly, bi-weekly, tri-weekly, monthly), and a 'Match Length' and then clicking 'Save'.

FIG. 56 illustrates a page presented when the Administrator chooses to add a new 'Cycle' to a league by entering a 'Start date', 'End date', and a 'Frequency' setting (weekly, bi-weekly, tri-weekly, monthly) and then clicking 'Save'. The system generates a round-robin type schedule.

Figure 57:
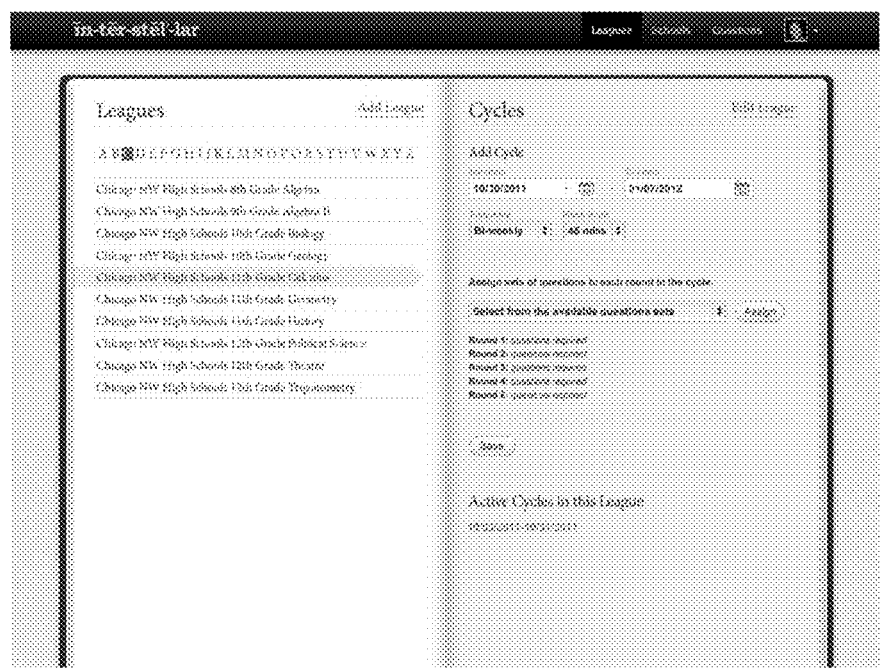
FIG. 57 illustrates a page presented when the Administrator has just saved a cycle to the system.

FIG. 57 illustrates a page presented when the Administrator has just saved a cycle to the system. When a cycle is saved to the system, the 'Select from the available question sets' scroll appears which lists question sets that can be attached to each round of the league by clicking 'Assign'. When a question set is assigned, it appears under the last assigned set. 'Round' headings appear below the scroll, the number of which the system determines by a calculation dependent on the 'Start Date', 'End Date', and 'Frequency' variables. All 'Rounds' begin at 12 AM Sunday and conclude at 11:59:59 PM Saturday, not necessarily the same week depending on the 'Frequency' chosen. The 'Start date' calendar only lists Sunday dates and the 'End date' calendar only lists Saturday dates. The moment a 'Round' of a league begins, the system follows a two-step process. First, it identifies and links those teams scheduled to compete against each other during the present 'Round' that have the same 'Start time'/'Day of week' entries, that is, those teams that will be competing live against each other. In 'Merged League Play' this involves linking 'Units' to 'Units' or 'Units' to teams that have the same 'Start time'/'Day of week'. On the rare occasion when two or more 'Units' competing as part of the same team share the same 'Start time'/'Day of week', only the largest in Team Member count is linked to the opponent 'Unit' or team. Second, the system runs an algorithm that evenly matches Team Members from opposing teams or 'Units' that have been linked using the Interstellar Matching Team Member Algorithm. If a link cannot be made between teams/'Units', then that team/ 'Unit' plays alone during that 'Round', that is, it still has an opponent, only the competition event is not live. The final score is determined and posted after the last team/'Unit' has completed the exam. This may occur in any instance of a league, whether in 'Merged League Play' or not.

Figure 58:
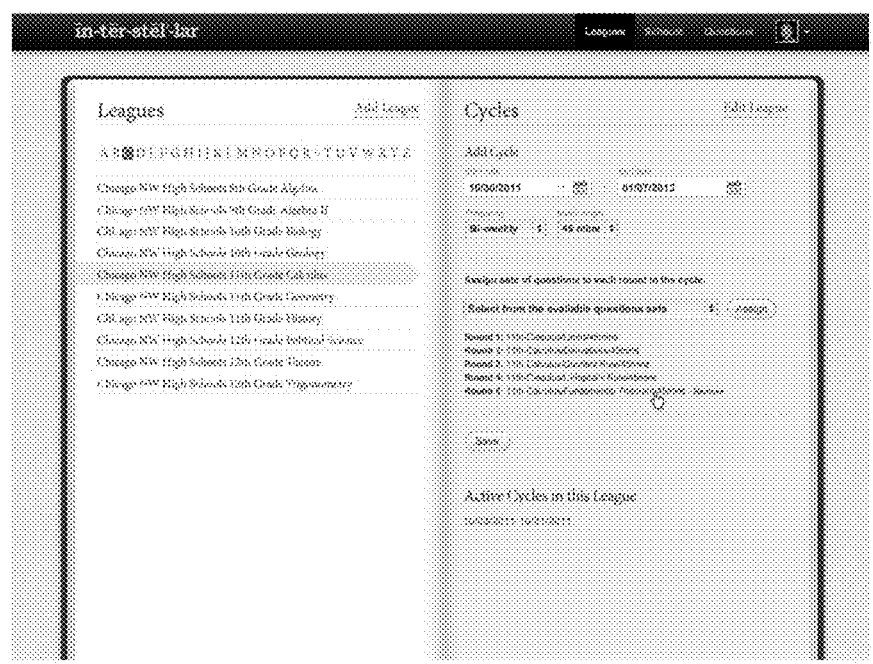
FIG. 58 illustrates a page presented when the cursor is placed over a 'Round' line. A 'Remove' button appears allowing the Administrator to remove that list (only the most recent addition can be removed).

FIG. 58 illustrates a page presented when the cursor is placed over a 'Round' line, a 'Remove' button appears allowing the Administrator to remove that question set (only the most recent addition may be removed).

Figure 59:
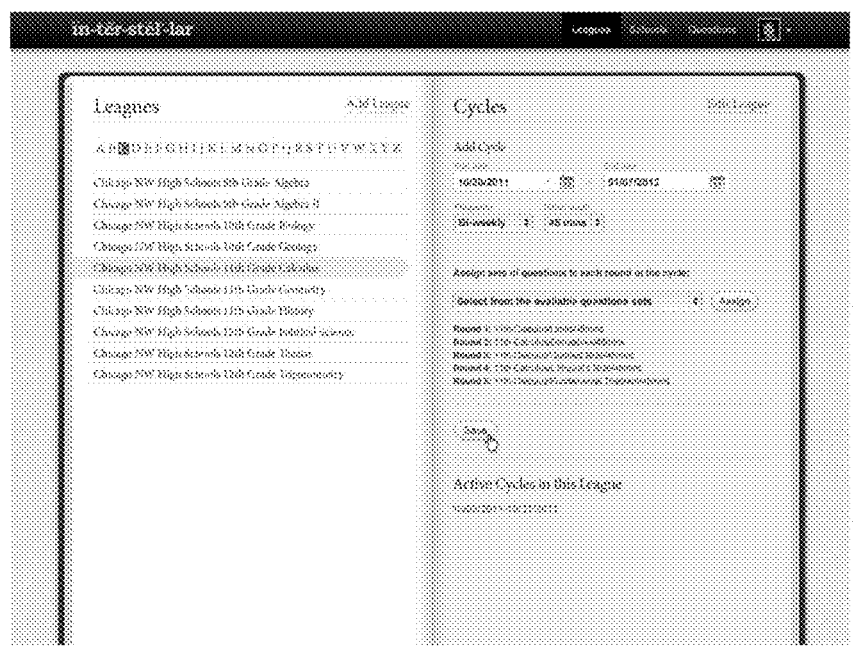
FIG. 59 illustrates a page presented when 'Save' is clicked and all question sets that have been assigned to rounds are now saved in the system.

FIG. 59 illustrates a page presented when 'Save' is clicked and all question sets that have been assigned to rounds are now saved in the system. The Administrator can return to this page at any time and edit either the cycle information or the question set/round information by making the changes and clicking 'Save'.

Figure 60:
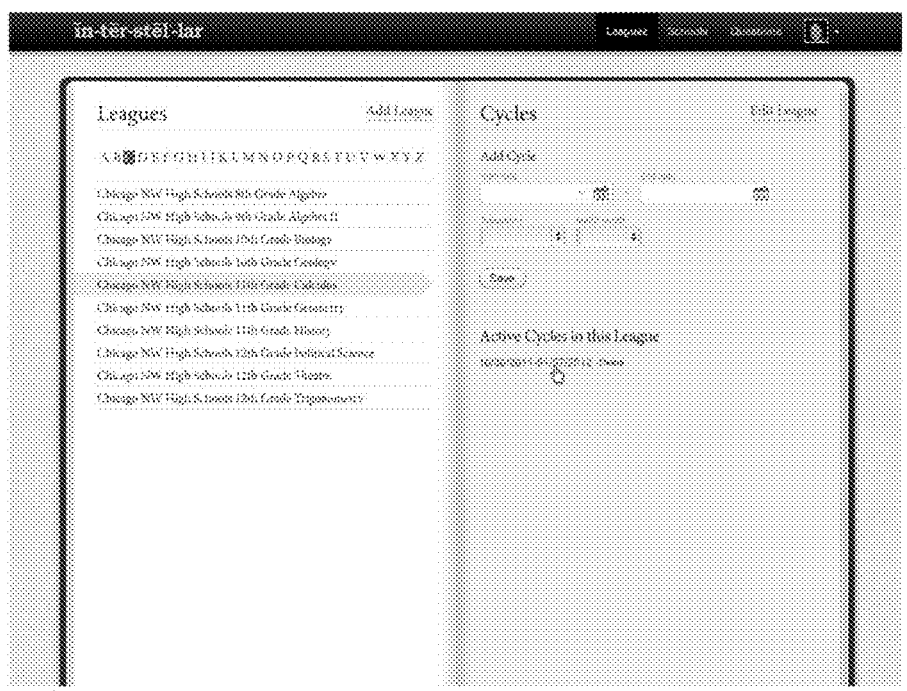
FIG. 60 illustrates a page presented when the 'Save' under the question set/round section of the 'Cycles' page has just been clicked.

FIG. 60 illustrates a page presented when the 'Save' under the question set/round section of the 'Cycles' page has just been clicked. When 'Save' under the question set/round section of the 'Cycles' page is clicked, the page empties allowing the Administrator to add another cycle if desired. When the cursor is placed over any cycle/date line, a 'Delete' button appears allowing the Administrator to delete that cycle. Though not displayed, when the 'Delete' button is clicked, an alert dialog box appears requiring the Administrator to confirm his/her decision by clicking 'OK'. If the Administrator does not wish to delete the cycle, he/she may close the box. If the Administrator clicks 'OK', the cycle is deleted and another alert dialog box appears confirming the cycle has been deleted.

Figure 61:
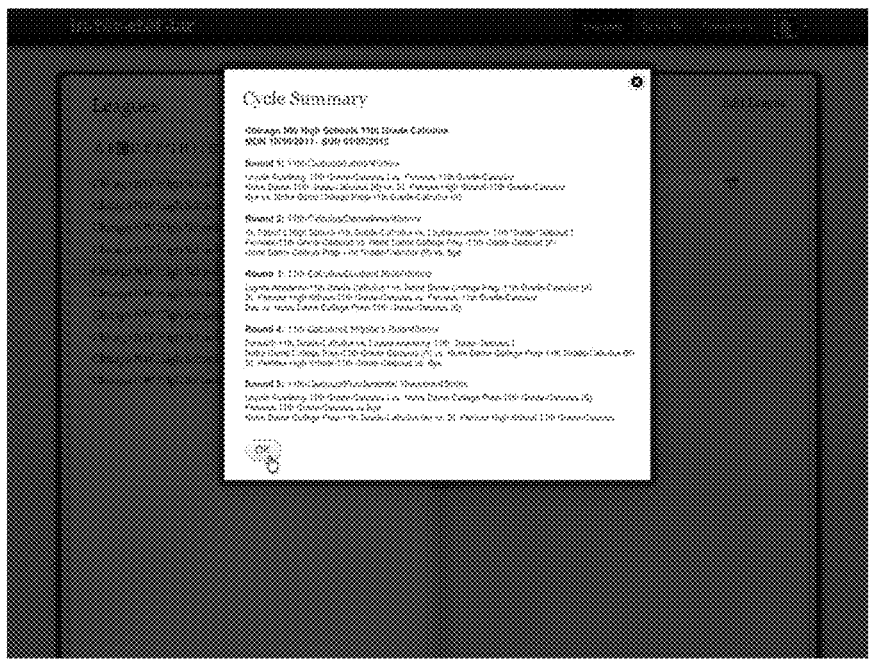
FIG. 61 illustrates a page presented when a link under the 'Active Cycles in the League' has just been clicked.

FIG. 61 illustrates a page presented when a link under the 'Active Cycles in the League' has just been clicked. When a 'Cycle'/date line has been clicked, this modal appears showing both the details of the 'Cycle' as well as the schedule that the system has automatically generated. This can be closed by clicking the 'X' box. Because the Administrator did not check the box next to 'Merge intra-school teams into one team?' on the 'Edit League' page, the modal presents a schedule in which the two teams from the same school are not merged. Thus, they compete against the other schools AND against each other.

Figure 62:
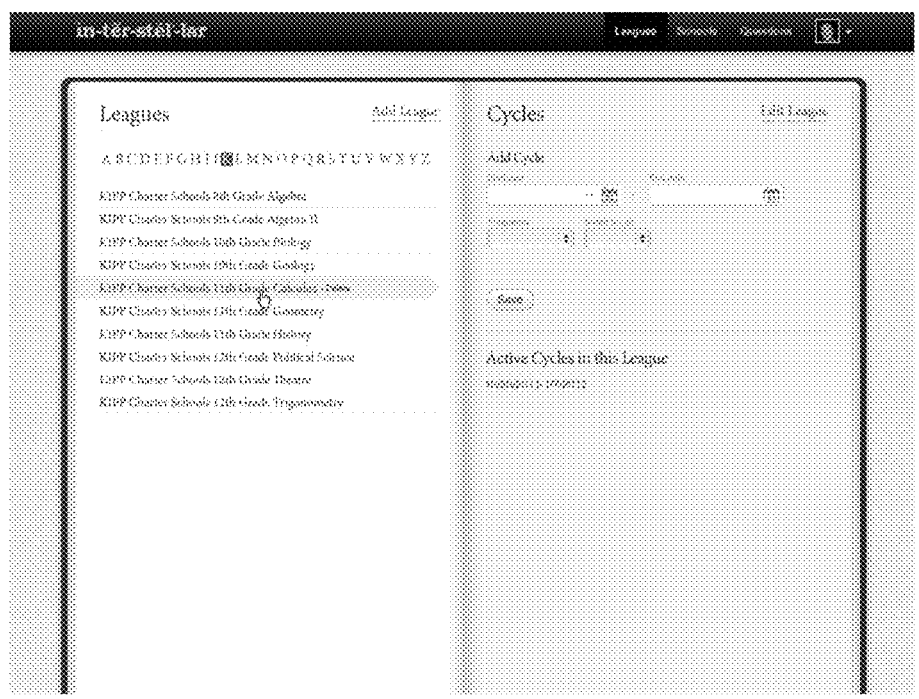
FIG. 62 illustrates a page presented when the Administrator has just clicked a letter in the alphabetized list, with the cursor hovering above a league.

FIG. 62 illustrates a page presented when the Administrator has just clicked a letter in the alphabetized list. The left hand side of the page displays process by which the Administrator, when he/she clicks a letter in the alphabet line, is brought to a page that shows all the leagues in the system that begin with that letter, arranged alphabetically. When the Administrator places the cursor over a league field, the entire field fills in color. The field remains filled in color so long as the cursor is over it. In addition, a 'Delete' button appears allowing Administrator to delete a league from the system. Though not displayed, when the 'Delete' button is clicked, an alert dialog box appears requiring the Administrator to confirm his/her decision to delete the league by clicking 'OK'. If the Administrator does not wish to delete the league, he/she may close the box. If the Administrator clicks 'OK', the league is deleted and another alert dialog box appears confirming the league has been deleted.

Figure 63:
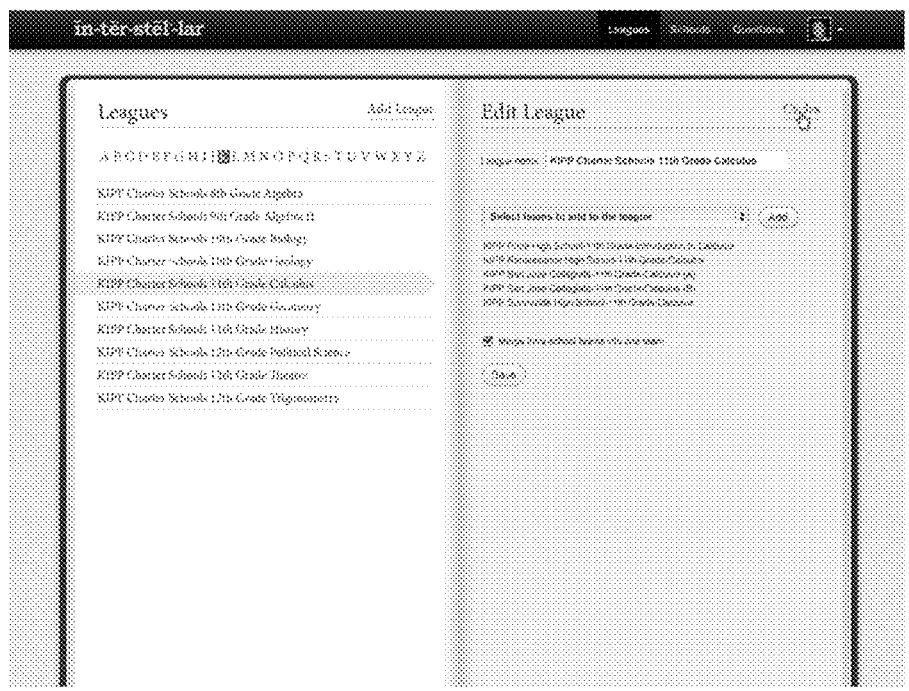
FIG. 63 illustrates a page presented when the Administrator has just clicked a league listed on the 'Leagues' page.

FIG. 63 illustrates a page presented when the Administrator has just clicked a league listed on the 'Leagues' page. When a league on the left page is clicked, its field fills in color (shade slightly darker than in the hover state) and remains this color so long as the Administrator is interacting with the present league. If the Administrator places the cursor over another school, the field fills in the original hover color. The 'Edit League' page for this league automatically appears.

Figure 64:
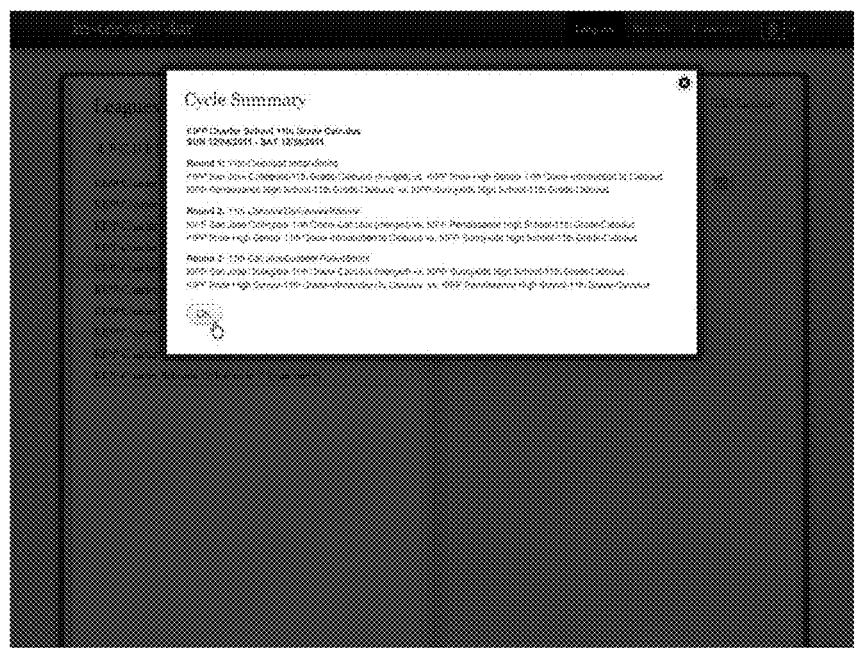
FIG. 64 illustrates a page presented when a link under the 'Active Cycles in the League' has just been clicked.

FIG. 64 illustrates a page presented when a link under the 'Active Cycles in the League' has just been clicked. Because the Administrator did check the box next to 'Merge intra-school teams into one team?' on the 'Edit League' page, the modal presents a schedule in which the two teams from the same school are merged. Thus, they compete against the other schools as if they were one team, and never against each other.

Coach Screens

Figure 65:
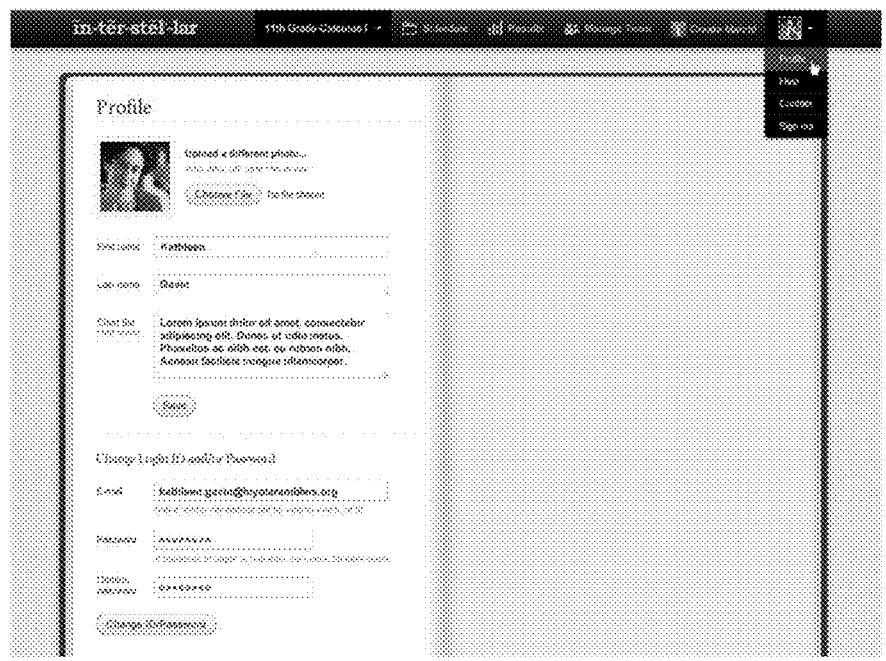
FIG. 65 illustrates a page presented when the Coach has just clicked the 'Profile' link listed in the dropdown.

FIG. 65 illustrates a page presented when the Coach has just clicked the 'Profile' link listed in the dropdown. On the left hand side of the page, the Coach uploads a profile photo, adds/edits his/her name, or enters a brief biographical description by inputting the information and clicking the 'Save' button. The Coach modifies his/her email address and password information by entering the information and clicking the 'Change ID/Password' button. The navigation bar at the top of the screen organizes the Coach domain into 4 areas: 'Manage Team', 'Results', 'Schedule', and 'Create Match!'. The information/functionality that displays when any of these is clicked depends on the team selected/highlighted from the 'Team' dropdown (a team is always selected/highlighted in the dropdown). The process works as follows. When the Coach logs into the system, the first page to appear is the 'Schedule' page of his/her team that has the very next match, with the relevant 'League Play' or 'Pick-Up Play' tab selected. Both that team's name and 'Schedule' is highlighted in the navigation bar. The Coach can retrieve past results for this team by clicking 'Results'. The team's name remains highlighted, only now its 'Results' area is displayed instead of its 'Schedule' area. The Coach can retrieve past results for another team by selecting that team from the dropdown. 'Results' remains highlighted, only now the new team's name is highlighted and the information displayed relates to it. 'Results' is used for example, but the same 'pivoting' logic applies to the other areas. The dropdown at the upper right lists 'Profile' and 'Sign out'. When 'Profile' is clicked the Coach is brought to this page. When 'Sign out' is clicked, the Coach is logged out of the system and returned to the Interstellar home page. The photo that the Coach uploads is used as the heading of the dropdown.

Figure 66:
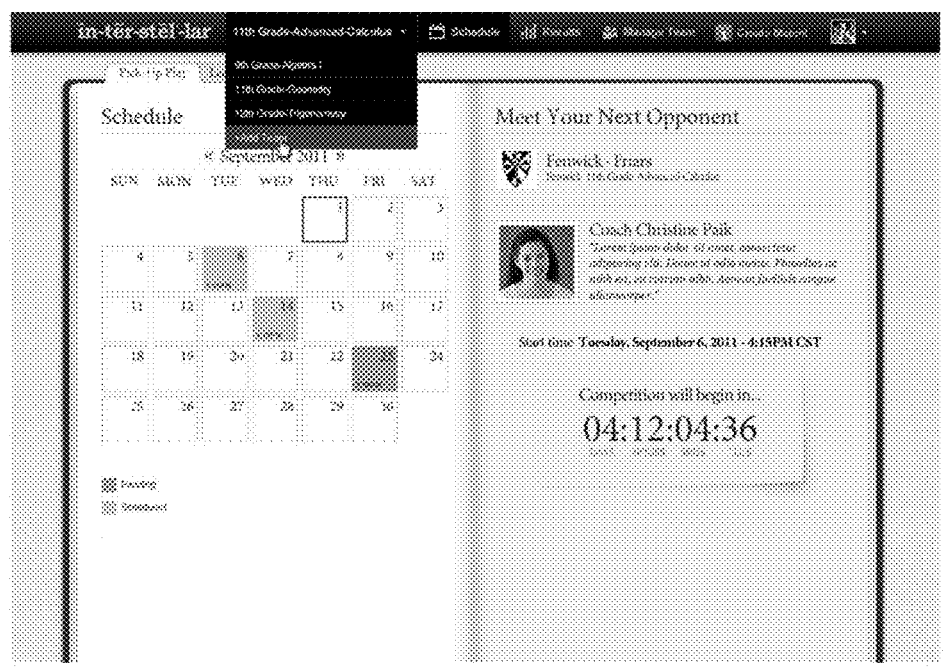
FIG. 66 illustrates a page presented when the Coach has just clicked the 'Team' dropdown.

FIG. 66 illustrates a page presented when the Coach has just clicked the 'Team' dropdown. That the 'Schedule' page appears is not relevant as this dropdown could be accessed whether the Coach is on a 'Schedule' page, a 'Results' page, a 'Manage Team' page, the 'Create Match!' page, or his/her 'Profile' page. The 'Team' dropdown includes the option to '+Add Team'. Choosing this option brings the Coach to a modal that allows him/her to create a new team.

Figure 67:
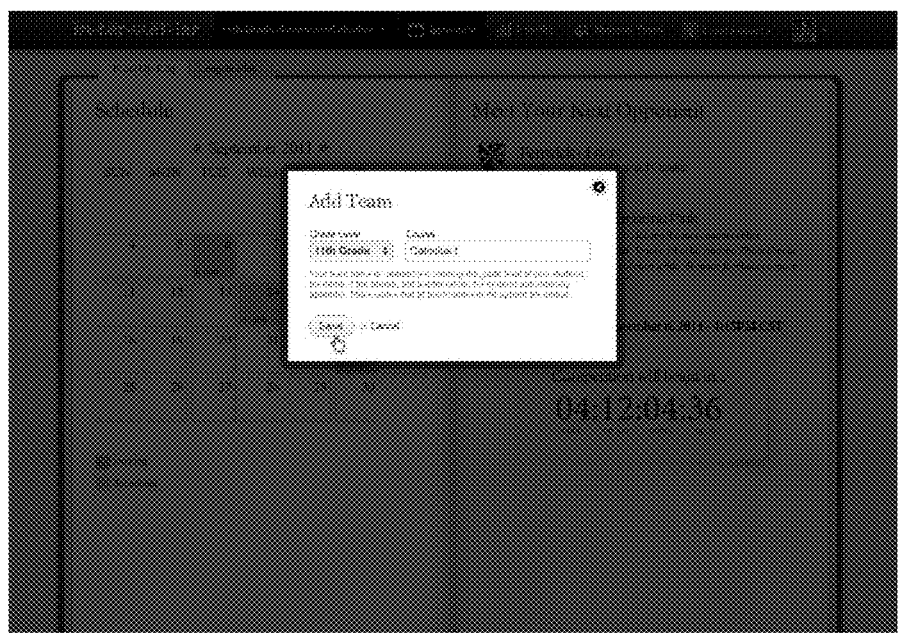
FIG. 67 illustrates a page presented when the Coach has just selected the '+Add Team' listing in the 'Team' dropdown.

FIG. 67 illustrates a page presented when the Coach has just selected the '+Add Team' listing in the 'Team' dropdown. The Coach can add a new team by filling out the 'Grade Level' and 'Course' fields and clicking the 'Save' button. This modal follows the team naming logic discussed above.

Figure 68:
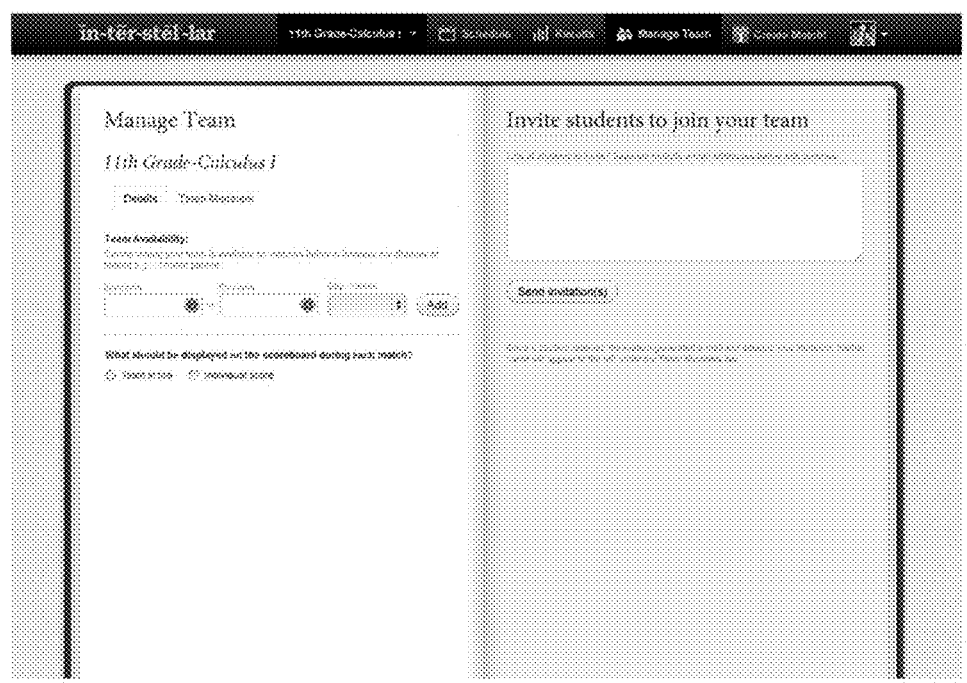
FIG. 68 illustrates a page presented when the Coach has successfully added a new team.

FIG. 68 illustrates a page presented when the Coach has successfully added a new team. When a Coach adds a new team, he/she is immediately brought to the 'Manage Team' area for the new team and the corresponding 'Manage Team' page. In the navigation bar the team name and 'Manage Team' are both highlighted.

Figure 69:
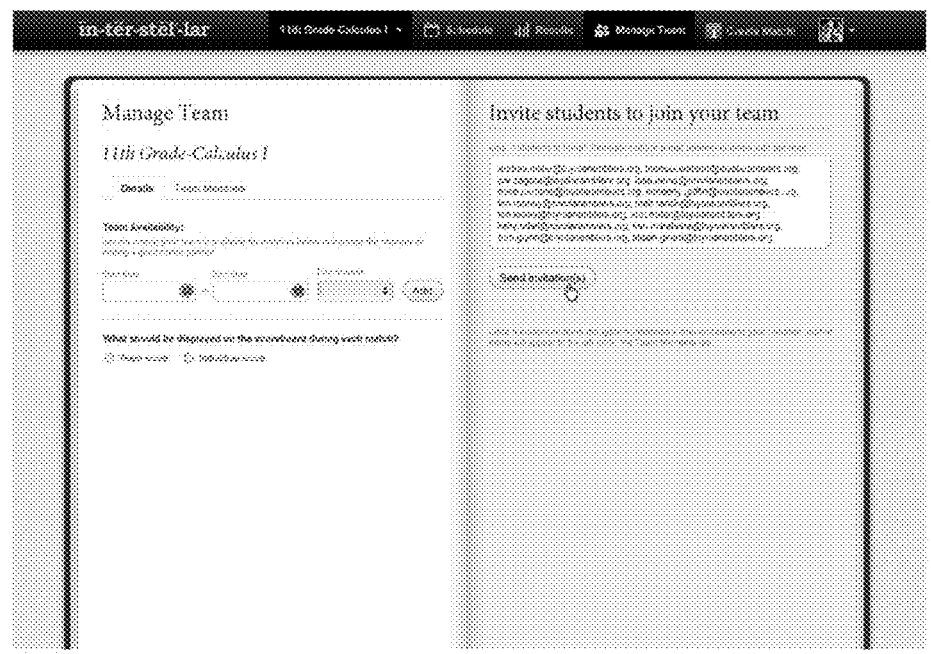
FIG. 69 illustrates a page presented to enable the Coach to enter the e-mail addresses of all students he/she intends to add to his/her team in the field under 'Invite students to join your team'.

FIG. 69 illustrates a page presented to enable the Coach to enter the e-mail addresses of all students he/she intends to add to his/her team in the field under 'Invite students to join your team'.

Figure 70:
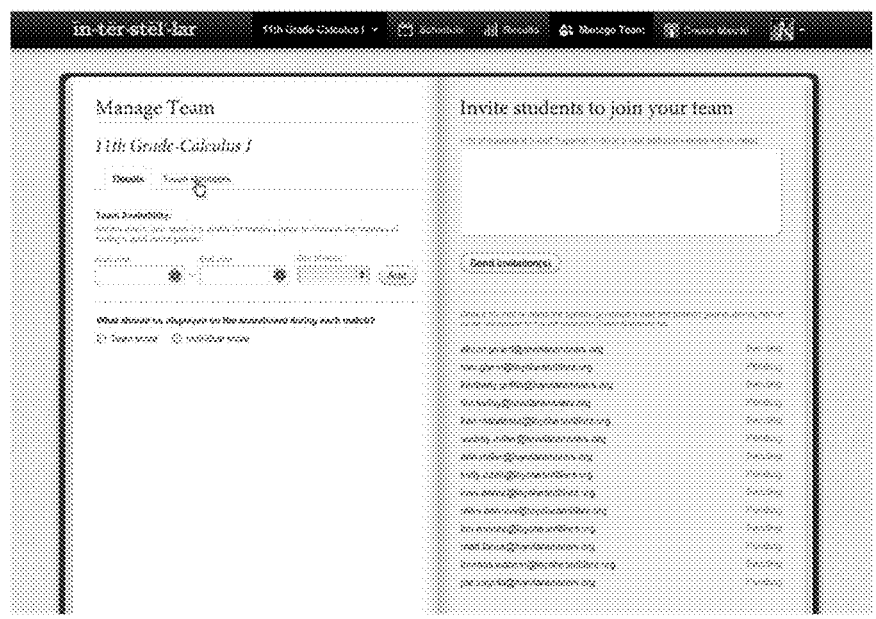
FIG. 70 illustrates a page presented when the Coach has just listed a series of e-mails in the field on the right and clicked the 'Send invitation(s)' button.

FIG. 70 illustrates a page presented when the Coach has just listed a series of e-mails in the field on the right and clicked the 'Send invitation(s)' button. When e-mail addresses are entered into the field on the right hand side of the page and the 'Send invitation(s)' button is clicked, the system automatically sends an invitation to join the Interstellar Network to each address. Those e-mail addresses then appear in the list immediately below as 'Pending' until the recipient activates his/her account.

Figure 71:
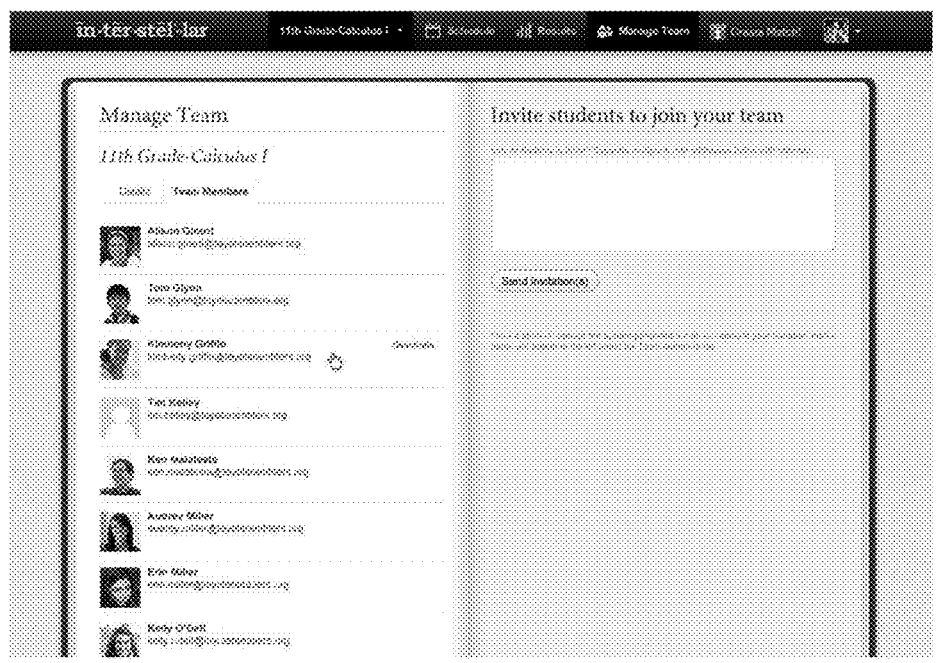
FIG. 71 illustrates a page presented when the e-mail recipients listed as 'Pending' in FIG. 70 have all activated their accounts.

FIG. 71 illustrates a page presented when the e-mail recipients listed as 'Pending' in FIG. 70 have all activated their accounts. The Coach has clicked the 'Team Members' tab. When the recipient of an invitation to join a team in the Interstellar Network accepts, his/her name and e-mail address appears in the alphabetized 'Team Members' list. When the Coach places the cursor over a Team Member, a 'Deactivate' button appears. When clicked, the Team Member is deactivated from the team. The Team Member still has access to the system, but cannot participate in future competitions.

Figure 72:
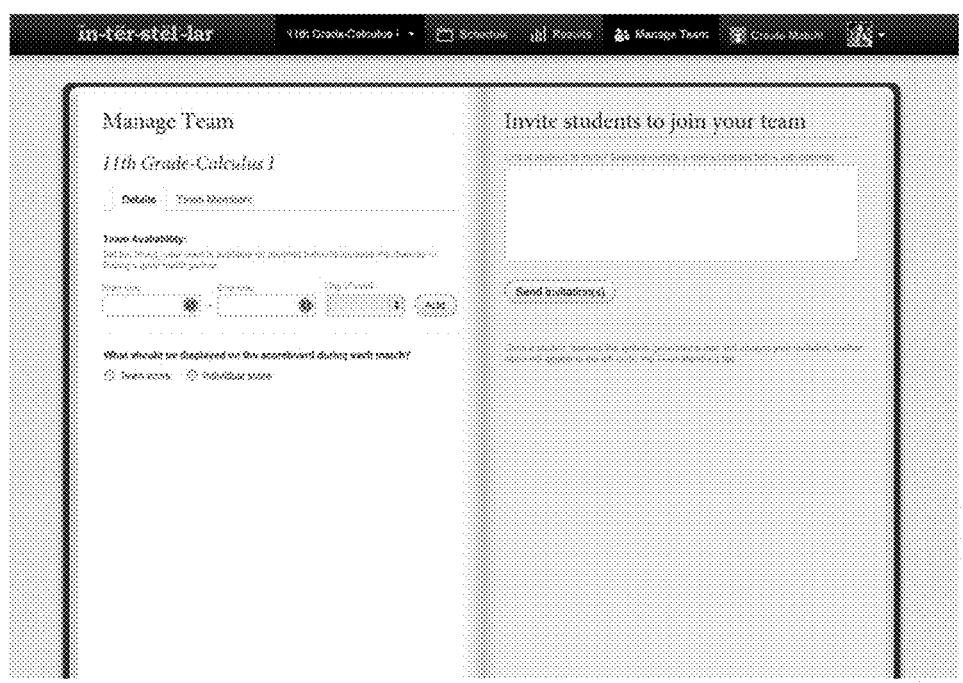
FIG. 72 illustrates a page presented when the Coach has just clicked the 'Details' tab.

FIG. 72 illustrates a page presented when the Coach has just clicked the 'Details' tab. The Coach may enter multiple periods when his/her team is available to compete in the 'Team Availability' area by filling out the required fields and clicking the 'Add' button. Later, when a Coach is attempting to schedule a 'Pick-Up Play' match for his/her team and is searching for a team to compete against, the system automatically searches and display teams for the Coach to choose from that have common availability.

Figure 73:
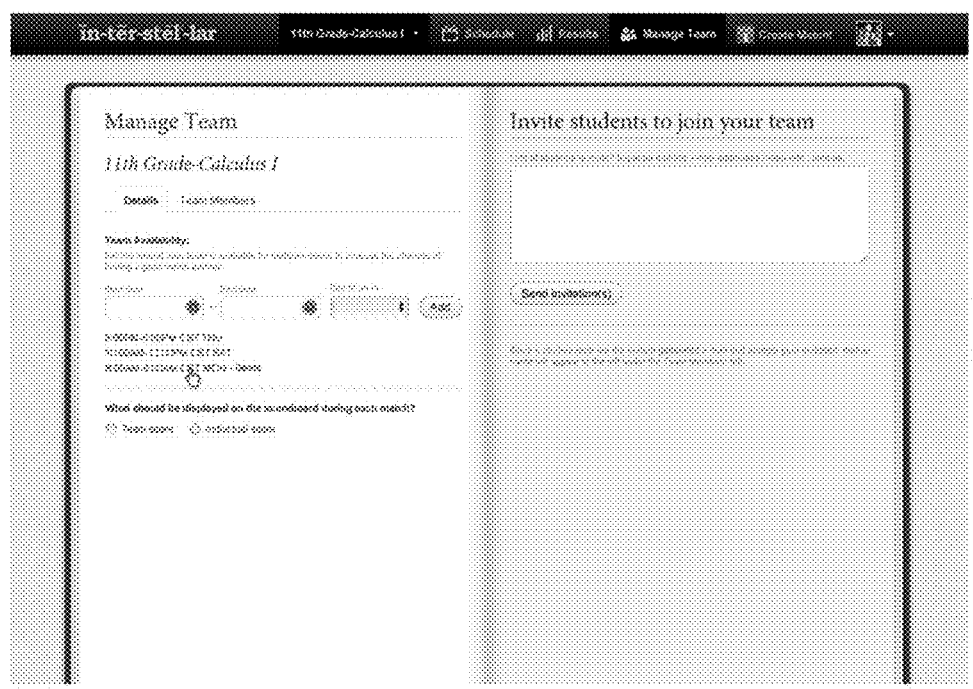
FIG. 73 illustrates a page presented when the Coach has just added a time period of availability.

FIG. 73 illustrates a page presented when the Coach has just added a time period of availability. When a Coach adds a time period of availability, it automatically appears in the list below the 'Team Availability' fields. A 'Delete' button appears when the cursor hovers above it. When the 'Delete' button is clicked, the time period is removed from the list.

Figure 74:
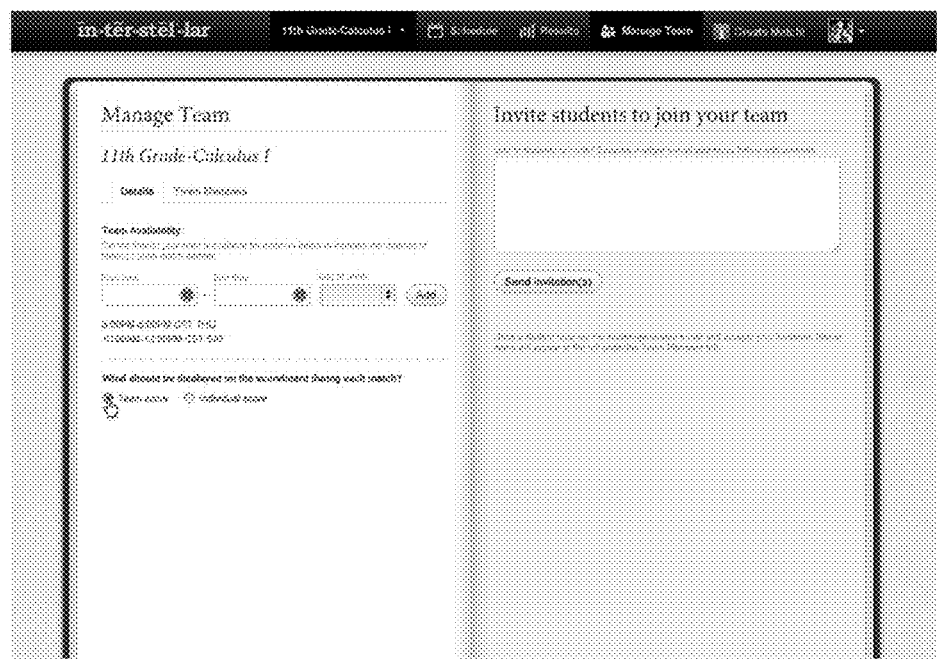
FIG. 74 illustrates a page presented when the Coach selects the score to be displayed on the scoreboard.

FIG. 74 illustrates a page presented where the Coach can either select 'Individual Score' or 'Team Score'. As illustrated below, when the Coach selects the former, the scoreboard displayed to the individual during any competition event for this team shows the score (number of questions answered correctly) of both the individual and of his/her matched opponent. Even though the system automatically matches Team Members, the results of this process may be overridden by the Coach if he/she selects 'Team Score.' In this case, the scoreboard displayed to the Team Member shows the 'Team Score' of his/her team and the 'Team Score' of his/her opponent's team. The ability to display 'Team Score' depends on two teams competing live. If they are not competing live (this scenario only occurs in League Play), the scoreboard displays the individual's score versus his/her Personal Best Opponent score, regardless of the Coach's score selection.

Figure 75:
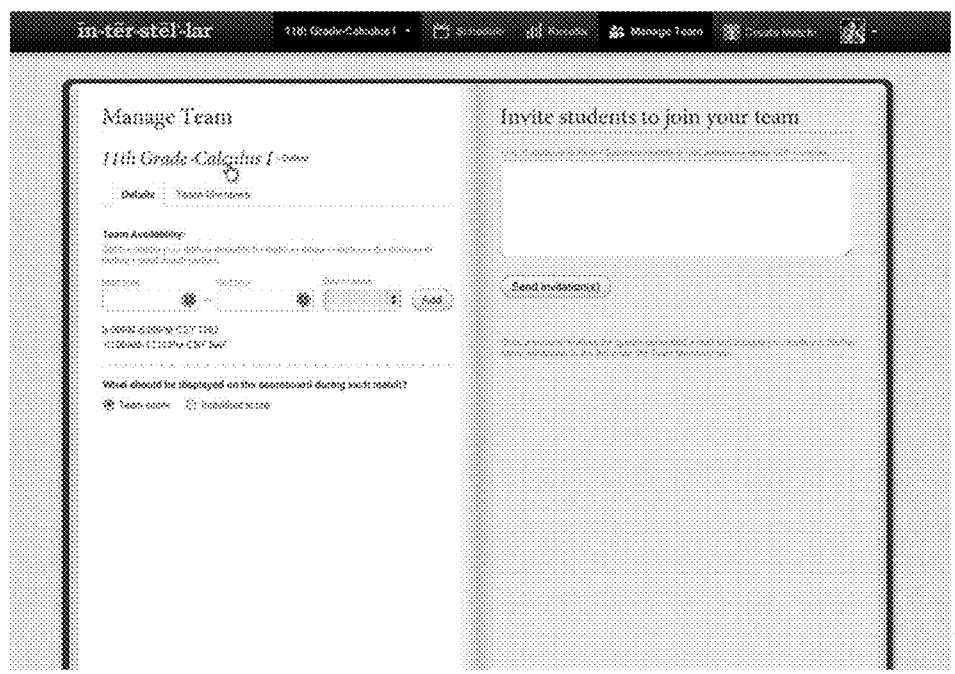
FIG. 75 illustrates a page presented when the Coach places the cursor over the team name and a 'Delete' button appears allowing the Coach to delete that team from the system.

FIG. 75 illustrates a page presented when the Coach places the cursor over the team name and a 'Delete' button appears allowing the Coach to delete that team from the system. Though not displayed, when the 'Delete' button is clicked, an alert dialog box appears requiring the Coach to confirm his/her decision to delete the team by clicking 'OK'. If the Coach does not wish to delete the team, he/she may close the box. If the Coach clicks 'OK', the team is deleted and another alert dialog box appears confirming the team has been deleted.

Figure 76:
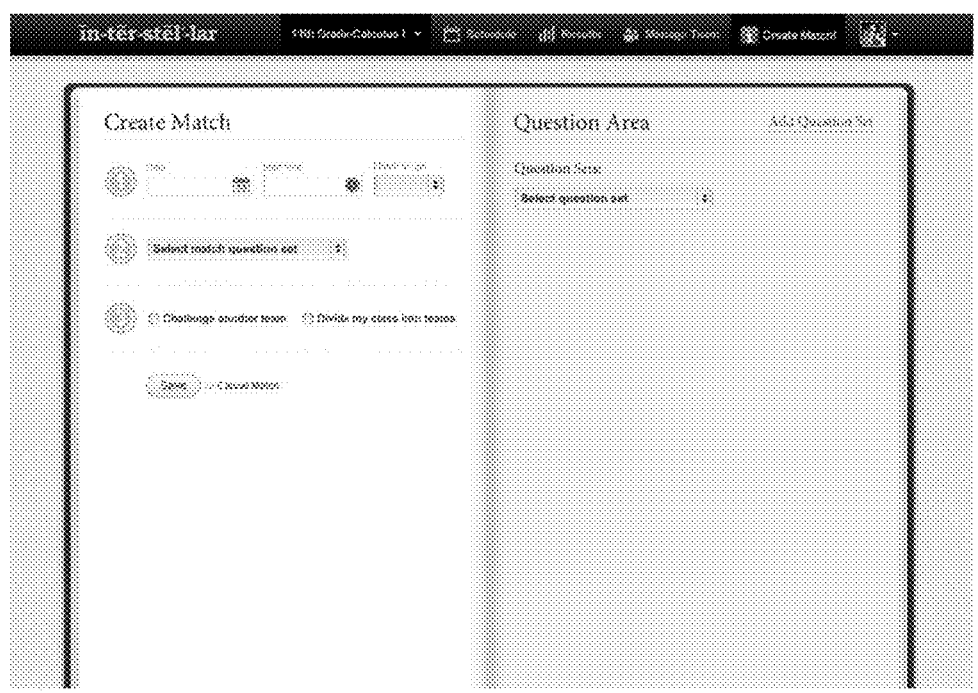
FIG. 76 illustrates a page presented when the Coach has just clicked the 'Create Match!' button.
Figure 77:
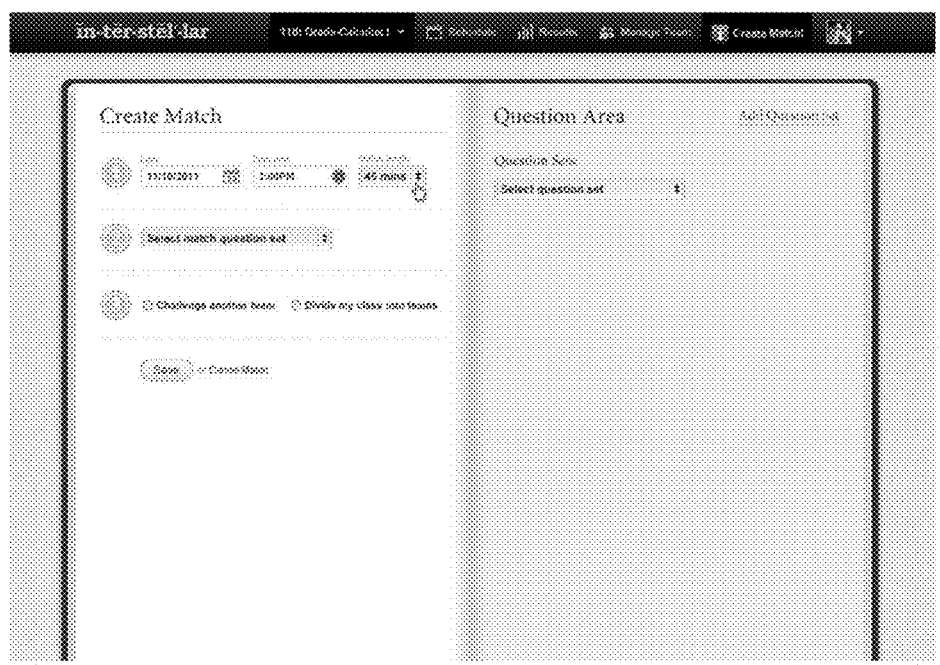
FIG. 77 illustrates that the first step in creating a Pick-Up Play match is to select the date and start time for the match, as well as the length of the match.
Figure 78:
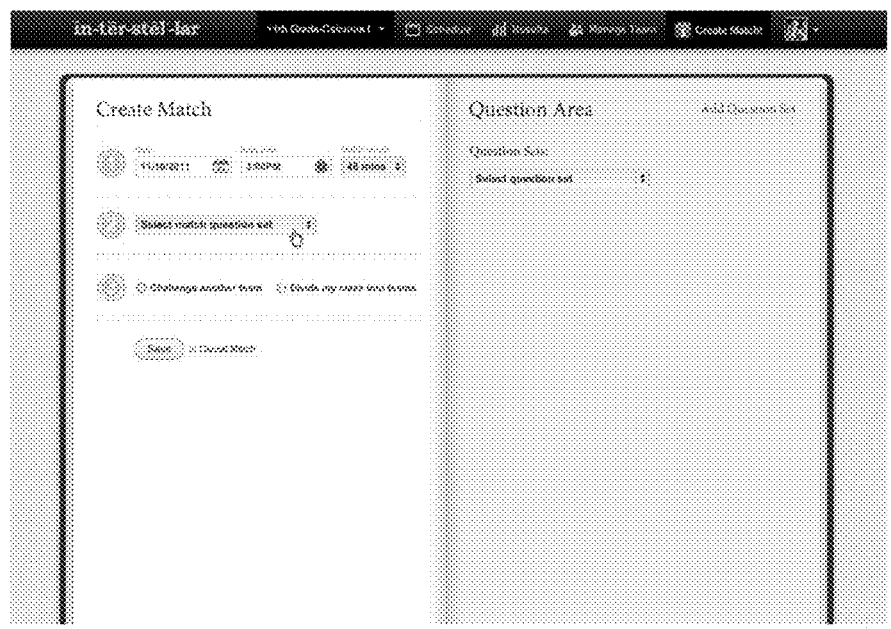
FIG. 78 illustrates that the second step in creating a Pick-Up Play match is to select a question set from the dropdown on the left page.

FIG. 76 illustrates a page presented when the Coach has just clicked the 'Create Match!' button. When the Coach clicks 'Create Match!' he/she is brought to the Create Match page. On the left hand side of the page are 3 areas/steps, all of which must be completed to create a Pick-Up Play match. On the right page is the 'Question Area'. It follows the same logic as the 'Question Area' in the Administrator area, except that a Coach cannot delete a question from the Interstellar Network Library unless he/she created it originally. FIG. 77 illustrates that the first step in creating a Pick-Up Play match is to select the date and start time for the match, as well as the length of the match. FIG. 78 illustrates that the second step in creating a Pick-Up Play match is to select a question set from the dropdown on the left page. These question sets are identical to those that would be found in the question set dropdown on the right hand side of the page.

Figure 79:
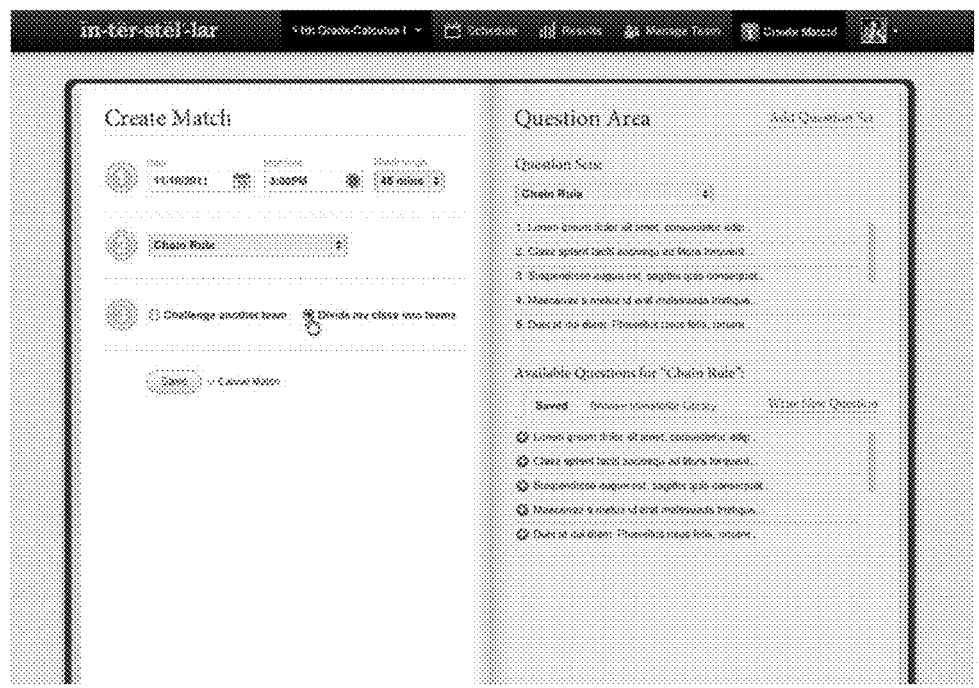
FIG. 79 illustrates a page presented when a question set (chain rule) has just been selected and the third step in creating a Pick-Up Play match is taken, choice of opponents.

FIG. 79 illustrates a page presented when a question set (chain rule) has just been selected. When a question set is selected, the 'Question Area' populates with the stored information relating to that question set.

Figure 80:
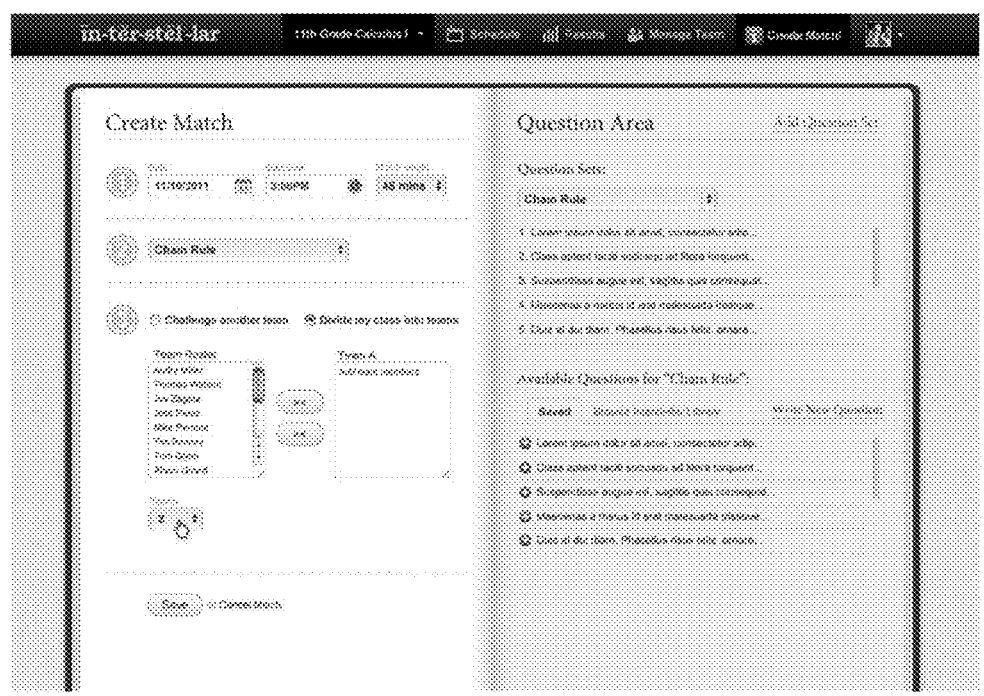
FIG. 80 illustrates a page presented when the Coach has chosen to divide his/her team into multiple teams.

FIG. 80 illustrates a page presented when the Coach has chosen to divide his/her team into multiple teams, an option relating to the third step in creating a Pick-Up Play match. When a Coach has chosen to divide his/her team into multiple teams, three fields appear: the 'Team Roster' field, the team creation field, and the team number dropdown. The names of all the Team Members appear in the 'Team Roster' field (ordered by rank). The Coach can divide his/her team into a number of smaller teams by choosing the appropriate number from the dropdown.

Figure 81:
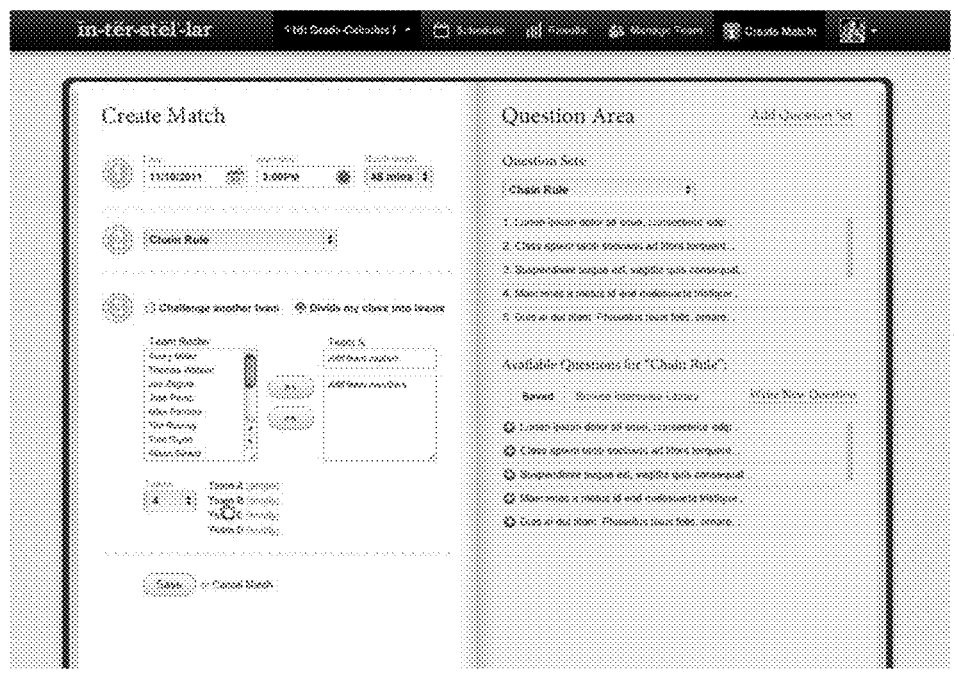
FIG. 81 illustrates a page presented when a number for the amount of teams has just been selected.

FIG. 81 illustrates a page presented when a number for the amount of teams has just been selected. When the number for the amount of teams is chosen, a list of teams appears corresponding to that number. Once a team is selected, the Coach can select a student for a particular team or return a particular student to the Team Roster field by highlighting the student and utilizing the two arrow buttons. If two teams have been chosen, the system requires that they be divided as evenly as possible. If one of the two teams has two or more students than the other, an alert box appears prompting the Coach to make the teams more even. If three or more teams have been chosen, a separate slot appears in the team creation field for the 'team captain'. This slot is occupied by the last Team Member selected for a particular team. The 'team captain' is the only Team Member on each subdivided team that signs in for the competition event and completes the test. This functionality is intended for the Coach who wants his/her students to work together during the competition event, not independently. Only the results of the original team, not those of the teams that have been created by dividing the original team, are recorded in the Results pages of both the Coach and Team member.

Figure 82:
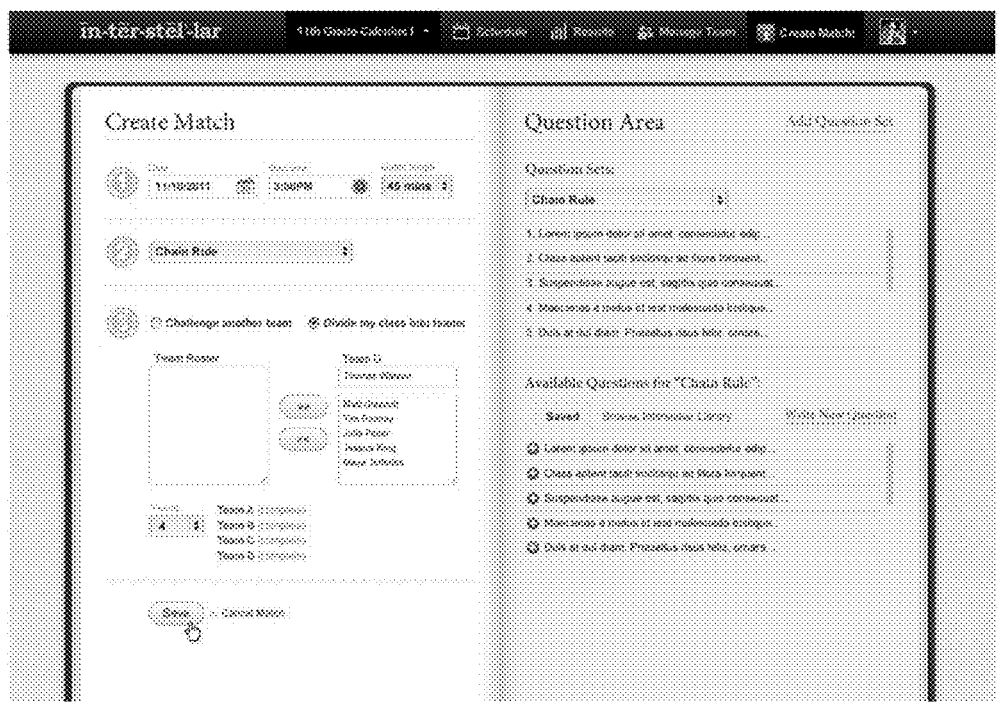
FIG. 82 illustrates a page presented when the Coach has filled out all the teams and clicks the 'Save' button.

FIG. 82 illustrates a page presented when the Coach clicks the 'Save' button, and a selection is missing. As illustrated, an alert box appears directing the Coach to complete the selection. If the Coach clicks 'Save' and all the required selections have been made, the competition event becomes active and will take place unless canceled. The competition event appears on the 'Schedule' calendar of the Coach as 'Scheduled' and on the 'Schedule' calendar of every Team Member. If only two teams have been created, the system runs the Interstellar Matching Team Member Algorithm that evenly matches Team Members from the opposing two teams for the competition event. Once the Coach has selected at least one Team Member for a team and clicks another team, "(complete)" appears next to the team to which the Team Member was added. "(complete)" will appear next to the team unless all Team Members are removed, in which case the area returns to being blank.

Figure 83:
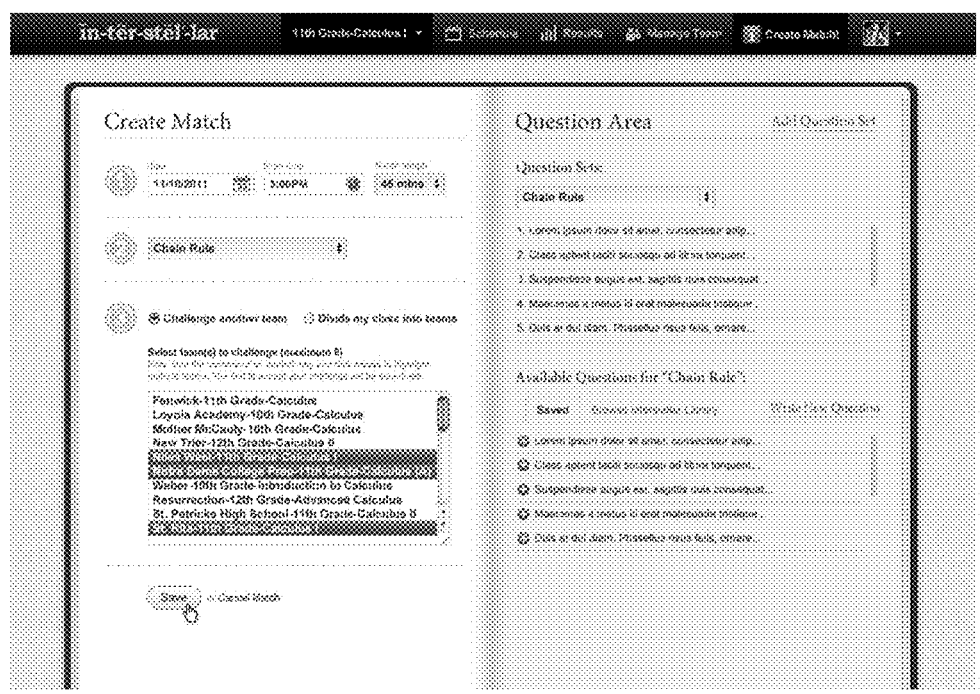
FIG. 83 illustrates a page presented when the Coach has chosen to challenge another team.

FIG. 83 illustrates a page presented when the Coach has chosen to challenge another team, another option relating to the third step in creating a Pick-Up Play match. When a Coach chooses to challenge another team, a list of possible teams to challenge appears in a new field. By selecting the teams in the dropdown, the Coach may invite multiple teams for a competition. The system sorts teams first by grade level and then by course. Only teams with common availability times are displayed. If the Coach clicks the 'Save' button, and a selection is missing, an alert box appears directing the Coach to complete the selection. If the Coach clicks 'Save' and all the required selections have been made, the event then appears on the 'Schedule' calendar of the Coach as 'Pending'. It will only take place if another Coach accepts.

Figure 84:
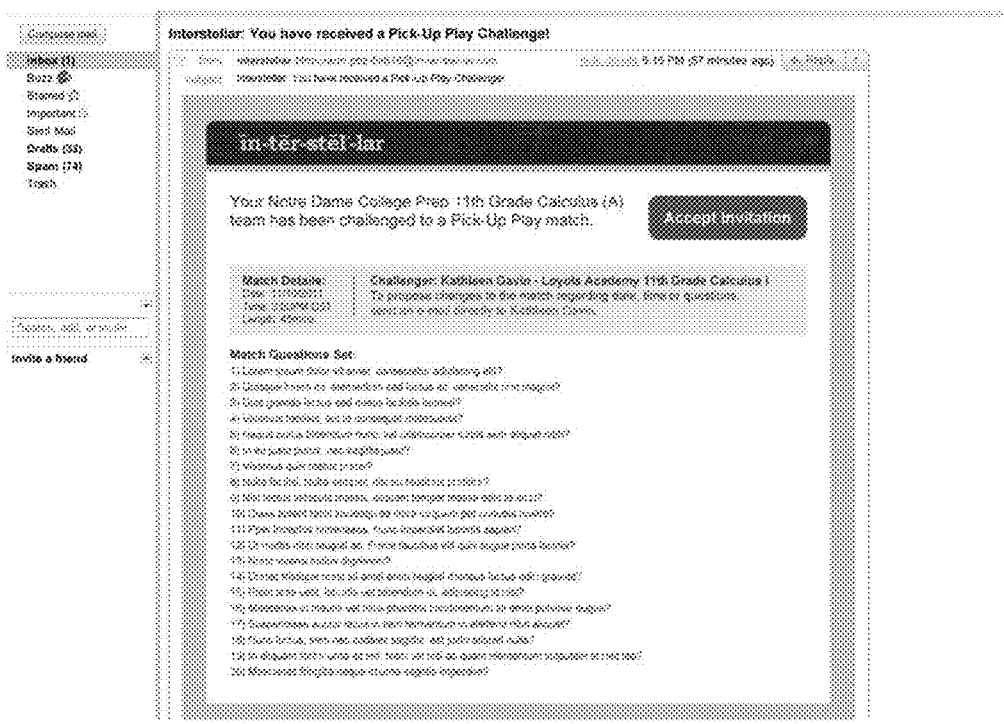
FIG. 84 illustrates a page presented when the Coach has just sent a challenge to another team or teams via an email invitation.

FIG. 84 illustrates a page presented when the Coach has just clicked 'Send Challenge' on a 'Match Summary' page. When a Coach clicks 'Send Challenge' on a 'Match Summary' page, an e-mail invitation is sent to all the Coaches that he/she has chosen to invite.

Figure 85:
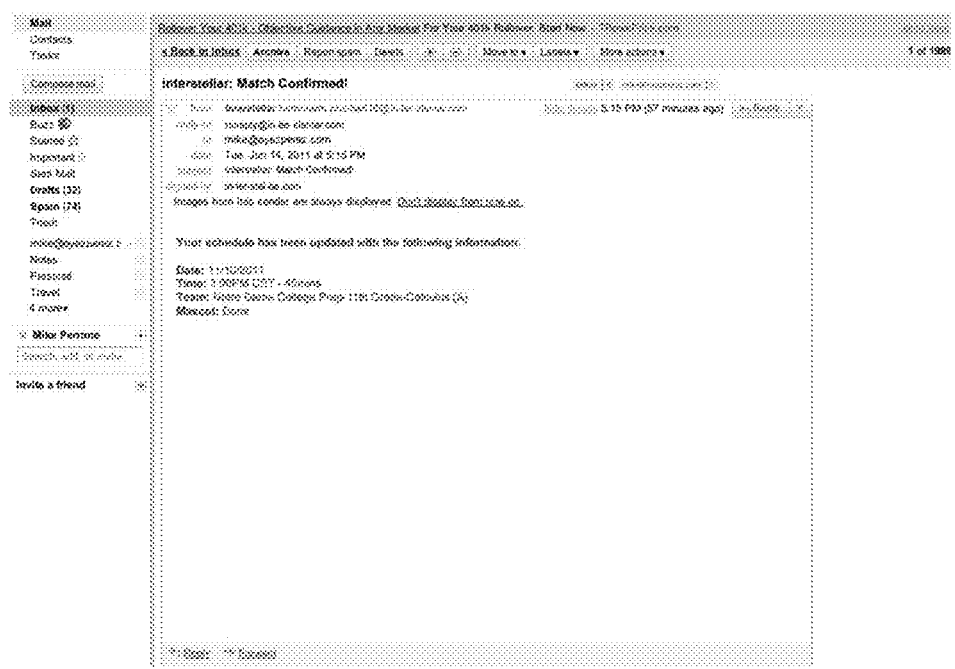
FIG. 85 illustrates a page presented when the Coach has already sent a challenge to another team or teams, the invitation is accepted, and an email confirmation is produced.

FIG. 85 illustrates a page presented when the Coach has sent a challenge to another team or teams. The first Coach to accept a challenge invitation from another Coach wins the challenge. When the first Coach accepts, the competition event becomes active and will take place unless canceled; the competition event appears on the 'Schedule' calendar of both Coaches as 'Scheduled' and on the 'Schedule' calendar of every Team Member from both opposing teams. The system runs the Interstellar Matching Team Member Algorithm to evenly match Team Members from both opposing teams for the competition event. Both the sending Coach and the accepting Coach receive an email confirming that the match has been set.

Figure 86:
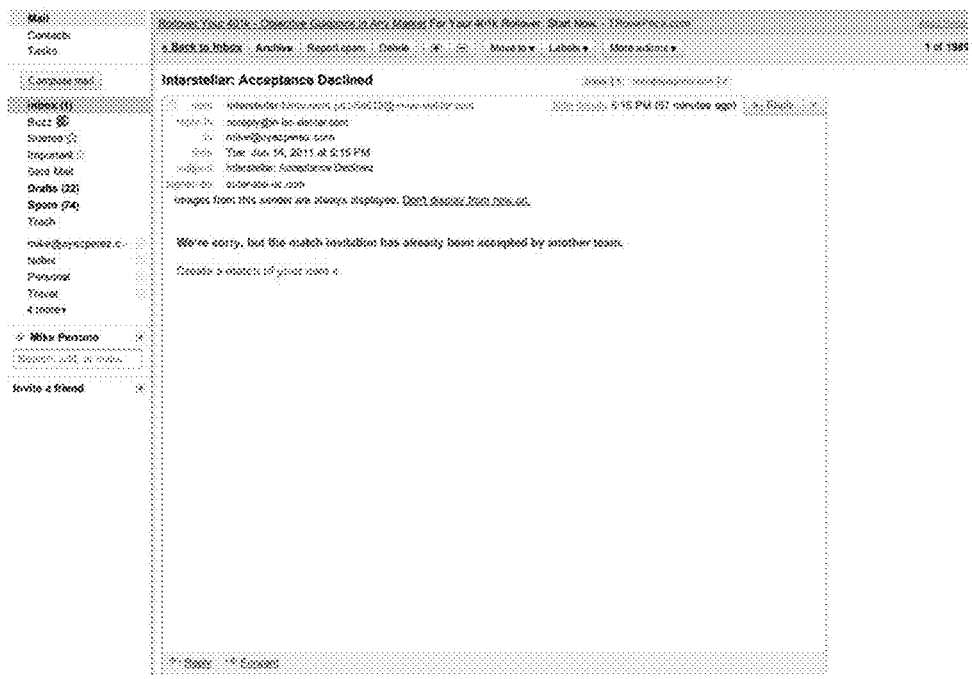
FIG. 86 illustrates a page presented when the Coach has sent a challenge to another team or teams but another Coach has accepted the challenge first.

FIG. 86 illustrates a page presented when the Coach has sent a challenge to another team or teams but another Coach has accepted a challenge first. In such a case, or if the match is canceled/expires, a Coach accepting a challenge invitation subsequent to these events receives an email reciting that his/her acceptance has been denied.

Figure 87:
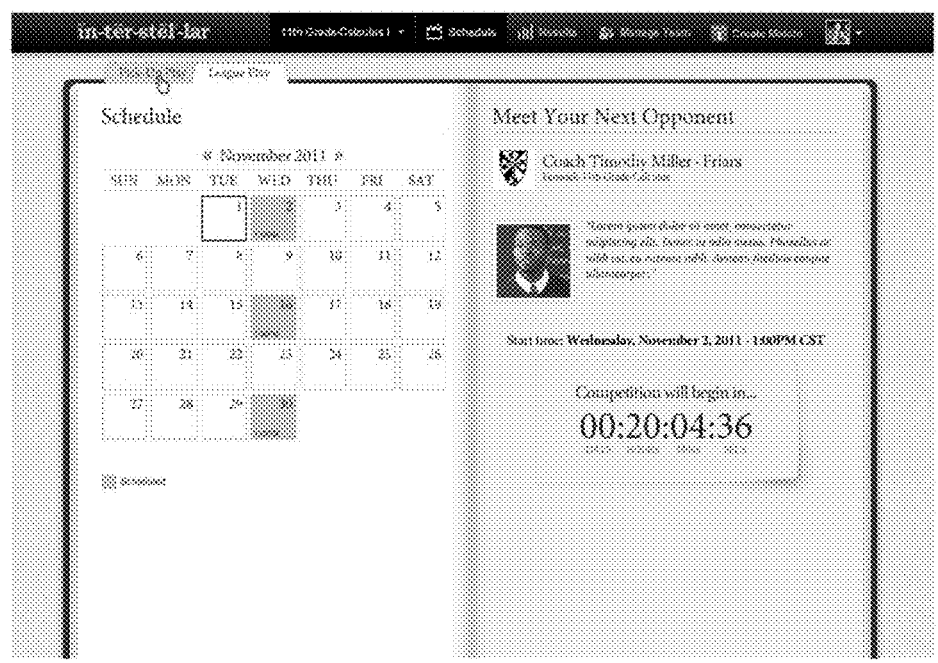
FIG. 87 illustrates a page presented when the Coach has selected a team from the 'Team' dropdown and clicked 'Schedule' (the order of these steps does not matter in the system).

FIG. 87 illustrates a page presented when the Coach has selected a team from the 'Team' dropdown and clicked 'Schedule' (the order of these steps does not matter in the system). When the 'Schedule' link is clicked for any team, the system displays that team's calendar of events on the left hand side of the page, divided by tabs into two categories: 'League Play' and 'Pick-Up Play'. The system automatically selects the tab in which the next event for the team is scheduled to occur. Here, the system has selected the 'League Play' tab since that is the category of the next event. The Coach may switch from the 'League Play' 'Schedule' page to the 'Pick-Up Play' 'Schedule' page, and vice versa, by clicking the relevant tab. If a team does not have a competition in one of the two categories scheduled, then the tab page appears empty when the tab is clicked, except for the calendar and the headings. The calendar displays the team's 'Scheduled' 'League Play' events, both their date and time. The 'Meet Your Next Opponent' field introduces the Coach to his/her next opponent Coach in time. It describes the school which the opponent Coach is from and the grade/subject of his team. It also contains the short biography that would be found in the opponent Coach's profile page. The 'Start time' field alerts the Coach to the exact time of the next competition in time as well as the exact amount of time until the competition begins (displayed by the countdown timer).

Figure 88:
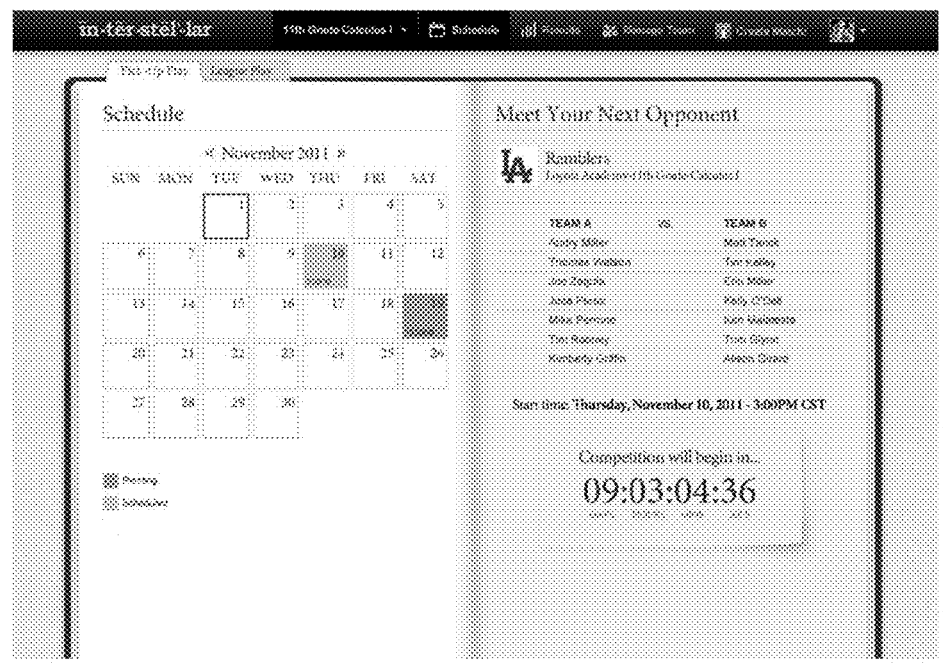
FIG. 88 illustrates a page presented when the Coach has clicked the 'Pick-Up Play' tab where the next match is a 'Pick-Up Play Intra-team' competition.

FIG. 88 illustrates a page presented when the Coach has clicked the 'Pick-Up Play' tab. The next 'Pick-Up Play' competition event is one in which the Coach divided his team into two teams which will compete against each other (referred to as 'Pick-Up Play Intra-team' competition herein). The calendar displays the team's 'Scheduled' 'Pick-Up Play' events, both their date and time. If more than one 'Pick-Up Play' competition is scheduled on one date, the times stack in the date square. The calendar displays 2 types of 'Pick-Up Play' related markers: 'Pending' and 'Scheduled'. The 'Pending' marker denotes a competition which has been sent to another Coach or Coaches for acceptance, but which has not as yet been accepted by another Coach. The 'Scheduled' marker denotes a competition that is active in the system. There are never 'Pending' markers displayed on a 'League Play' 'Schedule' page. Since the next competition event is one in which the Coach has divided his team into two teams, those two teams both appear under 'Meet Your Next Opponent'. The Coach's own school name/ mascot appear for clarity and consistency in the system. The 'Start time' field alerts the Coach to the exact time of the next competition in time as well as the exact amount of time until the competition begins (displayed by the countdown timer).

Figure 89:
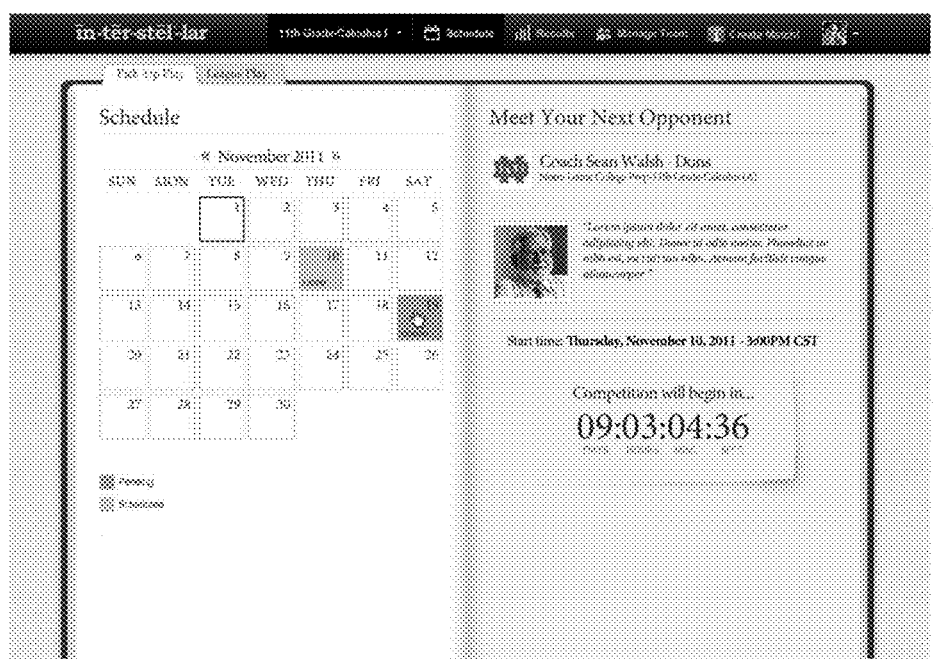
FIG. 89 illustrates a page presented when the Coach has clicked the 'Pick-Up Play' tab where the next match is a 'Pick-Up Play Inter-team' competition, with the cursor hovering above a date of a pending match.

FIG. 89 illustrates a page presented when the Coach has clicked the 'Pick-Up Play' tab. The next 'Pick-Up Play' competition event is one in which the Coach has challenged another team (referred to as 'Pick-Up Play Inter-team' competition herein). Since the next 'Pick-Up Play' competition event is one in which the Coach has challenged another team, that team appears under 'Meet Your Next Opponent'.

Figure 90:
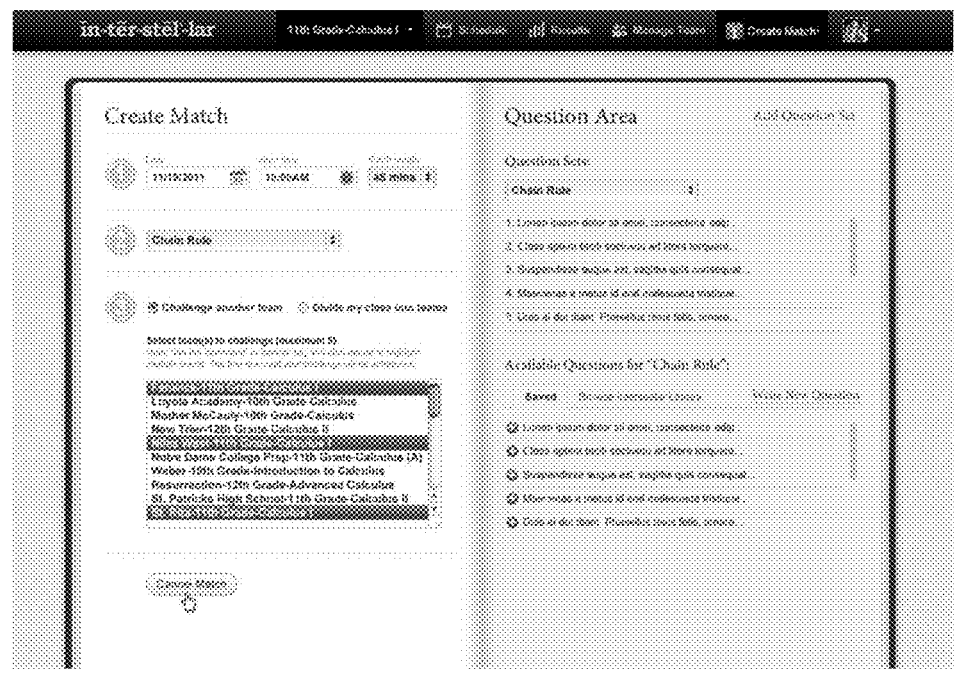
FIG. 90 illustrates a page presented when the Coach has just clicked a 'Pending' 'Pick-Up Play Inter-team' competition on a 'Pick-Up Play' 'Schedule' page.

FIG. 90 illustrates a page presented when the Coach has just clicked a 'Pending' 'Pick-Up Play' Inter-team competition on a 'Pick-Up Play' 'Schedule' page. If a competition is 'Pending' it is always a 'Pick-Up Play Inter-team' competition. When the Coach clicks a 'Pending' 'Pick-Up Play Inter-team' competition on a 'Pick-Up Play' 'Schedule' page, he/she is returned to the 'Create Match!' area where the 'Pending' competition was originally created. However, there is one difference: the 'Save' button is no longer present, only a 'Cancel Match' button. When the 'Cancel' button is clicked, the pending match is removed from the Coach's calendar and the system generally.

Figure 91:
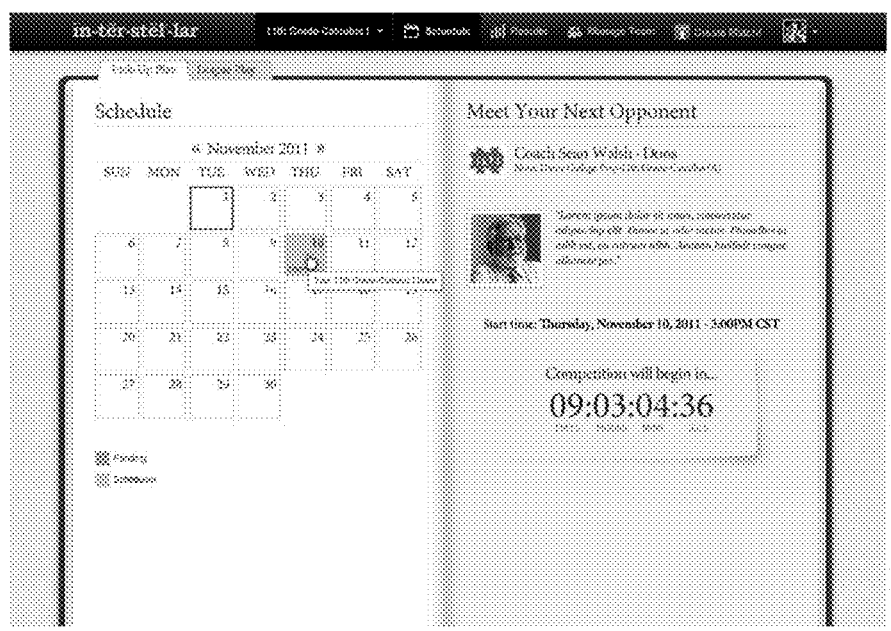
FIG. 91 illustrates a page presented when a 'Pending' 'Pick-Up Play Inter-team' competition has just been canceled.

FIG. 91 illustrates a page presented when a 'Pending' 'Pick-Up Play' Inter-team competition has just been canceled. By placing the cursor over a date with an event scheduled in either 'League Play' or 'Pick-Up Play', the Coach can view the opponent school.

Figure 92:
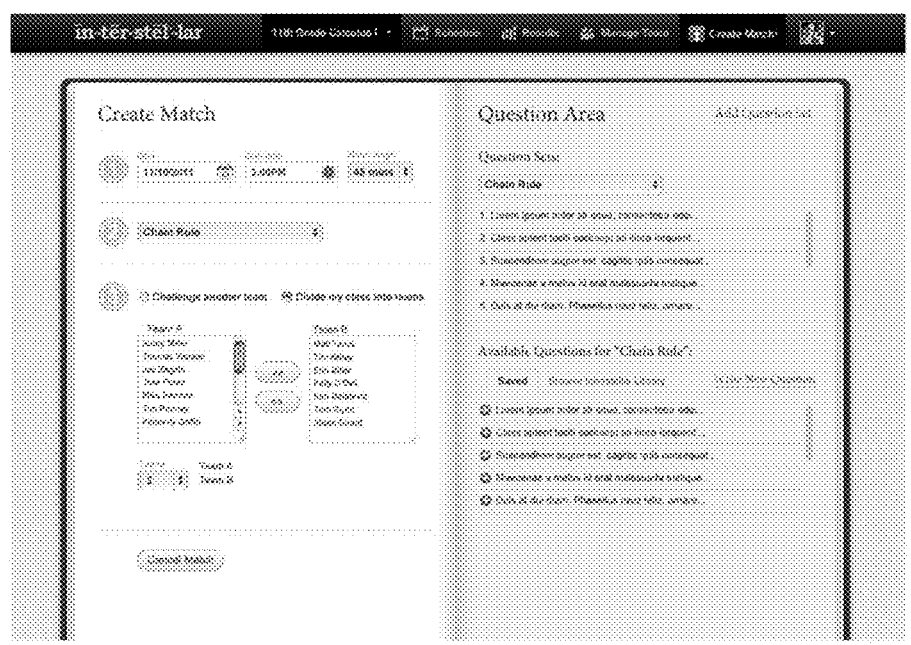
FIG. 92 illustrates a page presented when the Coach has just clicked a 'Scheduled' 'Pick-Up Play Intra-team' competition on a 'Pick-Up Play' 'Schedule' page.

FIG. 92 illustrates a page presented when the Coach has just clicked a 'Scheduled' 'Pick-Up Play Intra-team' competition on a 'Pick-Up Play' 'Schedule' page. When the Coach clicks a 'Scheduled' 'Pick-Up Play Intra-team' competition on a 'Pick-Up Play' 'Schedule' page, he/she is returned to the 'Create Match!' area where the 'Scheduled' competition was originally created. However, there is one difference: the 'Save' button is no longer present, only a 'Cancel Match' button. When the 'Cancel' button is clicked, the 'Scheduled' match is removed from the system, disappearing from the calendars of both the Coach and all the Team Members on the Team.

Figure 93:
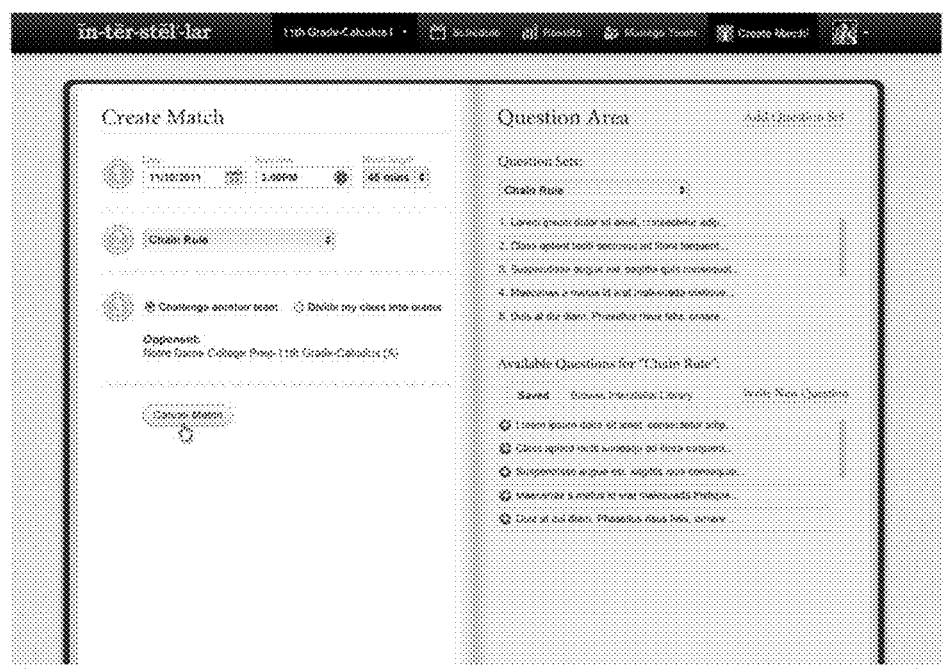
FIG. 93 illustrates a page presented when the Coach has just clicked a 'Scheduled' 'Pick-Up Play Inter-team' competition on a 'Pick-Up Play' 'Schedule' page.

FIG. 93 illustrates a page presented when the Coach has just clicked a 'Scheduled' 'Pick-Up Play' Inter-team competition on a 'Pick-Up Play' 'Schedule' page. When the Coach clicks a 'Scheduled' 'Pick-Up Play Inter-team' competition on a 'Pick-Up Play' 'Schedule' page, he/she is returned to the 'Create Match!' area where the 'Scheduled' competition was originally created. However, there is one difference: the 'Save' button is no longer present, only a 'Cancel Match' button. When the 'Cancel' button is clicked, the 'Scheduled' match is removed from the system, disappearing from the calendars of both Coaches and all the Team Members of both Teams.

Figure 94:
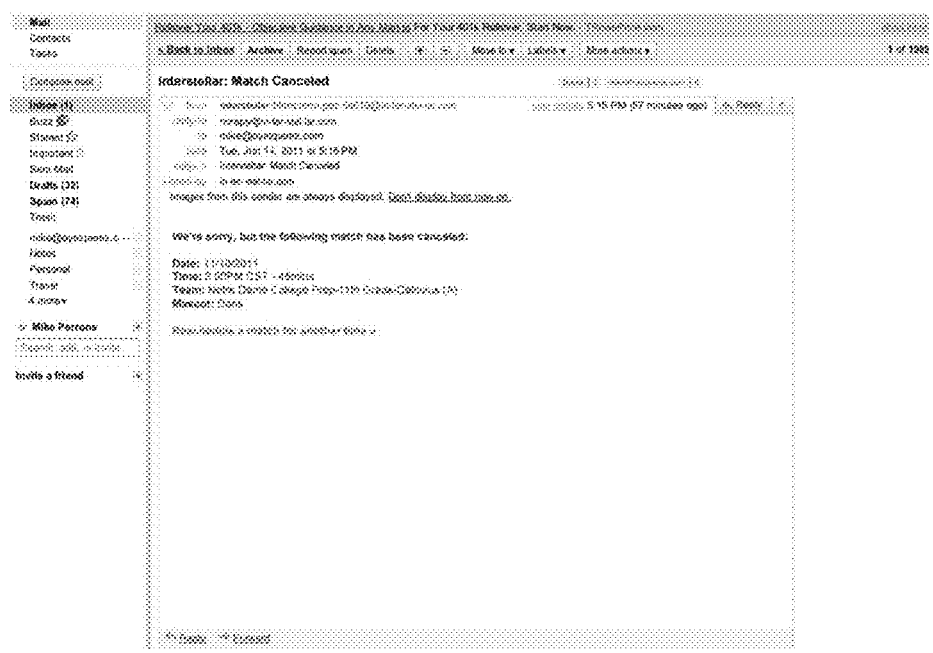
FIG. 94 illustrates a page presented when the Coach has just canceled a 'Scheduled' 'Pick-Up Play Inter-team' competition and an email confirmation is sent.

FIG. 94 illustrates a page presented when the Coach has just canceled a 'Scheduled' 'Pick-Up Play Inter-team' competition. When a Coach cancels a 'Scheduled' 'Pick-Up Play Inter-team' competition, an email is sent to the accepting Coach instructing him/her of the cancellation.

Figure 95:
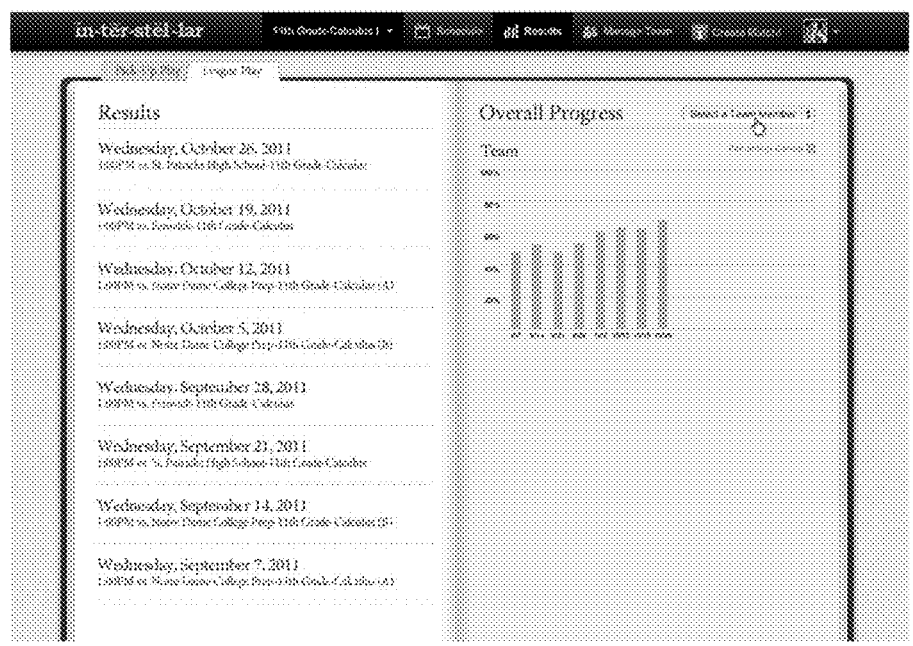
FIG. 95 illustrates a page presented when the Coach has selected a team from the 'Team' dropdown and clicked 'Results' (the order of these steps does not matter in the system).

FIG. 95 illustrates a page presented when the Coach has selected a team from the 'Team' dropdown and clicked 'Results' (the order of these steps does not matter in the system). When the 'Results' link is clicked for any team, the system displays that team's results divided by tabs into two categories: 'Pick-Up Play' and 'League Play'. The system automatically selects the tab in which the next event for the team is scheduled to occur. Here, the system has selected the 'League Play' tab since that is the category of the next event. The Coach may switch from the 'League Play' 'Schedule' page to the 'Pick-Up Play' 'Schedule' page, and vice versa, by clicking the relevant tab. Though not necessary, the same type of data, and data presentation formats, are used in both the 'League Play' and 'Pick-Up Play' tabs for all Coach 'Results' pages. When either tab is clicked, the 'Overall Progress' page appears first. If a team has not had a competition in one of the two categories, then the tab page appears empty when the tab is clicked, except for the headings. If a team has had a competition in one of the two categories, then the results will appear as shown. The left hand side of the page lists the date the team competed, the time, and the team against which it competed. The right hand side of the page shows a graph that aggregates data from all the competitions of this team, displaying the percentage of questions that the team answered correctly on average for each date of competition.

Figure 96:
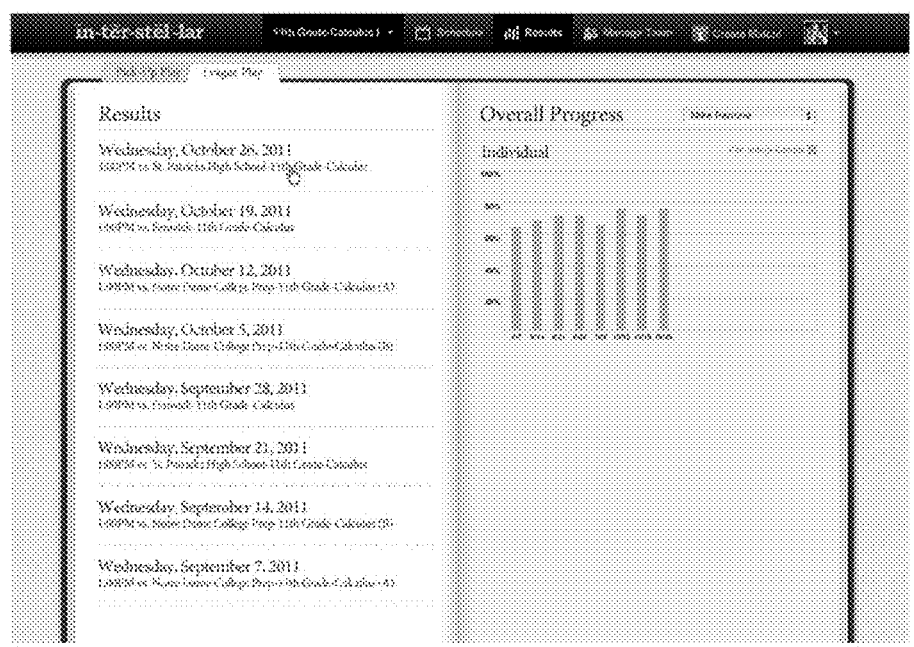
FIG. 96 illustrates a page presented when the Coach has just selected a Team Member from the 'Select a Team Member' dropdown on the 'Overall Progress' page.

FIG. 96 illustrates a page presented when the Coach has just selected a Team Member from the 'Select a Team Member' dropdown on the 'Overall Progress' page. When the Coach selects a Team Member from the 'Select a Team Member' dropdown on the 'Overall Progress' page, the right hand side of the page shows a graph that aggregates data from all the competitions of this Team Member, displaying the percentage of questions that he/she answered correctly for each date of competition.

Figure 97:
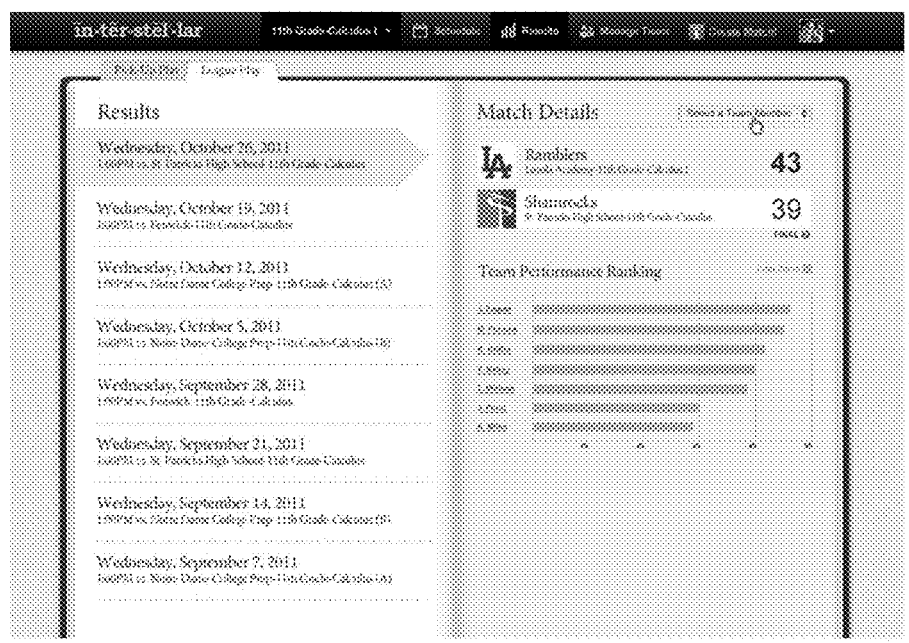
FIG. 97 illustrates a page presented when the Coach has just clicked the highlighted field.

FIG. 97 illustrates a page presented when the Coach has just clicked the highlighted field. When a Coach clicks a date field on the left page, the field fills in color and two data presentations appear on the right page. The first shows the final 'Team Score,' and the second shows a ranking of all Team Members by number of questions answered correctly. The 'Final ?' button, when clicked, triggers an alert box which explains how 'Team Score' is calculated.

Figure 98:
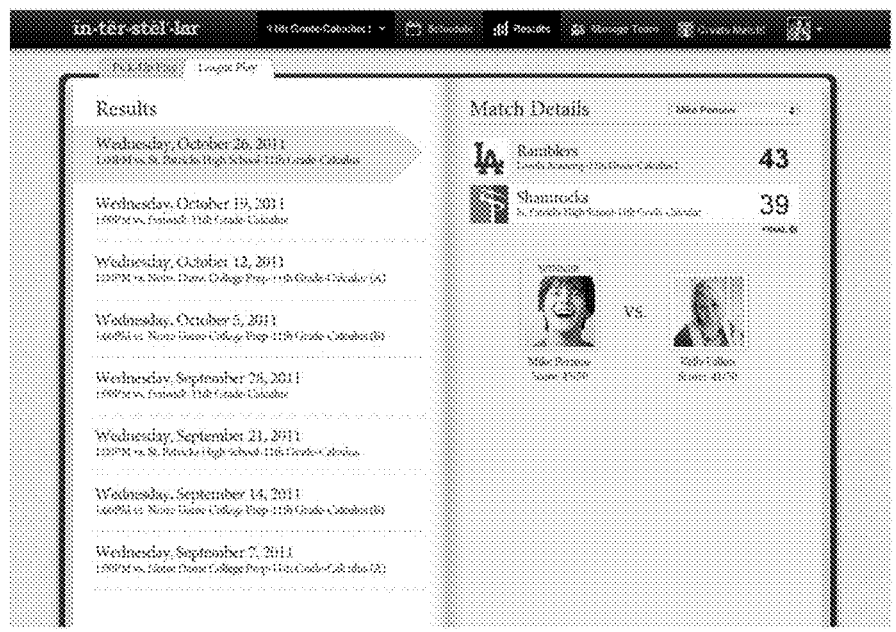
FIG. 98 illustrates a page presented when the Coach has just selected a Team Member from the 'Select a Team Member' dropdown on the 'Match Details' page.

FIG. 98 illustrates a page presented when the Coach has just selected a Team Member from the 'Select a Team Member' dropdown on the 'Match Details' page. When the Coach selects a Team Member from the 'Select a Team Member' dropdown on the 'Match Details' page, two data presentations appear on the right hand side of the page. The first shows the final 'Team Score,' and the second shows the individual performance of the Team Member and his matched opponent. This appears even if the Coach has selected 'Team Score' for this team, only no opponent information would be presented.

Team Member Screens

Figure 99:
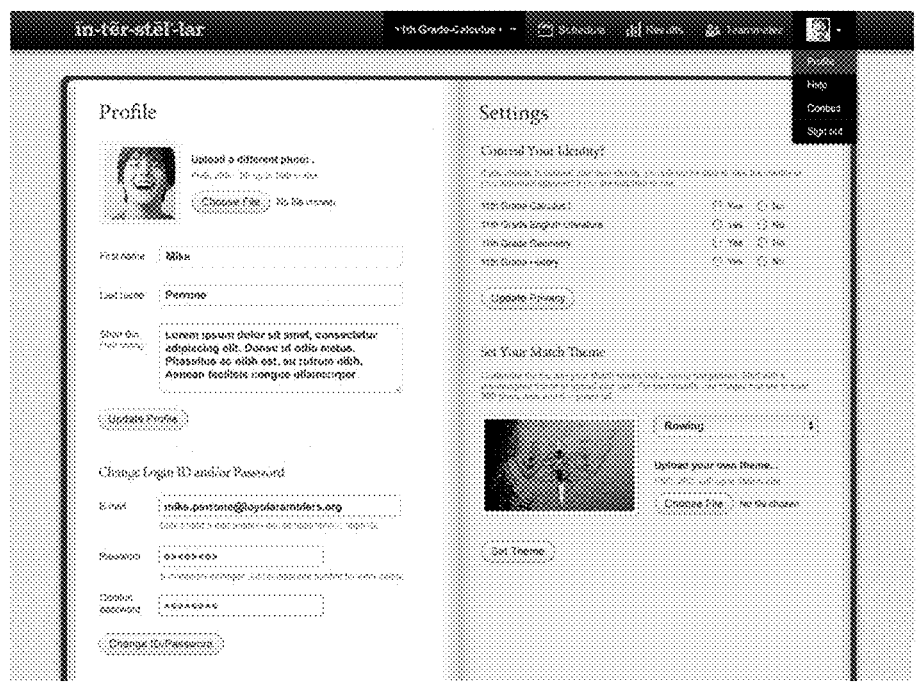
FIG. 99 illustrates a page presented when the Team Member has just clicked the 'Profile' link on his/her navigation bar.

FIG. 99 illustrates a page presented when the Team Member has just clicked the 'Profile' link on his/her navigation bar. The navigation bar at the top of the screen organizes the Team Member domain into 3 areas: Teammates, Results, and Schedule. The logic of the navigation bar for the Team Member follows the logic of the navigation bar for the Coach as noted above. On the left hand side of the page, the Team Member uploads a profile photo, adds/edits his/her name, enters a brief biographical description, or modifies his/her email address and password information by entering the information and clicking the 'Change ID/Password' button. On the right hand side of the page, for any team where the Coach has chosen to display 'Individual score' on the scoreboard, the Team Member may elect to have his identity concealed from his matched opponent by clicking the 'Yes' next to the team (all teams of which the Team Member is a member appear in this list). If the Team Member elects to have his identity concealed, he/she will not be able to view the identity of his/her matched opponent (assuming it is someone other than his/her Personal Best Opponent). In addition, the Team Member may choose a background image for the match area from those offered by the Interstellar Network or may upload his/her own photo. The dropdown at the upper right lists 'Profile' and 'Sign out'. When 'Profile' is clicked the Team Member is brought to the present page. When 'Sign out' is clicked, the Team Member is logged out of the system and returned to the Interstellar Network home page. The photo that the Team Member uploads is used as the heading of the dropdown.)

Figure 100:
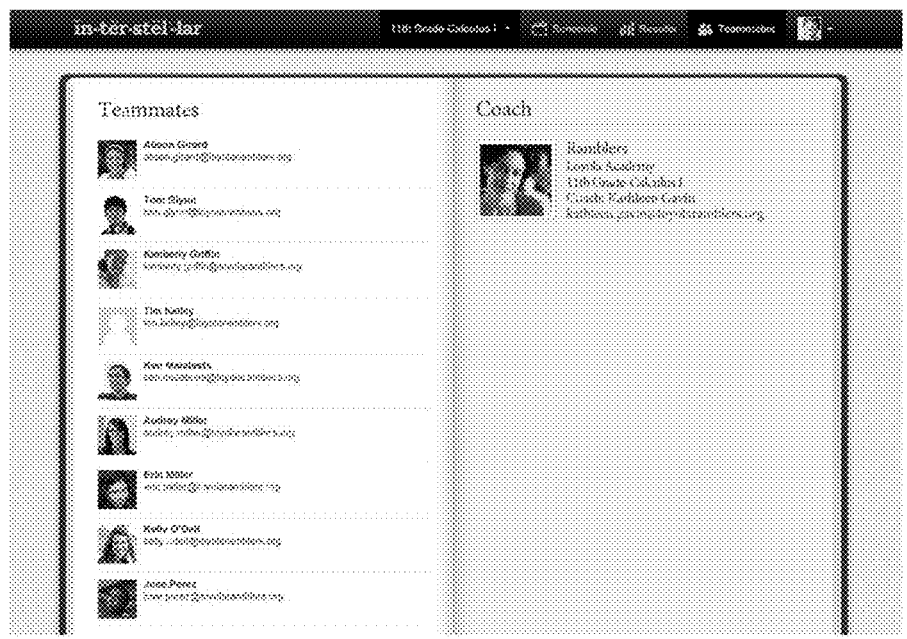
FIG. 100 illustrates a page presented when the Team Member has selected a team from the 'Team' dropdown and clicked 'Teammates' (the order of these steps does not matter in the system).

FIG. 100 illustrates a page presented when the Team Member has selected a team from the 'Team' dropdown and clicked 'Teammates' (the order of these steps does not matter in the system). When the Team Member clicks 'Teammates' for a particular team, all those teammates appear, along with their e-mail addresses, in alphabetical order. In addition, the name and e-mail of that team's Coach appear.

Figure 101:
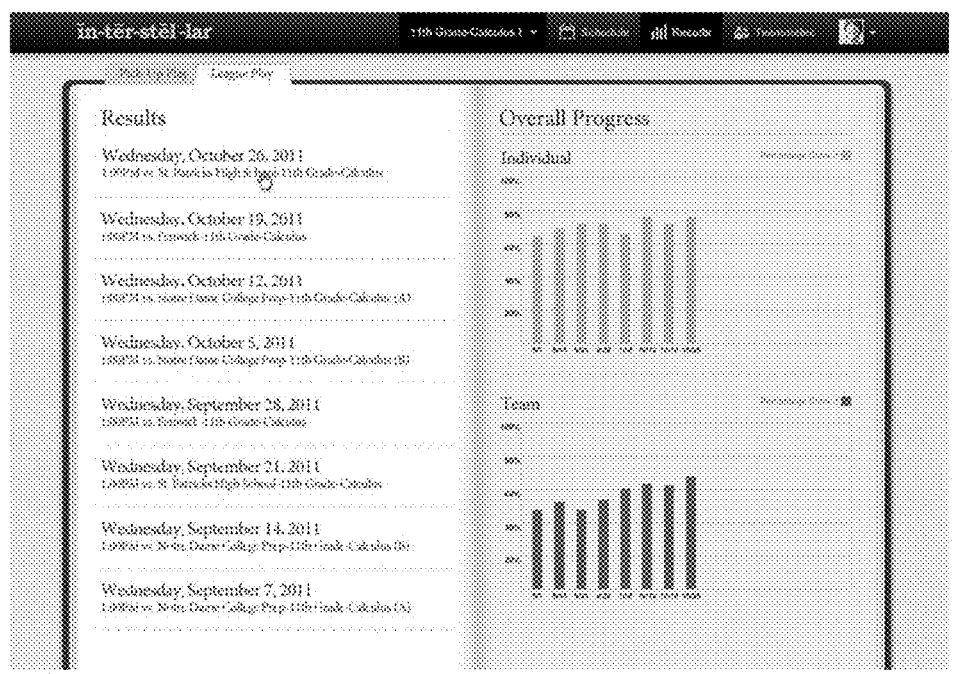
FIG. 101 illustrates a page presented when the Team Member has selected a team from the 'Team' dropdown and clicked 'Results' (the order of these steps does not matter in the system).

FIG. 101 illustrates a page presented when the Team Member has selected a team from the 'Team' dropdown and clicked 'Results' (the order of these steps does not matter in the system). This screen follows the logic described above and displays the graphs presented above for the individual and team results.

Figure 102:
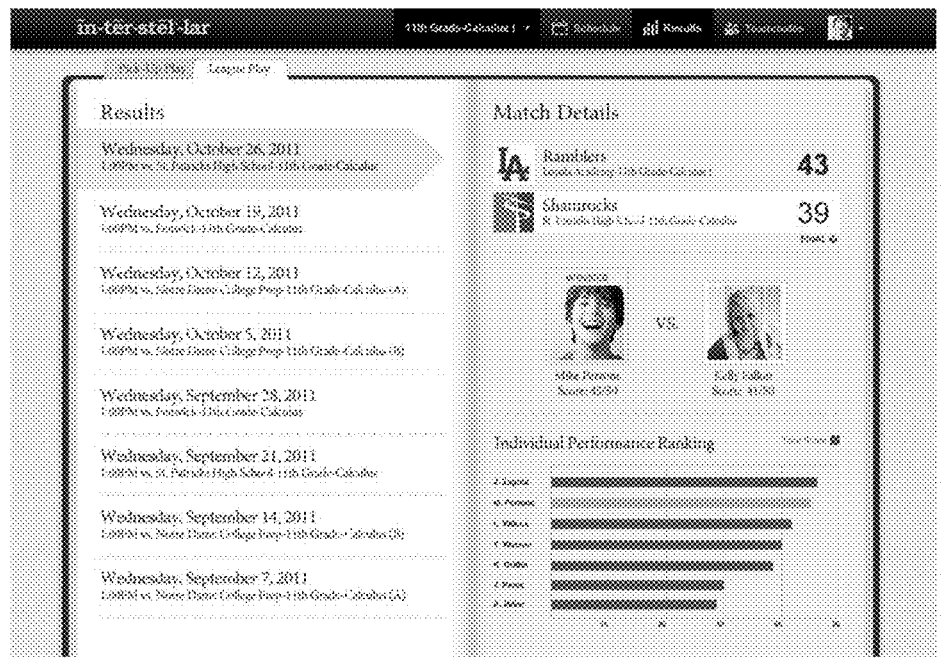
FIG. 102 illustrates a page presented when the Team Member has just clicked a date under 'Results' on the left hand side of the page.

FIG. 102 illustrates a page presented when the Team Member has just clicked a date under 'Results' on the left hand side of the page. The Coach chose to display 'Individual Score' on the scoreboard for this competition. The Team Member and the Team Member opponent have both decided not to conceal their identity. When the Team Member clicks a date under 'Results' in which the Coach chose to display 'Individual Score' on the scoreboard and both the Team Member and the Team Member opponent decided not to conceal their identity, the 'Match Details' area displays the graphs above. The 'Individual Performance Ranking' graph only displays the ranking of Team Members who have not chosen to conceal their identity for this team to other Team Members. However, a Team Member's own ranking always appears to himself/herself, regardless of his/her choice to conceal.

Figure 103:
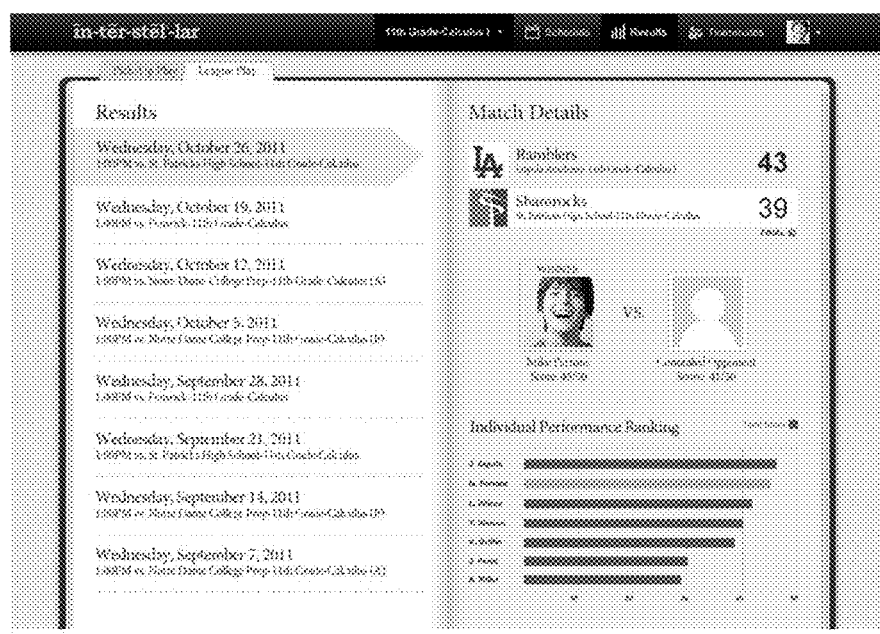
FIG. 103 illustrates a page presented when the Team Member has just clicked a date under 'Results' on the left hand side of the page.

FIG. 103 illustrates a page presented when the Team Member has just clicked a date under 'Results' on the left hand side of the page. The Coach chose to display 'Individual Score' on the scoreboard for this competition and either the Team Member decided to conceal his/her identity, or his/her opponent decided to conceal his/her identity. When the Team Member clicks a date under 'Results' in which the Coach chose to display 'Individual Score' on the scoreboard and either the Team Member decided to conceal his/her identity or his/her opponent did, the identity of the opponent Team Member appears concealed on the 'Match Details' page as illustrated.

Figure 104:
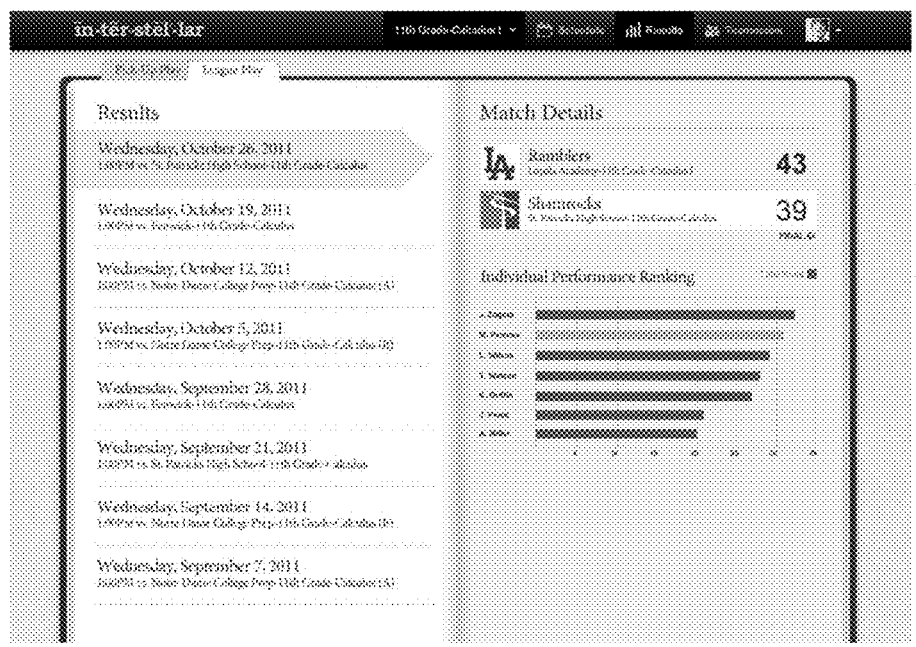
FIG. 104 illustrates a page presented when the Team Member has just clicked a date under 'Results' on the left hand side of the page.

FIG. 104 illustrates a page presented when the Team Member has just clicked a date under 'Results' on the left hand side of the page. The Coach chose to display 'Team Score' on the scoreboard for this competition. When the Team Member clicks a date under 'Results' in which the Coach chose to display 'Team Score' on the scoreboard, regardless of the Team Member's choice to conceal his/her identity, only the 'Team Score' appears in the 'Match Details' page.

Figure 105:
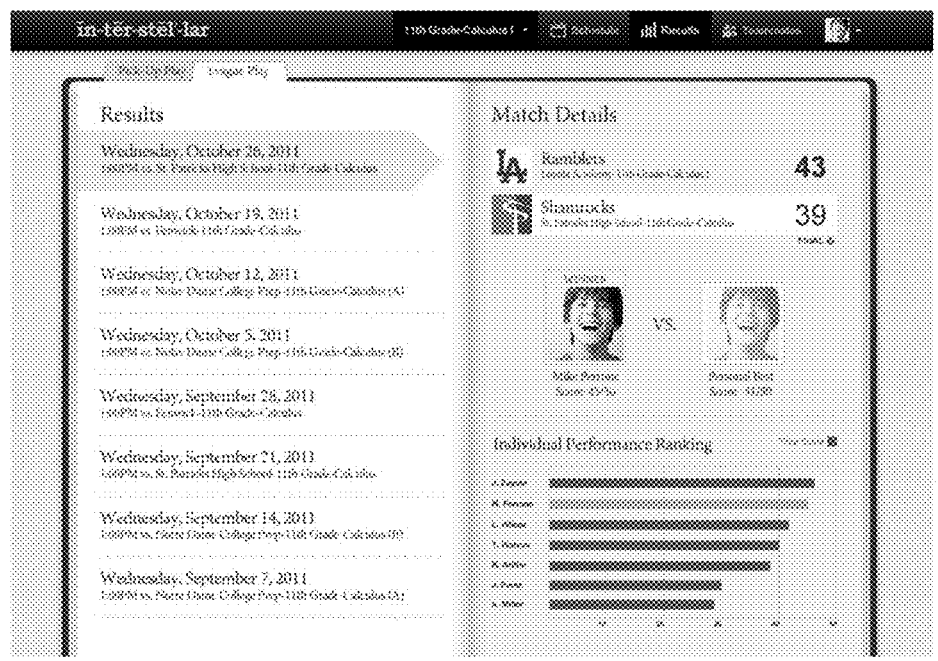
FIG. 105 illustrates a page presented when the Team Member has just clicked a date under 'Results' on the left hand side of the page.

FIG. 105 illustrates a page presented when the Team Member has just clicked a date under 'Results' on the left hand side of the page. The team did not have the same 'Start Time'/'Day of week' as the opponent team. When the Team Member clicks a date under 'Results' in which the team did not have the same 'Start Time'/'Day of week' as its opponent team (this scenario only occurs in League Play), Personal Best Opponent information appears in the 'Match Details' page as illustrated.

Figure 106:
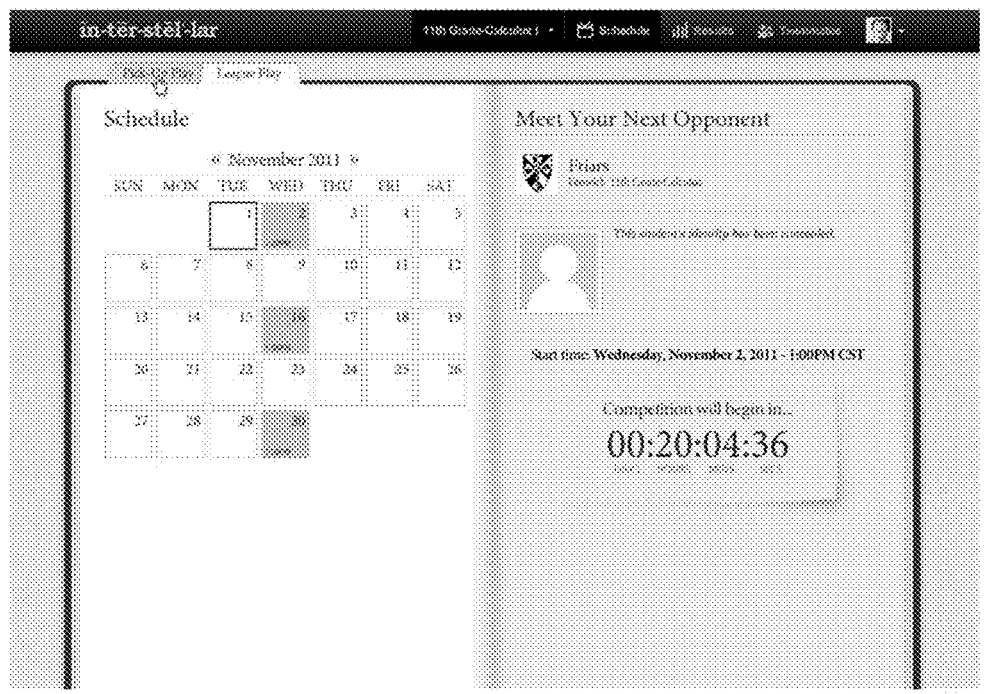
FIG. 106 illustrates a page presented when the Team Member has just clicked 'Schedule'.

FIG. 106 illustrates a page presented when the Team Member has just clicked 'Schedule'. This screen follows the logic described in FIG. 87. The system's matching algorithm determines the Team Member's next individual opponent.

Figure 107:
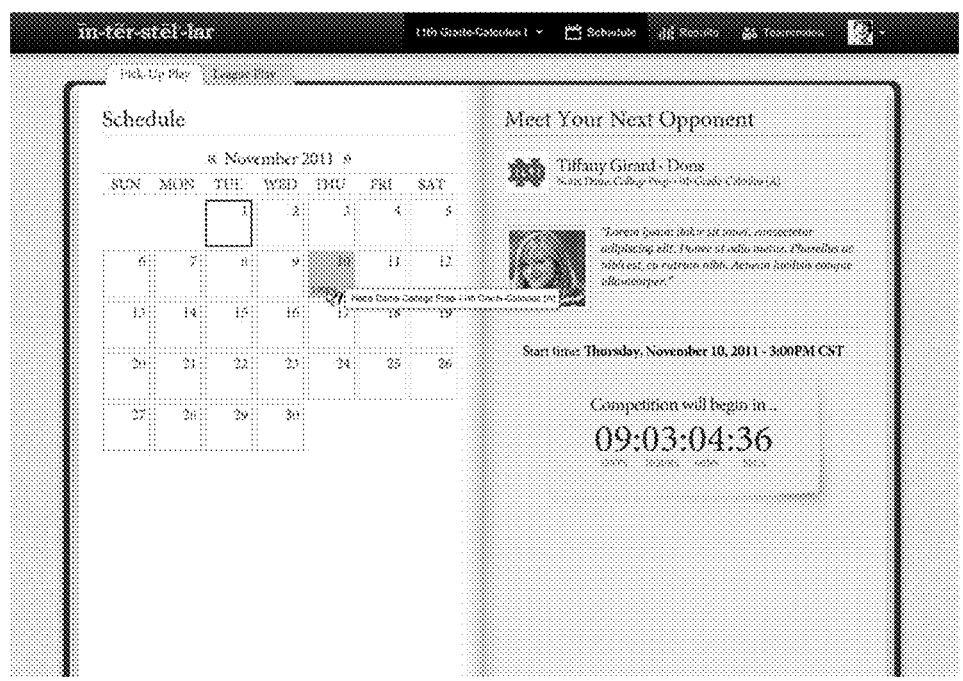
FIG. 107 illustrates a page presented when the Team Member has just clicked the 'Pick-Up Play' tab on the 'Schedule' tab, with the cursor hovering above a date of a scheduled match.

FIG. 107 illustrates a page presented when the Team Member has just clicked the 'Pick-Up Play' tab. This screen follows the logic described above. Only a 'Scheduled' competition appears on a Team Member's 'Pick-Up Play' calendar, not a 'Pending' competition as appears in the Coach's 'Pick-Up Play' calendar. The system's matching algorithm determines the Team Member's next individual opponent. If the next event was a 'Pick-Up Play Intra-team' event, then the 'Meet Your Next Opponent' area would display the information presented in FIG. 88. By placing the cursor over a date with an event scheduled in either 'League Play' or 'Pick-Up Play', the Team Member can view the opponent school.

Figure 108:
FIG. 108 illustrates a page presented when either a 'League Play' or 'Pick-Up Play' competition is about to begin and the Team Member competitors have both logged into the system.

FIG. 108 illustrates a page presented when either a 'League Play' or 'Pick-Up Play' competition is about to begin, the Coach has chosen to display individual score on the scoreboard, and the matched Team Member competitors have both logged into the system. No matter what page a logged-in Team Member is viewing in the Interstellar application, one minute prior to a competition in which the Team Member is scheduled to compete, he/she is brought to a waiting room that displays a countdown clock until the competition begins. As soon as the Team Member opponent enters the waiting room, a notice appears to the Team Member notifying him/her of the Team Member opponent's presence. The radius line inside the clock figure displayed in the scoreboard marks the proportion of time remaining in the competition. For example, when it is pointing to the right at the 3 o'clock position, this signifies that ¾ of the time for the competition remains. The radius line rotates around the clock figure until no time remains. Each player is represented by a 'chip'. Their placement in the circular 'tube' on the periphery of the clock figure tells the Team Member exactly where he/she and his/her opponent are with respect to questions already answered. For example, when the Team Member's triangle is at the 6 o'clock position, this signifies to the Team Member that he/she has completed ½ of the competition and that ½ remains. The marks around the tube represent each question.

When a Coach has created an intra-team Pick-Up Play competition and has divided his/her team into three or more smaller teams, or when the Coach has divided his/her team into two teams and has chosen to display team score, the scoreboard of FIG. 108 is also displayed, only the same school logo is displayed for both competitors and team names appear where individual names otherwise would (e.g. Loyola Academy logo/"Team A" versus Loyola Academy logo/"Team B"). In the former scenario, the score that appears as the competitor's score during the match is always the score of the competitor with the highest percentage at any given point during the match. If there is a tie between two or more competitors, the score of the competitor that has finished the lesser part of the test is displayed. In this scenario, contrary to FIG. 108, the opponent team name field remains blank until the test is in progress, although the school logo is displayed. Team Members are never individually matched when three or more teams are competing. When a Coach has created an intra-team Pick-Up Play competition, has divided his/her team into two teams, but has chosen to display individual score, the same school logo is displayed for both competitors, only now individual names appear in the name field. When a Coach has created an inter-team Pick-Up Play competition and has chosen to display team score, the logo of each school appears on the scoreboard as well as the name of their respective mascots.

In all instances where team score is displayed on the scoreboard, even though the score displayed is an average, only whole numbers are used. A point for a team is registered on the scoreboard only once the average of questions answered correctly for the team has gone up by one. For example, on a 20 person team, 20 questions must be answered correctly before a point is registered on the scoreboard, no matter which Team Members answer them. At the end of the competition event, the average of each team is rounded up or down appropriately to determine a final 'Team Score' for that team. In the event that both teams would have the same 'Team Score', the 'Team Score' of the team with the higher average is rounded up and the 'Team Score' of the team with the lower average is rounded down. For example, if one team's average was 23.4, and the other team's average was 23.3, the former team's 'Team Score' would be rounded up to 24 and the latter team's 'Team Score' would be rounded down to 23. Similarly, if one team's average was 23.7, and the other team's average was 23.6, the former team's 'Team Score' would be rounded up to 24 and the latter team's 'Team Score' would be rounded down to 23. In 'Merged League Play', the score of the 'Unit' is presented on the scoreboard, not the team of which the 'Unit' is a part.

Figure 109:
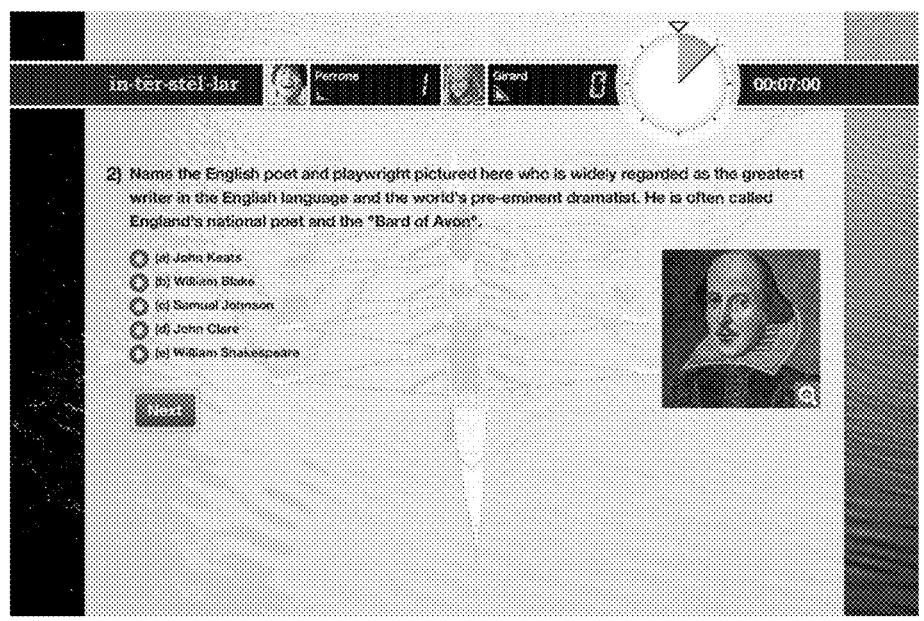
FIG. 109 illustrates the scoreboard during a contest.

FIG. 109 illustrates the scoreboard during a contest. As illustrated, as soon as the radius line reaches a mark in the tube, the area behind it fills in as grey. This signifies that the average amount of time allotted for a particular question has elapsed. As long as the Team Member (represented by a chip) is even (as shown) or ahead of the leading edge of the grey area, then the tube remains white, signifying to the student that he/she is on track to finish the competition on time.

Figure 110:
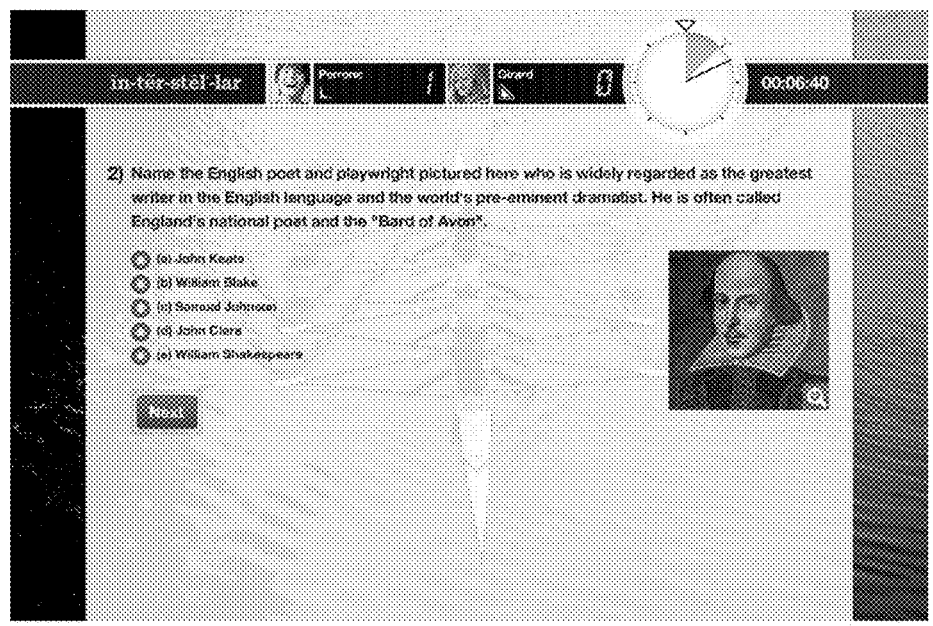
FIG. 110 illustrates the scoreboard where the space between the leading edge of the grey area and the radius line in relation to the space between the mark at the leading edge of the grey area and the following mark represents the proportion of time that has elapsed for that particular question.

FIG. 110 illustrates the scoreboard where the space between the leading edge of the grey area and the radius line in relation to the space between the mark at the leading edge of the grey area and the following mark represents the proportion of time that has elapsed for that particular question.

Figure 111:
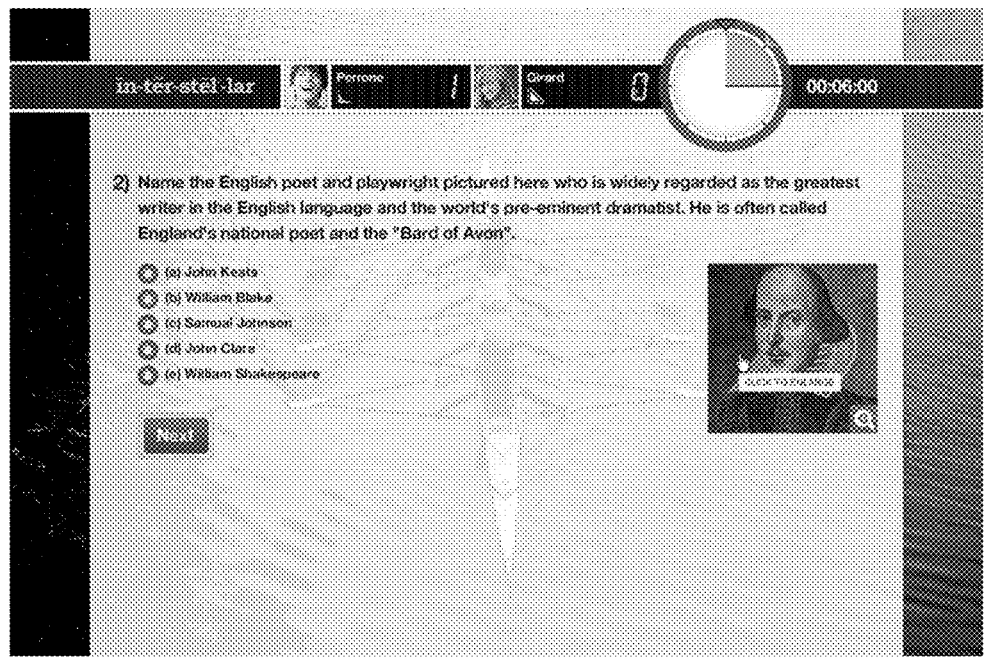
FIG. 111 illustrates the scoreboard where the Team Member (represented by a chip) is behind the leading edge of the grey area.
Figure 112:
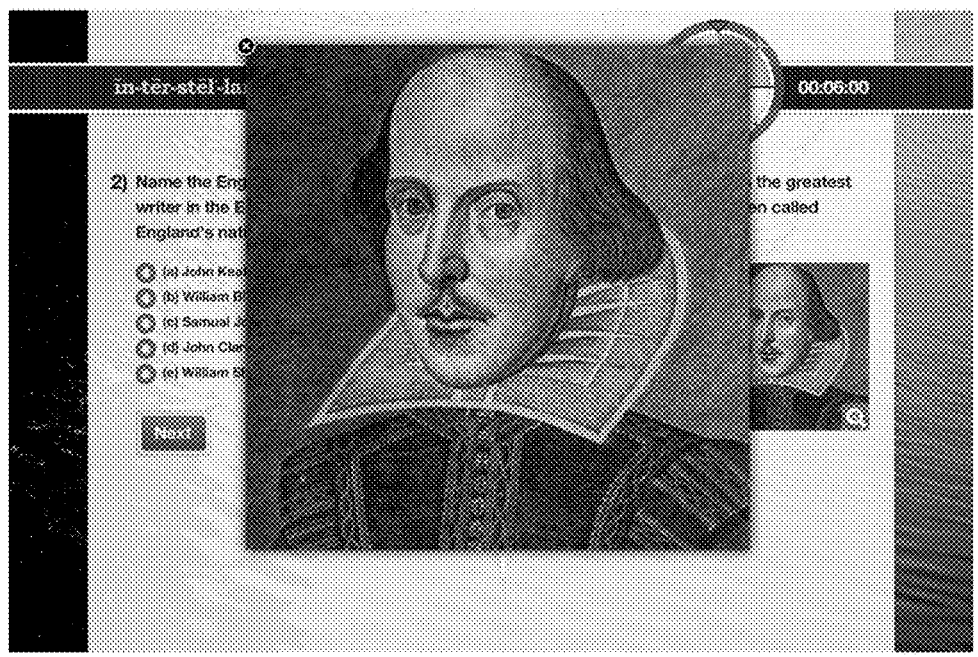
FIG. 112 illustrates the enlarged image when a point on an image appearing in the question field has been clicked.

FIG. 111 illustrates the scoreboard where the Team Member (represented by a chip) is behind the leading edge of the grey area. In this case, the tube fills in as red, signifying that the Team Member is not on track to finish the competition in time. As also shown, when the cursor is placed over an image appearing in the question field, an alert box that reads, 'CLICK TO ENLARGE' appears. The image can be enlarged by clicking any point on the image. FIG. 112 illustrates the enlarged image when a point on an image appearing in the question field has been clicked.

Figure 113:
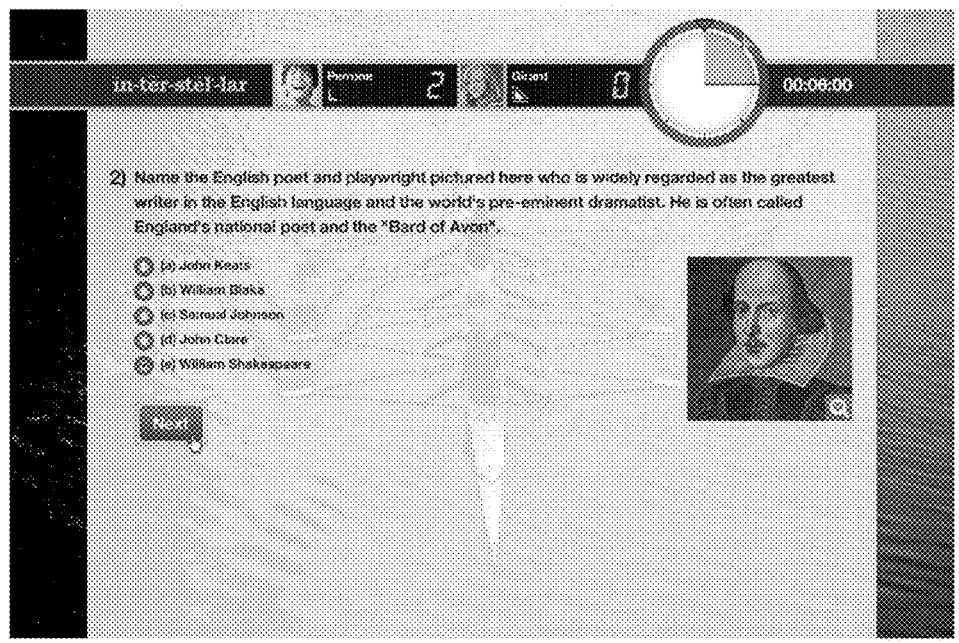
FIG. 113 illustrates a page presented when a Team Member has just answered a question correctly and the scoreboard lights up.

FIG. 113 illustrates a page presented when a Team Member has just answered a question correctly. When a Team Member answers a question correctly, the scoreboard pulses with a flash of light/color, signifying the question was answered correctly.

Figure 114:
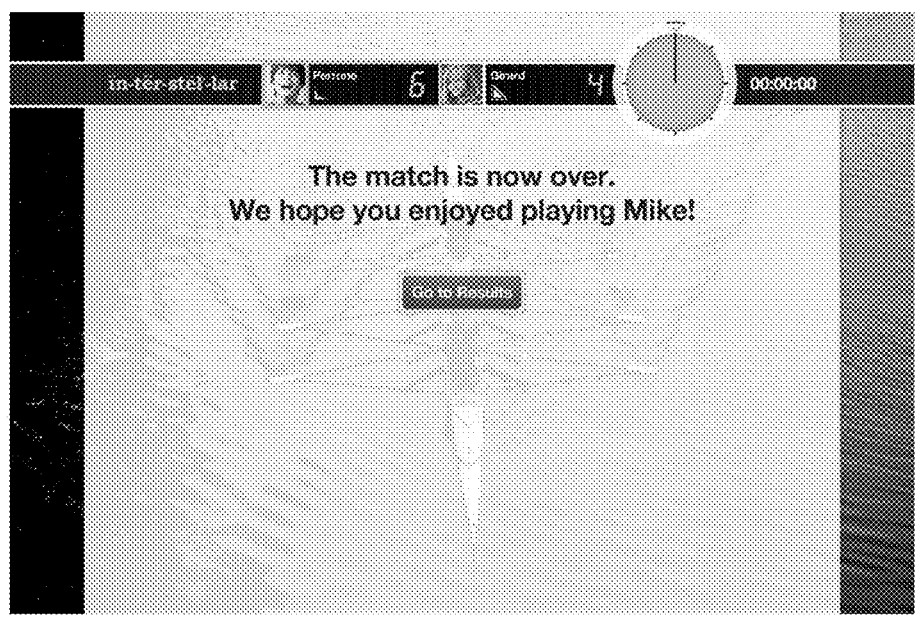
FIG. 114 illustrates a page presented when the allotted time for the competition has elapsed.

FIG. 114 illustrates a page presented when the allotted time for the competition has elapsed. The final score information for the team and Team Member is posted in the question field as illustrated.

FIG. 115 illustrates a page presented when an Administrator, Coach, or Team Member has just clicked 'Sign out' within the Interstellar Network application. The Administrator, Coach, or Team Member login session is immediately terminated when 'Sign out' is clicked.

Those skilled in the art will appreciate that the computing environment of the invention may be a computer, a mainframe, a server (e.g., Interstellar Network server 20), or the like. According to an example embodiment, the computing environment may include hardware components and/or software components such that the computing environment may be used to execute applications such as internet applications, operating systems, server applications, client applications, database applications, or the like. In any case, the computing environment should have the resources to implement the systems and methods described herein.

In an example embodiment, the computing environment may further include a processor that may be in operative communication with an instruction memory (both not shown) and instructed by an operating system to execute application programs for implementing the methods described herein. The processor may include a standardized processor, a specialized processor, a microprocessor, or the like for executing instructions for implementing the methods described herein. The instruction memory may include a computer readable storage device in the form of volatile and/or nonvolatile memory such as random access memory (RAM), read only memory (ROM), cache, Flash memory, a hard disk, or any other suitable storage component. In one embodiment, the instruction memory may be a separate component in communication with the computing environment and the processor.

Those skilled in the art will also appreciate that the invention may be applied to other applications and may be modified without departing from the scope of the invention. For example, the system described herein may permit more than two contestants and more than two teams to compete against each other at the same time and in the same cycle. Alternatively, the clock face component may be useful for education testing generally given its ability to assist students in maintaining the proper pace throughout a test. Accordingly, the scope of the invention is not intended to be limited to the exemplary embodiments described above, but only by the appended claims.

What is claimed:

1. A system for on-line academic competition, comprising:
   a database that stores test questions, team and individual contestant profiles, and test response statistics for the team and individual contestants; and
   a processor programmed to interact with the database and with individual contestant processing devices to perform the steps of:
     enabling the creation of teams of individual contestants for participation in an academic competition;
     enabling a user, through a user interface connected to said database, to perform at least one of the following: (1) create a league of teams and a cycle of academic competition amongst the league of teams, (2) search for and select at least one team for participation in an inter-team academic competition, and (3) divide a team into multiple teams for an intra-team academic competition;
     presenting a series of test questions to the contestant processing devices of the individual contestants of competing teams for response in a time frame allocated for the academic competition;
     providing a real time scoreboard with time clock to each contestant processing device that displays an individual contestant's progress with respect to both the time frame for answering questions and questions answered correctly while answering the series of questions during an academic competition, where each correctly answered question contributes on the real time scoreboard to at least one of (1) an individual score of the individual contestant and (2) a team score of the individual contestant's team; and enabling teams of individual contestants to compete over a series of test questions for an allotted time period in an online format including both a test item presentation area and the real time scoreboard with time clock, at least one of (1) live, if the teams have common time availability, wherein the real time scoreboard displays in real time at least one of (a) the individual score of the individual contestant and (b) the team scores of the competing teams, and (2) non-live, if the teams do not have common time availability, wherein the real time scoreboard displays in real time at least one of (a) the individual score of the individual contestant and (b) the team score of the individual contestant's team.

2. The system as in claim 1, wherein the processor calculates a winner of the academic competition between teams or between respective individual contestants.

3. The system as in claim 1, wherein the processor enables a contestant to elect to conceal his/her identity from a competing contestant or to permit the display of his/her name and photo on the scoreboard of the competing contestant.

4. The system as in claim 1, wherein each contestant processing device presents the scoreboard with a clock face component that alerts the contestant as to whether he/she is on pace to finish the test questions in the allocated time frame.

5. The system as in claim 1, wherein each contestant processing device displays on the scoreboard an individual score as determined by a number of questions answered correctly by each of matched individual contestants, a team score as determined by calculating a total number of individual victories or by taking a running average of all or a number of individual contestant scores from the respective teams, or both the individual score and the team score.

6. The system as in claim 1, wherein the processor evenly matches individual contestants from opposing teams 1:1, 2:1, 3:1, . . . N:1 based on past performance, where N is an integer, until all contestants have been matched, in accordance with at least one of the following rules:
limiting a maximum number of consecutive visits (MNCV) to the smallest integer greater than or equal to n/m, where n is the number of contestants from a larger group and m is the number of contestants from a smaller group; or
leaving the MNCV unconstrained in which case the MNCV is n−m+1; or
setting the MNCV to an integer smaller than n−m+1 and larger than the smallest integer greater than or equal to n/m; or
allowing stages to be represented by not only a stage number, but by a number of consecutive visits as well in which case individual contestants in the larger group are paired multiple times.

7. The system as in claim 1, wherein the processor enables the creation of a live competition event between two teams by enabling an administrator or a coach to:
select a date, time, and length for an academic competition;
select a question set for the academic competition; and
select a team from a list of teams having a common time availability.

8. The system as in claim 1, wherein the processor enables the creation of a live competition event within an original team of individual contestants by enabling an administrator or a coach to:
select a date, time, and length for an academic competition;
select a question set for the academic competition; and
divide the original team of individual contestants into two or more opposing teams of individual contestants by first deciding the desirable amount of opposing teams and then filling each opposing team with members from the original team of individual contestants.

9. The system as in claim 1, wherein the processor further enables an administrator or a coach to create and save questions, including the assignment of images to the questions, or to choose questions from a database of questions submitted by other administrators or coaches for utilization in an academic competition.

10. The system as in claim 9, wherein the processor enables the administrator or coach to create a question set by naming the question set in accordance with a list of categories, populating the question set with questions, and storing any created questions in said database in said list of categories.

11. The system as in claim 1, wherein a contestant processing device enables an individual contestant to upload a photo, or select from collection of photos, to be used as a background on a display to the questions presented in an academic competition.

12. The system as in claim 1, wherein the processor is programmed to facilitate the introduction of contestants to contestants and coaches to coaches from opposing teams.

13. The system as in claim 1 wherein the processor promotes live competition between teams by (1) allowing teams to input their day/time availability, (2) comparing such time availability across teams and (3) facilitating live matches between teams with common time availability.

14. A method for on-line academic competition, comprising:
enabling, using a processing device, the creation of teams of individual contestants for participation in an academic competition;
enabling a user, through a user interface, to perform at least one of the following: (1) create a league of teams and a cycle of academic competition amongst the league of teams, (2) search for and select at least one team for participation in an inter-team academic competition, and (3) divide a team into multiple teams for an intra-team academic competition;
presenting, using a processing device, a series of test questions to the contestant processing devices of the individual contestants of competing teams for response in a time frame allocated for the academic competition;
providing a real time scoreboard with time clock at each contestant processing device that displays an individual contestant's progress with respect to both the time frame for answering questions and questions answered correctly while answering the series of questions during an academic competition, where each correctly answered question contributes on the real time scoreboard to at least one of (1) an individual score of the individual contestant and (2) a team score of the individual contestant's team; and
enabling teams of individual contestants to compete over a series of test questions for an allotted time period in an online format including both a test item presentation area and the real time scoreboard with time clock, at least one of (1) live, if the teams have common time availability, wherein the real time scoreboard displays in real time at least one of (a) the individual score of the individual contestant and (b) the team scores of the competing teams, and (2) non-live, if the teams do not have common time availability, wherein the real time scoreboard displays in real time at least one of (a) the individual score of the individual contestant and (b) the team score of the individual contestant's team.

15. The method as in claim 14, further comprising the processing device calculating a winner of the academic competition between teams or between respective individual contestants.

16. The method as in claim 14, further comprising the processing device enabling a contestant to elect to conceal his/her identity from a competing contestant or to permit the display of his/her name and photo on the scoreboard of the competing contestant.

17. The method as in claim 14, wherein each contestant processing device presents the scoreboard with a clock face component that alerts the contestant as to whether he/she is on pace to finish the test questions in the allocated time frame.

18. The method as in claim 14, wherein each contestant processing device displays on the scoreboard an individual score as determined by a number of questions answered correctly by each of matched individual contestants, a team score as determined by calculating a total number of individual victories or by taking a running average of all or a number of individual contestant scores from the respective teams, or both the individual score and the team score.

19. The method as in claim 14, further comprising the processor evenly matching individual contestants from opposing teams 1:1, 2:1, 3:1, . . . N:1 based on past performance, where N is an integer, until all contestants have been matched, in accordance with at least one of the following rules:
limiting a maximum number of consecutive visits (MNCV) to the smallest integer greater than or equal to n/m, where n is the number of contestants from a larger group and m is the number of contestants from a smaller group; or
leaving the MNCV unconstrained in which case the MNCV is n−m+1; or
setting the MNCV to an integer smaller than n−m+1 and larger than the smallest integer greater than or equal to n/m; or
allowing stages to be represented by not only a stage number, but by a number of consecutive visits as well in which case individual contestants in the larger group are paired multiple times.

20. The method as in claim 14, further comprising the processor creating a live competition event between two teams by enabling an administrator or a coach to:
select a date, time, and length for an academic competition;
select a question set for the academic competition; and
select a team from a list of teams having a common time availability.

21. The method as in claim 14, further comprising the processor creating a live competition event within an original team of individual contestants by enabling an administrator or a coach to:
select a date, time, and length for an academic competition;
select a question set for the academic competition; and
divide the original team of individual contestants into two or more opposing teams of individual contestants by first deciding the desirable amount of opposing teams and then filling each opposing team with members from the original team of individual contestants.

22. The method as in claim 14, further comprising the processor enabling an administrator or a coach to create and save questions, including the assignment of images to the questions, or to choose questions from a database of questions submitted by other administrators or coaches for utilization in an academic competition.

23. The method as in claim 22, further comprising the processor enabling the administrator or coach to create a question set by naming the question set in accordance with a list of categories, populating the question set with questions, and storing any created questions in said database in said list of categories.

24. The method as in claim 14, further comprising a contestant processing device enabling an individual contestant to upload a photo, or select from collection of photos, to be used as a background on a display to the questions presented in an academic competition.

25. The method as in claim 14, further comprising the processor facilitating the introduction of contestants to contestants and coaches to coaches from opposing teams.

26. The method as in claim 14, further comprising the processing device promoting live competition between teams by (1) allowing teams to input their day/time availability, (2) comparing such time availability across teams and (3) facilitating live matches between teams with common time availability.

27. A non-transitory computer readable storage device having instructions stored thereon that when executed by a processor cause the processor to provide an on-line academic competition including the steps of:
enabling the creation of teams of individual contestants for participation in an academic competition;
enabling a user, through a user interface, to perform at least one of the following: (1) create a league of teams and a cycle of academic competition amongst the league of teams, (2) search for and select at least one team for participation in an inter-team academic competition, and (3) divide a team into multiple teams for an intra-team academic competition;
presenting a series of test questions to the contestant processing devices of the individual contestants of competing teams for response in a time frame allocated for the academic competition;
providing a real time scoreboard with time clock at each contestant processing device that displays an individual contestant's progress with respect to both the time frame for answering questions and questions answered correctly while answering the series of questions during an academic competition, where each correctly answered question contributes on the real time scoreboard to at least one of (1) an individual score of the individual contestant and (2) a team score of the individual contestant's team; and
enabling teams of individual contestants to compete over a series of test questions for an allotted time period in an online format including both a test iteni presentation area and the real time scoreboard with time clock, at least one of (1) live, if the teams have common time availability, wherein the real time scoreboard displays in real time at least one of (a) the individual score of the individual contestant and (b) the team scores of the competing teams, and (2) non-live, if the teams do not have common time availability, wherein the real time scoreboard displays in real time at least one of (a) the individual score of the individual contestant and (b) the team score of the individual contestant's team.

28. The non-transitory computer readable storage device as in claim 27, further comprising instructions for calculating a winner of the academic competition between teams or between respective individual contestants.

29. The non-transitory computer readable storage device as in claim 27, further comprising instructions for enabling a contestant to elect to conceal his/her identity from a competing contestant or to permit the display of his/her name and photo on the scoreboard of the competing contestant.

30. The non-transitory computer readable storage device as in claim 27, further comprising instructions for evenly matching individual contestants from opposing teams 1:1, 2:1, 3:1, . . . N:1 based on past performance, where N is an integer, until all contestants have been matched, in accordance with at least one of the following rules:
  limiting a maximum number of consecutive visits (MNCV) to the smallest integer greater than or equal to n/m, where n is the number of contestants from a larger group and m is the number of contestants from a smaller group; or
  leaving the MNCV unconstrained in which case the MNCV is n−m+1; or
  setting the MNCV to an integer smaller than n−m+1 and larger than the smallest integer greater than or equal to n/m; or
  allowing stages to be represented by not only a stage number, but by a number of consecutive visits as well in which case individual contestants in the larger group are paired multiple times.

31. The non-transitory computer readable storage device as in claim 27, further comprising instructions for creating a live competition event between two teams by enabling an administrator or a coach to:
  select a date, time, and length for an academic competition;
  select a question set for the academic competition; and
  select a team from a list of teams having a common time availability.

32. The non-transitory computer readable storage device as in claim 27, further comprising instructions for creating a live competition event within an original team of individual contestants by enabling an administrator or a coach to:
  select a date, time, and length for an academic competition;
  select a question set for the academic competition; and
  divide the original team of individual contestants into two or more opposing teams of individual contestants by first deciding the desirable amount of opposing teams and then filling each opposing team with members from the original team of individual contestants.

33. The non-transitory computer readable storage device as in claim 27, further comprising instructions for enabling an administrator or a coach to create and save questions, including the assignment of images to the questions, or to choose questions from a database of questions submitted by other administrators or coaches for utilization in an academic competition.

34. The non-transitory computer readable storage device as in claim 33, further comprising instructions for enabling the administrator or coach to create a question set by naming the question set in accordance with a list of categories, populating the question set with questions, and storing any created questions in said database in said list of categories.

35. The non-transitory computer readable storage device as in claim 27, further comprising instructions for facilitating the introduction of contestants to contestants and coaches to coaches from opposing teams.

36. The non-transitory computer readable storage device as in claim 27, further comprising instructions for promoting live competition between teams by (1) allowing teams to input their day/time availability, (2) comparing such time availability across teams and (3) facilitating live matches between teams with common time availability.

37. A system for on-line academic competition, comprising:
  a database that stores test questions, team and individual contestant profiles, and test response statistics for the teams and individual contestants; and
  a processor programmed to interact with the database and with individual contestant processing devices to perform the steps of:
    enabling the creation of teams of individual contestants for participation in an academic competition;
    creating a league of teams through a user interface;
    creating a cycle of academic competitions amongst the league of teams through a user interface where matches between teams are based at least on a selected time period, frequency of matches, and question sets;
    enabling a user, through a user interface connected to said database, to perform at least one of the following: (1) search for and select at least one team for participation in an inter-team academic competition and (2) divide a team into multiple teams for an intra-team academic competition;
    presenting a series of test questions to the contestant processing devices of the individual contestants of competing teams for response in a time frame allocated for the academic competition; and
    providing a real time scoreboard to each contestant processing device that displays each individual contestant's progress with respect to both the time frame for answering questions and questions answered correctly while answering the series of questions during an academic competition, where each correctly answered question contributes to the contestant's individual score on the real time scoreboard.

38. The system as in claim 37, wherein the processor enables the creation of a league of competition amongst a plurality of teams by enabling an administrator or a coach to: create a cycle for a league by selecting a start date, end date, match length, a frequency of rounds, question sets for each round, and a preferred time to play in each round; whereby when two matched teams in a given round share a same preferred team, the processor facilitates live play between the two matched teams; and whereby when two matched teams in a given round do not share a preferred time, the processor enables each contestant to play against a personal best score and a final team score is determined after all players for both teams have played.

39. A method for on-line academic competition, comprising:
  enabling using the processing device, the creation of teams of individual contestants for participation in an academic competition;
  creating a league of teams through a user interface;
  creating a cycle of academic competitions amongst the league of teams, through a user interface, where matches between teams are based at least on a selected time period, frequency of matches, and question sets;

enabling a user, through a user interface, to perform at least one of the following: (1) search for and select at least one team for participation in an inter-team academic competition and (2) divide a team into multiple teams for an intra-team academic competition;

presenting, using the processing device, a series of test questions to the contestant processing devices of the individual contestants of competing teams for response in a time frame allocated for the academic competition; and providing a real time scoreboard at each contestant processing device that displays each individual contestant's progress with respect to both the time frame for answering questions and questions answered correctly while answering the series of questions during an academic competition, where each correctly answered question contributes to the contestant's individual score on the real time scoreboard.

40. The method as in claim 39, further comprising the processor creating a league of competition amongst a plurality of teams by enabling an administrator or a coach to: create a cycle for a league by selecting a start date, end date, match length, a frequency of rounds, question sets for each round, and a preferred time to play in each round; whereby when two matched teams in a given round share a same preferred time, the processor facilitates live play between the two matched teams; and whereby when two matched teams in a given round do not share a preferred time, the processor enables each contestant to play against a personal best score and a final team score is determined after all players for both teams have played.

41. A non-transitory computer readable storage device having instructions stored thereon that when executed by a processor cause the processor to provide an on-line academic competition including the steps of:

enabling the creation of teams of individual contestants for participation in an academic competition;

creating a league of teams through a user interface;

creating a cycle of academic competitions amongst the league of teams, through a user interface, where matches between teams are based at least on a selected time period, frequency of matches, and question sets;

enabling a user, through a user interface, to perform at least one of the following: (1) search for and select at least one team for participation in an inter-team academic competition and (2) divide a team into multiple teams for an intra-team academic competition;

presenting, using the processing device, a series of test questions to the contestant processing devices of the individual contestants of competing teams for response in a time frame allocated for the academic competition; and providing a real time scoreboard at each contestant processing device that displays each individual contestant's progress with respect to both the time frame for answering questions and questions answered correctly while answering the series of questions during an academic competition, where each correctly answered question contributes to the contestant's individual score on the real time scoreboard.

42. The non-transitory computer readable storage device as in claim 41, further comprising the processor creating a league of competition amongst a plurality of teams by enabling an administrator or a coach to: create a cycle for a league by selecting a start date, end date, match length, a frequency of rounds, question sets for each round, and a preferred time to play in each round; whereby when two matched teams in a given round share a same preferred time, the processor facilitates live play between the two matched teams; and whereby when two matched teams in a given round do not share a preferred time, the processor enables each contestant to play against a personal best score and a final team score is determined after all players for both teams have played.

* * * * *